(12) United States Patent
Inazawa

(10) Patent No.: US 10,519,310 B2
(45) Date of Patent: Dec. 31, 2019

(54) POLYCARBONATE RESIN COMPOSITION

(71) Applicant: TEIJIN LIMITED, Osaka (JP)

(72) Inventor: Yasunori Inazawa, Osaka (JP)

(73) Assignee: TEIJIN LIMITED, Osaka (JP)

( * ) Notice: Subject to any disclaimer, the term of this patent is extended or adjusted under 35 U.S.C. 154(b) by 52 days.

(21) Appl. No.: 15/748,310

(22) PCT Filed: Aug. 8, 2016

(86) PCT No.: PCT/JP2016/073811
§ 371 (c)(1),
(2) Date: Jan. 29, 2018

(87) PCT Pub. No.: WO2017/033783
PCT Pub. Date: Mar. 2, 2017

(65) Prior Publication Data
US 2018/0223098 A1    Aug. 9, 2018

(30) Foreign Application Priority Data

Aug. 21, 2015  (JP) .................................. 2015-163840
Dec. 22, 2015  (JP) .................................. 2015-249824
Dec. 24, 2015  (JP) .................................. 2015-251702
Dec. 28, 2015  (JP) .................................. 2015-256371

(51) Int. Cl.
| | | |
|---|---|---|
| C08L 69/00 | (2006.01) | |
| C08L 23/00 | (2006.01) | |
| C08L 51/04 | (2006.01) | |
| C08L 53/02 | (2006.01) | |
| C08K 5/00 | (2006.01) | |
| C08K 5/49 | (2006.01) | |
| C08L 23/06 | (2006.01) | |
| C08L 23/08 | (2006.01) | |
| C08L 23/14 | (2006.01) | |

(52) U.S. Cl.
CPC ............ C08L 69/00 (2013.01); C08K 5/0066 (2013.01); C08K 5/49 (2013.01); C08L 23/00 (2013.01); C08L 23/06 (2013.01); C08L 23/0838 (2013.01); C08L 23/14 (2013.01); C08L 51/04 (2013.01); C08L 53/02 (2013.01); *C08L 2205/025* (2013.01); *C08L 2205/03* (2013.01); *C08L 2205/035* (2013.01)

(58) Field of Classification Search
CPC .......... C08L 69/00; C08L 23/14; C08L 23/12; C08L 53/025; C08L 2205/03
See application file for complete search history.

(56) References Cited

U.S. PATENT DOCUMENTS

| | | | |
|---|---|---|---|
| 4,568,723 A | | 2/1986 | Lu |
| 5,021,504 A | * | 6/1991 | Fujita .................... C08L 23/02 525/133 |
| 2009/0139891 A1 | * | 6/2009 | Oshima ................ B32B 38/145 206/497 |
| 2012/0063730 A1 | * | 3/2012 | Gagnon ............... G02B 6/4436 385/100 |
| 2013/0231430 A1 | * | 9/2013 | I .......................... C08L 53/025 524/323 |

FOREIGN PATENT DOCUMENTS

| | | |
|---|---|---|
| JP | 63-215750 | 9/1988 |
| JP | 63-215752 | 9/1988 |
| JP | 5-17633 | 1/1993 |
| JP | 7-330972 | 12/1995 |
| JP | 2005-132937 | 5/2005 |
| JP | 2014-088475 | 5/2014 |
| JP | 2014-181323 | 9/2014 |

OTHER PUBLICATIONS

International Search Report dated Sep. 6, 2016 in International (PCT) Application No. PCT/JP2016/073811.
Supplementary Search Report dated Jul. 30, 2018 in European Application No. 16839130.8.
International Preliminary Report on Patentability dated Feb. 27, 2018 in International (PCT) Application No. PCT/JP2016/073811.

* cited by examiner

*Primary Examiner* — Jeffrey C Mullis
(74) *Attorney, Agent, or Firm* — Wenderoth, Lind & Ponack, L.L.P.

(57) ABSTRACT

A resin composition comprising 1 to 20 parts by weight of (C) at least one styrene-based thermoplastic elastomer (component C) selected from the group consisting of a styrene-ethylene.propylene-styrene block copolymer (SEPS), a styrene-ethylene-butylene-styrene block copolymer (SEBS) and a styrene-butadiene-butylene-styrene block copolymer (SBBS) based on 100 parts by weight of the total of (A) a polycarbonate-based resin (component A) and (B) a polyolefin-based resin having a MFR at 230° C. under a load of 2.16 kg of not less than 40 g/10 min (component B). The resin composition is excellent in mechanical properties, chemical resistance, appearance and tape peeling resistance.

18 Claims, No Drawings

POLYCARBONATE RESIN COMPOSITION

TECHNICAL FIELD

The present invention relates to a resin composition comprising a polycarbonate. More specifically, the present invention relates to a resin composition which comprises a polycarbonate-based resin, a polyolefin-based resin and a styrene-based thermoplastic elastomer and is excellent in mechanical properties, chemical resistance, appearance and tape peeling resistance.

BACKGROUND ART

A polycarbonate resin is widely used in a variety of fields such as OA equipment, electronic and electric equipment, and automobiles as it has excellent mechanical properties and thermal properties. However, the polycarbonate resin has low workability due to high melt viscosity and has a problem with chemical resistance especially to cleaners as it is an amorphous resin. Therefore, it is known that a polyolefin-based resin is added to the polycarbonate resin to compensate for these disadvantages. When a polyolefin-based resin is simply added to the polycarbonate resin, a poor appearance or delamination occurs due to low compatibility between the polycarbonate resin and the polyolefin-based resin, thereby making it difficult to obtain satisfactory mechanical properties. Therefore, it is difficult to put it to practical use.

Then, to enhance compatibility between the polycarbonate resin and the polyolefin-based resin so as to provide mechanical properties for practical use, various resin compositions are proposed.

For example, there is disclosed a process in which an elastomer graft modified with a hydroxyl group-containing vinyl monomer is added as a compatibilizer (Patent Documents 1 and 2). There is also disclosed a process in which polypropylene modified with a hydroxyl group-containing vinyl monomer is used as a compatibilizer and an ethylene-α-olefin copolymer of ethylene and an α-olefin having 4 or more carbon atoms is used as an impact resisting agent (Patent Documents 3 and 4). There is further disclosed a process in which a terminal carboxylated polycarbonate resin and an epoxylated polypropylene resin are used (Patent Document 5). There is still further disclosed a process in which a terminal carboxylated polycarbonate resin and a maleic anhydride-modified polypropylene resin are used (Patent Document 6).

There is also disclosed a process in which a styrene-ethylene.butylene-styrene block copolymer is added as a compatibilizer (Patent Document 7). There is further disclosed a process in which a styrene-ethylene.propylene-styrene copolymer is added (Patent Document 8).

However, all of the above documents fail in obtaining more excellent chemical resistance, mechanical properties, appearance and tape peeling resistance than the practical levels of the polycarbonate. Further, since a large difference in melt viscosity between the polycarbonate and the polyolefin is one of the causes of reducing compatibility, a polyolefin having a relatively low MFR is often used in these documents. However, resin compositions comprising a polyolefin having a low MFR do not have an improved appearance and improved tape peeling resistance, and use of a resin composition comprising a polyolefin having a high MFR has not been reported up to now.

PRIOR ART DOCUMENTS (Patent Document 1) JP-A 7-330972
(Patent Document 2) JP-A 8-134277
(Patent Document 3) JP-A 2005-132937
(Patent Document 4) JP-A 54-53162
(Patent Document 5) JP-A 63-215750
(Patent Document 6) JP-A 63-215752
(Patent Document 7) JP-A 5-17633
(Patent Document 8) JP-A 2000-17120

DISCLOSURE OF THE INVENTION

Problem to Be Solved by the Invention

It is an object of the present invention to provide a resin composition which comprises a polycarbonate resin and is excellent in mechanical properties, chemical resistance, appearance and tape peeling resistance as well as a molded article thereof. It is another object of the present invention to provide a method of improving the tape peeling resistance of a molded article which comprises a polycarbonate-based resin, a polyolefin-based resin and a styrene-based thermoplastic elastomer.

Means for Solving the Problem

The inventors of the present invention conducted intensive studies to solve the above problem and found that when a polyolefin-based resin having a MFR (230° C. under a load of 2.16 kg) of not less than 40 g/10 min (component B) and a specific styrene-based thermoplastic elastomer (component C) are added to a polycarbonate-based resin (component A), a resin composition having improved mechanical properties, chemical resistance, appearance and tape peeling resistance is obtained. The present invention was accomplished based on this finding.

That is, according to the present invention, the above object is attained by a resin composition which comprises 1 to 20 parts by weight of (C) at least one styrene-based thermoplastic elastomer (component C) selected from the group consisting of a styrene-ethylene-propylene-styrene block copolymer (SEPS), a styrene-ethylene-butyl ene-styrene block copolymer (SEBS) and a styrene-butadien.butylene-styrene block copolymer (SBBS) based on 100 parts by weight of the total of (A) a polycarbonate-based resin (component A) and (B) a polyolefin-based resin having a MFR at 230° C. under a load of 2.16 kg of not less than 40 g/10 min (component B).

The present invention is also a molded article which is formed from the above resin composition and has a tape detachability of less than 0.5%.

Further, the present invention is a method of improving the tape peeling resistance of a molded article comprising a polycarbonate-based resin (component A), a polyolefin-based resin (component B) and a styrene-based thermoplastic elastomer (component C), wherein at least one selected from the group consisting of a styrene-ethylene-propylene-styrene block copolymer (SEPS), a styrene-ethylene-butylene-styrene block copolymer (SEBS) and a styrene-butadiene-butylene-styrene block copolymer (SBBS) is used as the styrene-based thermoplastic elastomer (component C) and a resin having a MFR at 230° C. under a load of 2.16 kg of not less than 40 g/10 min is used as the polyolefin-based resin (component B).

Effect of the Invention

The resin composition and the molded article of the present invention are excellent in mechanical properties, chemical resistance, appearance and tape peeling resistance.

According to the present invention, the tape peeling resistance of a molded article comprising a polycarbonate-based resin, a polyolefin-based resin and a styrene-based thermoplastic elastomer can be improved.

MODE FOR CARRYING OUT THE INVENTION

The present invention will be described in detail hereinunder.

<Component A: Polycarbonate-Based Resin>

The polycarbonate-based resin (component A) is obtained by reacting a dihydric phenol with a carbonate precursor. Examples of the reaction include interfacial polycondensation, melt transesterification, the solid-phase transesterification of a carbonate prepolymer and the ring-opening polymerization of a cyclic carbonate compound.

Typical examples of the dihydric phenol used herein include hydroquinone, resorcinol, 4,4'-biphenol, 1,1-bis(4-hydroxyphenyl)ethane, 2,2-bis(4-hydroxyphenyl)propane (commonly known as "bisphenol A"), 2,2-bis(4-hydroxy-3-methylphenyl)propane, 2,2-bis(4-hydroxyphenyl)butane, 1,1-bis(4-hydroxyphenyl)-1-phenylethane, 1,1-bis(4-hydroxyphenyl)cyclohexane, 1,1-bis(4-hydroxyphenyl)-3,3,5-trimethylcyclohexane, 2,2-bis(4-hydroxyphenyl)pentane, 4,4'-(p-phenylenediisopropylidene)diphenol, 4,4'-(m-phenylenediisopropylidene)diphenol, 1,1-bis(4-hydroxyphenyl)-4-isopropylcyclohexane, bis(4-hydroxyphenyl)oxide, bis(4-hydroxyphenyl)sulfide, bis(4-hydroxyphenyl)sulfoxide, bis(4-hydroxyphenyl)sulfone, bis(4-hydroxyphenyl)ketone, bis(4-hydroxyphenyl)ester, bis(4-hydroxy-3-methylphenyl)sulfide, 9,9-bis(4-hydroxyphenyl)fluorene and 9,9-bis(4-hydroxy-3-methylphenyl)fluorene. Out of these dihydric phenols, bis(4-hydroxyphenyl)alkanes are preferred, and bisphenol A is particularly preferred from the viewpoint of impact resistance and commonly used.

In the present invention, besides bisphenol A-based polycarbonates which are general-purpose polycarbonates, special polycarbonates which are produced by using another dihydric phenol may be used as the component A.

For example, polycarbonates (homopolymers or copolymers) obtained by using 4,4'-(m-phenylenediisopropylidene)diphenol (may be abbreviated as "BPM" hereinafter), 1,1-bis(4-hydroxyphenyl)cyclohexane, 1,1-bis(4-hydroxyphenyl)-3,3,5-trimethylcyclohexane (may be abbreviated as "Bis-TMC" hereinafter), 9,9-bis(4-hydroxyphenyl)fluorene and 9,9-bis(4-hydroxy-3-methylphenyl)fluorene (may be abbreviated as "BCF" hereinafter) as part or all of the dihydric phenol component are suitable for use in fields in which the requirements for dimensional stability and form stability against water absorption are very strict. These dihydric phenols except for BPA are used in an amount of preferably not less than 5 mol %, particularly preferably not less than 10 mol % of the whole dihydric phenol component constituting the polycarbonate.

Particularly when high stiffness and excellent resistance to hydrolysis are required, the component A constituting the resin composition is particularly preferably one of the following copolycarbonates (1) to (3).

(1) A copolycarbonate which comprises 20 to 80 mol % (preferably 40 to 75 mol %, more preferably 45 to 65 mol %) of RPM and 20 to 80 mol % (preferably 25 to 60 mol, more preferably 35 to 55 mol %) of BCF based on 100 mol % of the dihydric phenol component constituting the polycarbonate.

(2) A copolycarbonate which comprises 10 to 95 mol % (preferably 50 to 90 mol %, more preferably 60 to 85 mol %) of BPA and 5 to 90 mol % (preferably 10 to 50 mol %, more preferably 15 to 40 mol %) of BCF based on 100 mol % of the dihydric phenol component constituting the polycarbonate.

(3) A copolycarbonate which comprises 20 to 80 mol % (preferably 40 to 75 mol %, more preferably 45 to 65 mol %) of BPM and 20 to 80 mol % (preferably 25 to 60 mold, more preferably 35 to 55 mol %) of Bis-TMC based on 100 mol % of the dihydric phenol component constituting the polycarbonate.

These special polycarbonates may be used alone or in combination of two or more. They may be mixed with a commonly used bisphenol A type polycarbonate before use.

The production processes and characteristic properties of these special polycarbonates are detailed in, for example, JP-A 6-172508, JP-A 8-27370, JP-A 2001-55435 and JP-A 2002-117580.

Out of the above polycarbonates, polycarbonates whose water absorption coefficient and Tg (glass transition temperature) have been adjusted to the following ranges by controlling their compositions are excellent in the hydrolysis resistance of the polymer itself and rarely warp after molding. Therefore, they are particularly preferred in fields in which form stability is required.

(i) A polycarbonate having a water absorption coefficient of 0.05 to 0.15%, preferably 0.06 to 0.13% and a Tg of 120 to 180° C., or (ii) a polycarbonate having a Tg of 160 to 250° C., preferably 170 to 230° C. and a water absorption coefficient of 0.10 to 0.30%, preferably 0.13 to 0.30%, more preferably 0.14 to 0.27%.

The water absorption coefficient of a polycarbonate is a value obtained by measuring the moisture content of a disk-like test piece having a diameter of 45 mm and a thickness of 3.0 mm after the test piece is immersed in 23° C. water for 24 hours in accordance with ISO62-1980. Tg (glass transition temperature) is a value obtained by measurement with a differential scanning calorimeter (DSC) in accordance with JIS K7121.

The carbonate precursor is a carbonyl halide, diester carbonate or haloformate, as exemplified by phosgene, diphenyl carbonate and dihaloformates of a dihydric phenol.

For the manufacture of an aromatic polycarbonate resin by the interfacial polymerization of a dihydric phenol and a carbonate precursor, a catalyst, an end sealing agent and an antioxidant for preventing the oxidation of the dihydric phenol may be optionally used. The polycarbonate resin includes a branched polycarbonate resin obtained by copolymerizing a polyfunctional aromatic compound having 3 or more functional groups, a polyester carbonate resin obtained by copolymerizing an aromatic or aliphatic (including alicyclic) bifunctional carboxylic acid, a copolycarbonate resin obtained by copolymerizing a bifunctional alcohol (including an alicyclic bifunctional alcohol), and a polyester carbonate resin obtained by copolymerizing the bifunctional carboxylic acid and the bifunctional alcohol. It may also be a mixture of two or more of the obtained aromatic polycarbonate resins.

The branched polycarbonate resin can provide dripping preventing performance to the resin composition of the present invention. Examples of the polyfunctional aromatic compound having 3 or more functional groups used in the branched polycarbonate resin include phloroglucin, phloroglucide, trisphenols such as 4,6-dimethyl-2,4,6-tris(4-hydroxydiphenyl)heptene-2, 2,4,6-trimethyl-2,4,6-tris(4-hydroxyphenyl)heptane, 1,3,5-tris(4-hydroxyphenyl)benzene, 1,1,1-tris(4-hydroxyphenyl)ethane, 1,1,1-tris(3,5-dimethyl-4-hydroxyphenyl)ethane, 2,6-bis(2-hydroxy-5-methylbenzyl)-4-methylphenol and 4-{4-[1,1-bis(4-hydroxyphenyl)ethyl]benzene}α,αdimethylbenzylphenol, tetra(4-hydroxyphenyl)methane, bis(2,4-dihydroxyphenyl)ketone, 1,4-bis(4,4-dihydroxytriphenylmethyl)benzene, trimellitic acid, pyromellitic acid, benzophenone tetracarboxylic acid and acid chlorides thereof. Out of these, 1,1,1-tris(4-hydroxyphenyl)ethane and 1,1,1-tris(3,5-dimethyl-4-hydroxyphenyl)ethane are preferred, and 1,1,1-tris(4-hydroxyphenyl)ethane is particularly preferred.

The content of a constituent unit derived from the polyfunctional aromatic compound in the branched polycarbonate is preferably 0.01 to 1 mol %, more preferably 0.05 to 0.9 mol %, much more preferably 0.05 to 0.8 mol % based on 100 mol % of the total of a constituent unit derived from the dihydric phenol and the constituent unit derived from the polyfunctional aromatic compound.

In the case of the melt transesterification process, a branched structure unit may be produced as a side reaction. The content of the branched structure unit is preferably 0.001 to 1 mol %, more preferably 0.005 to 0.9 mol %, much more preferably 0.01 to 0.8 mol % based on 100 mol % of the total of this unit and the constituent unit derived from the dihydric phenol. The content of the branched structure can be calculated by $^1$H-NMR measurement.

The aliphatic bifunctional carboxylic acid is preferably α,ω-dicarboxylic acid. Preferred examples of the aliphatic bifunctional carboxylic acid include linear saturated aliphatic dicarboxylic acids such as sebacic acid (decanedioic acid), dodecanedioic acid, tetradecanedioic acid, octadecanedioic acid and icosanedioic acid, and alicyclic dicarboxylic acids such as cyclohexanedicarboxylic acid. The bifunctional alcohol is preferably an alicyclic diol such as cyclohexanedimethanol, cyclohexanediol or tricyclodecanedimethanol.

A reaction system such as interfacial polymerization, melt transesterification, the solid-phase transesterification of a carbonate prepolymer or the ring-opening polymerization of a cyclic carbonate compound all of which are processes for producing a polycarbonate-based resin is well known through documents and patent publications.

For the manufacture of the resin composition of the present invention, the viscosity average molecular weight (M) of the polycarbonate-based resin is preferably $1.8 \times 10^4$ to $4.0 \times 10^4$, more preferably $2.0 \times 10^4$ to $3.5 \times 10^4$, much more preferably $2.2 \times 10^4$ to $3.0 \times 10^4$. Satisfactory mechanical properties may not be obtained from a polycarbonate-based resin having a viscosity average molecular weight lower than $1.8 \times 10^4$, and the appearance and tape peeling resistance may deteriorate due to a small difference in melt viscosity from the polyolefin resin. A resin composition obtained from a polycarbonate-based resin having a viscosity average molecular weight higher than $4.0 \times 10^4$ is inferior in versatility as it has low flowability at the time of injection molding.

The polycarbonate-based resin may be obtained by mixing a polycarbonate-based resin having a viscosity average molecular weight outside the above range. Particularly a polycarbonate-based resin having a viscosity average molecular weight higher than the above range ($5.0 \times 10^4$) improves the entropy elasticity of a resin. As a result, it exhibits high moldability in gas assist molding and foam molding which are used to form a reinforced resin material into a structural member. The moldability improvement of this polycarbonate is higher than that of the above branched polycarbonate. As a more preferred example, a polycarbonate-based resin (component A-1-1) (may be referred to as "high-molecular weight component-containing polycarbonate-based resin" hereinafter) which consists of a polycarbonate-based resin having a viscosity average molecular weight of $7 \times 10^4$ to $3 \times 10^5$ (component A-1-1-1) and an aromatic polycarbonate resin having a viscosity average molecular weight of $1 \times 10^4$ to $3 \times 10^4$ (component A-1-1-2) and has a viscosity average molecular weight of $1.6 \times 10^4$ to $3.5 \times 10^4$ may also be used as the component A.

In the above high-molecular weight component-containing polycarbonate-based resin (component. A-1-1), the molecular weight of the component A-1-1-1 is preferably $7 \times 10^4$ to $2 \times 10^5$, more preferably $8 \times 10^4$ to $2 \times 10^5$, much more preferably $1 \times 10^5$ to $2 \times 10^5$, particularly preferably $1 \times 10^5$ to $1.6 \times 10^5$. The molecular weight of the component A-1-1-2 is preferably $1 \times 10^4$ to $2.5 \times 10^4$, more preferably $1.1 \times 10^4$ to $2.4 \times 10^4$, much more preferably $1.2 \times 10^4$ to $2.4 \times 10^4$, particularly preferably $1.2 \times 10^4$ to $2.3 \times 10^4$.

The high-molecular weight component-containing polycarbonate-based resin (component A-1-1) can be obtained by mixing together the above components A-1-1-1 and A-1-1-2 in various ratios and adjusting the ratio to satisfy a predetermined molecular weight range. The content of the component A-1-1-1 is preferably 2 to 40 wt %, more preferably 3 to 30 wt %, much more preferably 4 to 20 wt %, particularly preferably 5 to 20 wt % based on 100 wt % of the component A-1-1.

To prepare the component A-1-1, (1) a method in which the component A-1-1-1 and the component A-1-1-2 are polymerized independently and mixed together, (2) a method in which an aromatic polycarbonate resin is produced by employing a method of producing an aromatic polycarbonate resin showing a plurality of polymer peaks in a molecular weight distribution chart by a CPC process as typified by the method disclosed by JP-A 5-306336 in the same system to ensure that the aromatic polycarbonate resin satisfies the conditions of the component A-1-1 of the present invention, or (3) a method in which the aromatic polycarbonate resin obtained by the above production method (2) is mixed with the component A-1-1-1 and/or the component A-1-1-2 produced separately may be employed.

The viscosity average molecular weight M in the present invention is calculated based on the following equation from specific viscosity ($\eta_{sp}$) which is obtained from a solution prepared by dissolving 0.7 g of the polycarbonate-based resin in 100 ml of methylene chloride at 20° C. with an Ostwald viscometer based on the following equation.

Specific viscosity $(\eta_{sp}) = (t-t_0)/t_0$

[$t_0$ is a time (seconds) required for the dropping of methylene chloride and t is a time (seconds) required for the dropping of a sample solution]

$\eta_{sp}/c = [\eta] + 0.45 \times [\eta]^2 c$ ([η] represents an intrinsic viscosity)

$[\eta] = 1.23 \times 10^{-4} M^{0.83}$ $c-0.7$

The viscosity average molecular weight of the polycarbonate-based resin (component A) in the resin composition of the present invention is calculated by the following procedure. That is, the composition is mixed with methylene chloride in a weight ratio of 1:20 to 1:30 to dissolve soluble matter contained in the composition. The soluble matter is collected by cerite filtration. Thereafter, the solvent contained in the obtained solution is removed. After the removal of the solvent, solid matter is dried completely so as to obtain a methylene chloride-soluble solid. The specific viscosity at 20° C. is obtained from a solution prepared by dissolving 0.7 g of the solid in 100 ml of methylene chloride as described above so as to calculate the viscosity average molecular weight M therefrom as described above.

A polycarbonate-polydiorganosiloxane copolymer resin may also be used as the polycarbonate-based resin (component A). The polycarbonate-polydiorganosiloxane copolymer resin is preferably a copolymer resin prepared by copolymerizing a dihydric phenol represented by the following general formula (1) and a hydroxyaryl-terminated polydiorganosiloxane represented by the following general formula (3).

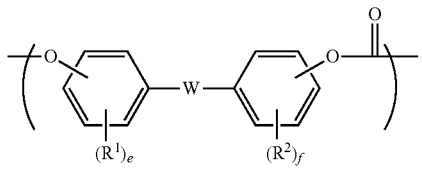
(1)

[In the above general formula (1), $R^1$ and $R^2$ are each independently a group selected from the group consisting of hydrogen atom, halogen atom, alkyl group having 1 to 18 carbon atoms, alkoxy group having 1 to 18 carbon atoms, cycloalkyl group having 6 to 20 carbon atoms, cycloalkoxy group having 6 to 20 carbon atoms, alkenyl group having 2 to 10 carbon atoms, aryl group having 6 to 14 carbon atoms, aryloxy group having 6 to 14 carbon atoms, aralkyl group having 7 to 20 carbon atoms, aralkyloxy group having 7 to 20 carbon atoms, nitro group, aldehyde group, cyano group and carboxyl group, when there are a plurality of $R^1$'s and a plurality of $R^2$'s, they may be the same or different, "e" and "f" are each an integer of 1 to 4, and W is a single bond or at least one group selected from the group consisting of groups represented by the following general formulas (2).

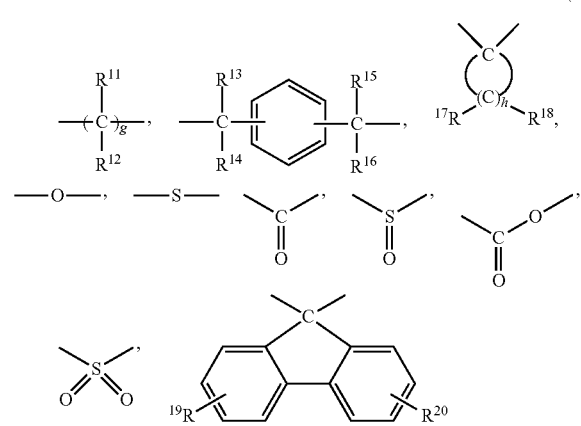
(2)

[In the above formulas (2), $R^{11}$, $R^{12}$, $R^{13}$, $R^{14}$, $R^{15}$, $R^{16}$, $R^{17}$ and $R^{18}$ are each independently a group selected from the group consisting of hydrogen atom, alkyl group having 1 to 18 carbon atoms, aryl group having 6 to 14 carbon atoms and aralkyl group having 7 to 20 carbon atoms, $R^{19}$ and $R^{20}$ are each independently a group selected from the group consisting of hydrogen atom, halogen atom, alkyl group having 1 to 18 carbon atoms, alkoxy group having 1 to 10 carbon atoms, cycloalkyl group having 6 to 20 carbon atoms, cycloalkoxy group having 6 to 20 carbon atoms, alkenyl group having 2 to 10 carbon atoms, aryl group having 6 to 14 carbon atoms, aryloxy group having 6 to 10 carbon atoms, aralkyl group having 7 to 20 carbon atoms, aralkyloxy group having 7 to 20 carbon atoms, nitro group, aldehyde group, cyano group and carboxyl group, when there are a plurality of $R^{19}$'s and a plurality of $R^{20}$'s, they may be the same or different, "g" is an integer of 1 to 10, and "h" is an integer of 4 to 7.]

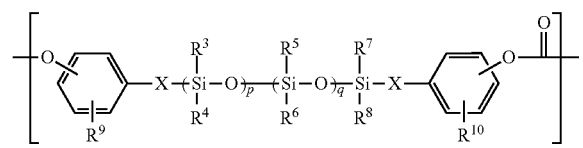
(3)

[In the above formula (3), $R^3$, $R^4$, $R^5$, $R^6$, $R^7$ and $R^8$ are each independently a hydrogen atom, alkyl group having 1 to 12 carbon atoms, or substituted or nonsubstituted aryl group having 6 to 12 carbon atoms, $R^9$ and $R^{10}$ are each independently a hydrogen atom, halogen atom, alkyl group having 1 to 10 carbon atoms or alkoxy group having 1 to 10 carbon atoms, "p" is a natural number, "q" is 0 or natural number, and (p+q) is a natural number of 10 to 300. X is a divalent aliphatic group having 2 to 8 carbon atoms.]

Examples of the dihydric phenol (I) represented by the general formula (1) include 4,4'-dihydroxybiphenyl, bis(4-hydroxyphenyl)methane, 1,1-bis(4-hydroxyphenyl)ethane, 1,1-bis(4-hydroxyphenyl)-1-phenylethane, 2,2-bis(4-hydroxyphenyl)propane, 2,2-bis(4-hydroxy-3-methylphenyl)propane, 1,1-bis(4-hydroxyphenyl)-3,3,5-trimethylcyclohexane, 2,2-bis(4-hydroxy-3,3'-biphenyl)propane, 2,2-bis(4-hydroxy-3-isopropylphenyl)propane, 2,2-bis(3-t-butyl-4-hydroxyphenyl)propane, 2,2-bis(4-hydroxyphenyl)butane, 2,2-bis(4-hydroxyphenyl)octane, 2,2-bis(3-bromo-4-hydroxyphenyl)propane, 2,2-bis(3,5-dimethyl-4-hydroxyphenyl)propane, 2,2-bis(3-cyclohexyl-4-hydroxyphenyl)propane, 1,1-bis(3-cyclohexyl-4-hydroxyphenyl)cyclohexane, bis(4-hydroxyphenyl)diphenylmethane, 9,9-bis(4-hydroxyphenyl)fluorene, 9,9-bis(4-hydroxy-3-methylphenyl)fluorene, 1,1-bis(4-hydroxyphenyl)cyclohexane, 1,1-bis(4-hydroxyphenyl)cyclopentane, 4,4'-dihydroxydiphenyl ether, 4,4'-dihydroxy-3,3'-dimethyldiphenyl ether, 4,4'-sulfonyldiphenol, 4,4'-dihydroxydiphenyl sulfoxide, 4,4'-dihydroxydiphenyl sulfide, 2,2'-dimethyl-4,4'-sulfonyldiphenol, 4,4'-dihydroxy-3,3'-dimethyldiphenyl sulfoxide, 4,4'-dihydroxy-3,3'-dimethyldiphenyl sulfide, 2,2'-diphenyl-4,4'-sulfonyl diphenyl, 4,4'-dihydroxy-3,3'-diphenyldiphenyl sulfoxide, 4,4'-dihydroxy-3,3'-diphenyldiphenyl sulfide, 1,3-bis{2-(4-hydroxyphenyl)propyl}benzene, 1,4-bis{2-(4-hydroxyphenyl)propyl}benzene, 1,4-bis(4-hydroxyphenyl)cyclohexane, 1,3-bis(4-hydroxyphenyl)cyclohexane, 4,8-bis(4-hydroxyphenyl)tricyclo[5.2.1.02,6]decane, 4,4'-(1,3-adamantanediyl)diphenol and 1,3-bis(4-hydroxyphenyl)-5,7-dimethyladamantane.

Out of these, 1,1-bis(4-hydroxyphenyl)-1-phenylethane, 2,2-bis(4-hydroxyphenyl)propane, 2,2-bis(4-hydroxy-3-methylphenyl)propane, 1,1-bis(4-hydroxyphenyl)cyclohexane, 1,1-bis(4-hydroxyphenyl)-3,3,5-trimethylcyclohexane, 4,4'-sulfonyldiphenol, 2,2'-dimethyl-4,4'-sulfonyldiphenol, 9,9-bis(4-hydroxy-3-methylphenyl)fluorene, 1,3-bis{2-(4-hydroxyphenyl)propyl}benzene and 1,4-bis{2-(4-hydroxyphenyl)propyl}benzene are preferred. 2,2-bis(4-hydroxyphenyl)propane, 1,1-bis(4-hydroxyphenyl)cyclohexane (BPZ), 4,4'-sulfonyldiphenol and 9,9-bis(4-hydroxy-3-methylphenyl)fluorene are particularly preferred. 2,2-bis(4-hydroxyphenyl)propane having excellent strength and high durability is most preferred. They may be used alone or in combination of two or more.

As the hydroxyaryl-terminated polydiorganosiloxane represented by the above general formula (3), the following compounds are preferably used.

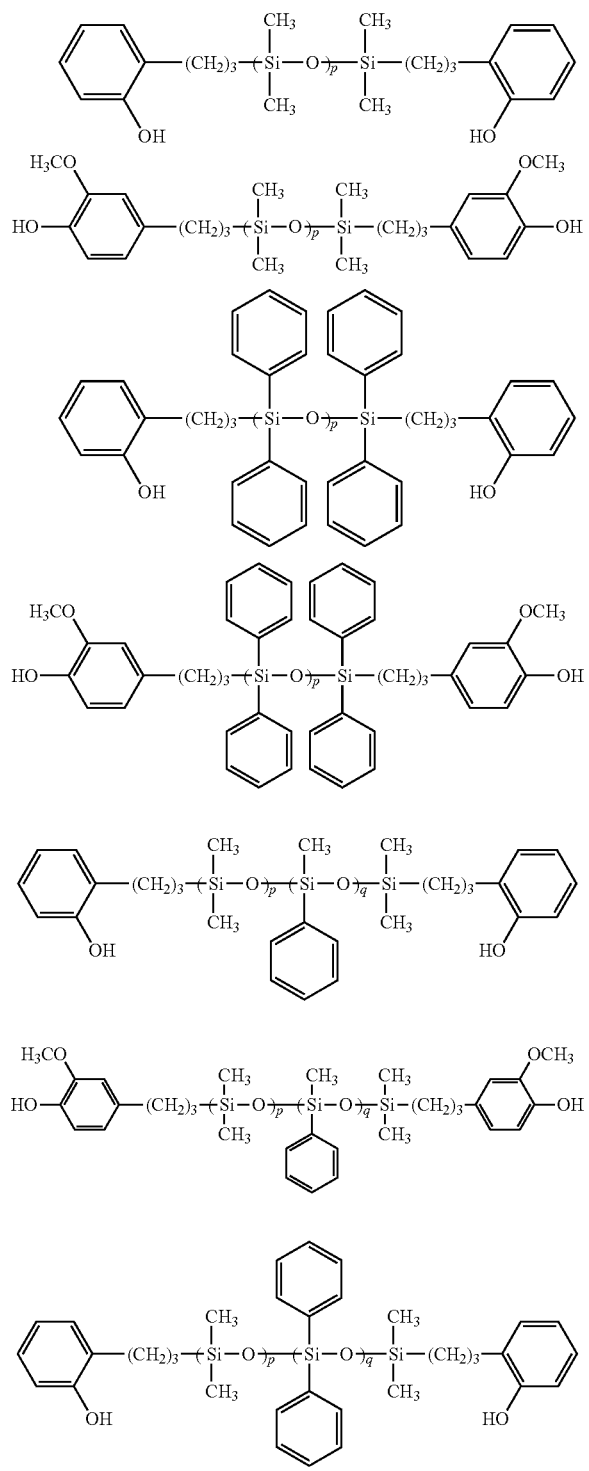

The hydroxyaryl-terminated polydiorganosiloxane (II) is easily produced by hydrosilylating a phenol having an olefinic unsaturated carbon-carbon bond, preferably vinyl phenol, 2-allylphenol, isopropenyl phenol or 2-methoxy-4-allylphenol to the end of a polysiloxane chain having a predetermined polymerization degree. (2-allylphenol)-terminated polydiorganosiloxanes and (2-methoxy-4-allylphenol)-terminated polydiorganosiloxanes are preferred, and (2-allylphenol)-terminated polydimethylsiloxane and (2-methoxy-4-allylphenol)-terminated polydimethylsiloxane are particularly preferred. The molecular weight distribution (Mw/Mn) of the hydroxyaryl-terminated polydiorganosiloxane (II) is preferably not more than 3. To develop more excellent low-outgas properties at the time of high-temperature molding and low-temperature impact resistance, the molecular weight distribution (Mw/Mn) is more preferably not more than 2.5, much more preferably not more than 2. When the molecular weight distribution exceeds the upper limit of the above preferred range, the amount of a gas generated at the time of high-temperature molding becomes large and low-temperature impact resistance may deteriorate.

The diorganosiloxane polymerization degree (p+q) of the hydroxyaryl-terminated polydiorganosiloxane (II) is suitably 10 to 300 to obtain high impact resistance. The diorganosiloxane polymerization degree (p+q) is preferably 10 to 200, more preferably 12 to 150, much more preferably 14 to 100. Below the lower limit of the above preferred range, impact resistance which is the characteristic property of the polycarbonate-polydiorganosiloxane copolymer is not effectively developed, and above the upper limit of the above preferred range, a poor appearance is obtained.

The content of the polydiorganosiloxane is preferably 0.1 to 50 wt % based on the total weight of the polycarbonate-polydiorganosiloxane copolymer resin used as the component A. The content of the polydiorganosiloxane component is more preferably 0.5 to 30 wt %, much more preferably 1 to 20 wt %. Above the lower limit of the above preferred range, impact resistance and flame retardancy become excellent, and below the upper limit of the above preferred range, a stable appearance which is hardly affected by molding conditions is readily obtained. The polymerization degree of the polydiorganosiloxane and the content of the polydiorganosiloxane can be calculated by $^1$H-NMR measurement.

Hydroxyaryl-terminated polydiorganosiloxanes (II) may be used alone or in combination of two or more. As long as the present invention is not impeded, a comonomer except for the dihydric phenol (I) and the hydroxyaryl-terminated polydiorganosiloxane (II) may be used in an amount of not more than 10 wt % based on the total weight of the copolymer.

A mixed solution containing an oligomer having a terminal chloroformate group is prepared through a reaction between the dihydric phenol (I) and a carbonate ester forming compound in a mixed solution of a water-insoluble organic solvent and an alkali aqueous solution in advance.

To produce the oligomer of the dihydric phenol (I), the whole amount of the dihydric phenol (I) in use may be changed to the oligomer at a time, or part thereof as a post-addition monomer may be added as a reaction raw material in a post-stage of an interfacial polycondensation reaction. The term "post-addition monomer" means that a monomer is added to accelerate the post-stage of the polycondensation reaction and does not need to be added when not required. This oligomer production reaction system is not particularly limited but preferably system in which the reaction is carried out in a solvent in the presence of an acid binder.

The amount of the carbonate ester forming compound may be suitably adjusted in consideration of the stoichiometric ratio (equivalent) of the reaction. When a gaseous carbonate ester forming compound such as phosgene is used, it is preferably blown into the reaction system.

As the acid binder may be used an alkali metal hydroxide such as sodium hydroxide or potassium hydroxide, an alkali metal carbonate such as sodium carbonate or potassium carbonate, an organic base such as pyridine, or a mixture thereof. The amount of the acid binder may be suitably determined in consideration of the stoichiometric ratio (equivalent) of the reaction likewise. Stated more specifically, 2 equivalents or a little more than that of the acid binder is preferably used based on the number of moles (1 mole is generally equivalent to 2 equivalents) of the dihydric phenol (I) used for the formation of the oligomer.

As the solvent, solvents which are inactive to reactions such as known solvents used to produce polycarbonates may be used alone or as a mixture. Typical examples of the solvent include hydrocarbon solvents such as xylene and halogenated hydrocarbon solvents such as methylene chloride and chlorobenzene. Halogenated hydrocarbon solvents such as methylene chloride are particularly preferably used.

Although the reaction pressure for producing the oligomer is not particularly limited and may be normal pressure, increased pressure or reduced pressure, the reaction is advantageously carried out under normal pressure. The reaction temperature is selected from a range of –20 to 50° C., and water cooling or ice cooling is desirably carried out as heat is generated by polymerization in most cases. Although the reaction time is affected by other conditions and cannot be specified unconditionally, it is generally 0.2 to 10 hours. The pH range of the oligomer production reaction is the same as that of a known interfacial reaction and always adjusted to not less than 10.

Thus, the polycarbonate-polydiorganosiloxane copolymer is obtained by obtaining a mixed solution containing the oligomer of the dihydric phenol (I) having a terminal chloroformate group, adding the highly purified hydroxyaryl-terminated polydiorganosiloxane (II) represented by the general formula (4) having a molecular weight distribution (Mw/Mn) of not more than 3 while the mixed solution is stirred and carrying out the interfacial polycondensation of the hydroxyaryl-terminated polydiorganosiloxane (II) and the oligomer.

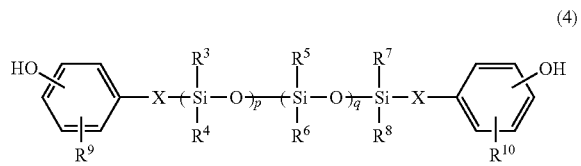

(4)

(In the above formula (4), $R^3$, $R^4$, $R^5$, $R^6$, $R^7$ and $R^8$ are each independently a hydrogen atom, alkyl group having 1 to 12 carbon atoms, or substituted or nonsubstituted aryl group having 6 to 12 carbon atoms, $R^9$ and $R^{10}$ are each independently a hydrogen atom, halogen atom, alkyl group having 1 to 10 carbon atoms, or alkoxy group having 1 to 10 carbon atoms, "p" is a natural number, "q" is 0 or natural number and (p+q) is a natural number of 10 to 300. X is a divalent aliphatic group having 2 to 8 carbon atoms.)

For the interfacial polycondensation reaction, an acid binder may be suitably added in consideration of the stoichiometric ratio (equivalent) of the reaction. As the acid binder, for example, an alkali metal hydroxide such as sodium hydroxide or potassium hydroxide, an alkali metal carbonate such as sodium carbonate or potassium carbonate, an organic base such as pyridine, or a mixture thereof may be used. Stated more specifically, when the hydroxyaryl-terminated polydiorganosiloxane (II) in use or part of the dihydric phenol (1) as a post-addition monomer is added in this reaction stage, 2 equivalents or more than that of an alkali is preferably used based on the total number of moles (1 mole is generally equivalent to 2 equivalents) of the post-addition dihydric phenol (I) and the hydroxyaryl-terminated polydiorganosiloxane (II).

Polycondensation by an interfacial polycondensation reaction between the oligomer of the dihydric phenol (I) and the hydroxyaryl-terminated polydiorganosiloxane (II) is carried out by stirring the above mixed solution violently.

In the polycondensation reaction, an end sealing agent or a molecular weight control agent is generally used. Examples of the end sealing agent include compounds having a monovalent phenolic hydroxyl group such as ordinary phenol, p-tert-butylphenol, p-cumylphenol and tribromophenol, long-chain alkyl phenols, aliphatic carboxylic acid chlorides, aliphatic carboxylic acids, hydroxybenzoic acid alkyl esters, hydroxyphenyl alkyl acid esters and alkyl ether phenols. The amount of the end sealing agent is 100 to 0.5 mole, preferably 50 to 2 moles based on 100 moles of the total of all the dihydric phenol-based compounds. Two or more of the above compounds may be used in combination as a matter of course.

To promote the polycondensation reaction, a catalyst such as a tertiary amine exemplified by triethylamine or a quaternary ammonium salt may be added.

The reaction time of the polycondensation reaction is preferably not less than 30 minutes, more preferably not less than 50 minutes. A small amount of an antioxidant such as sodium sulfide or hydrosulfide may be added as desired.

A branching agent may be used in combination with the above dihydric phenol-based compound to obtain a branched polycarbonate-polydiorganosiloxane. Examples of the polyfunctional aromatic compound having 3 or more functional groups used for the branched polycarbonate-polydiorganosiloxane copolymer resin include phloroglucin, phloroglucide and trisphenols such as 4,6-dimethyl-2,4,6-tris(4-hydroxydiphenyl)heptene-2, 2,4,6-trimethyl-2,4,6-tris(4-hydroxyphenyl)heptane, 1,3,5-tris(4-hydroxyphenyl)benzene, 1,1,1-tris(4-hydroxyphenyl)ethane, 1,1,1-tris(3,5-dimethyl-4-hydroxyphenyl)ethane, 2,6-bis(2-hydroxy-5-methylbenzyl)-4-methylphenol and 4-{4-[1,1-bis(4-hydroxyphenyl)ethyl]benzene)-α,α-dimethylbenzyl phenol. Tetra(4-hydroxyphenyl)methane, bis(2,4-dihydroxyphenyl)ketone and 1,4-bis(4,4-dihydroxytriphenylmethyl)benzene are also included. Trimellitic acid, pyromellitic acid, benzophenonetetracarboxylic acid and acid chlorides thereof are further included. Out of these, 1,1,1-tris(4-hydroxyphenyl)ethane and 1,1,1-tris(3,5-dimethyl-4-hydroxyphenyl) ethane are preferred, and 1,1,1-tris(4-hydroxyphenyl)ethane is particularly preferred.

The amount of the polyfunctional compound in the branched polycarbonate-polydiorganosiloxane copolymer resin is preferably 0.001 to 1 mol %, more preferably 0.005 to 0.9 mol %, much more preferably 0.01 to 0.8 mol %, particularly preferably 0.05 to 0.4 mol % based on the whole amount of the aromatic polycarbonate-polydiorganosiloxane copolymer resin. The amount of the branched structure can be calculated by $^1$H-NMR measurement.

The reaction pressure may be reduced pressure, normal pressure or increased pressure but preferably normal pressure or the pressure of reaction system itself. The reaction temperature is selected from a range of −20 to 50° C., and water cooling or ice cooling is desirably carried out as heat is generated by polymerization in most cases. Since the reaction time differs according to other conditions such as the reaction temperature, it cannot be specified unconditionally but generally 0.5 to 10 hours.

According to circumstances, a polycarbonate-polydiorganosiloxane copolymer resin having a desired reduced viscosity [$\eta_{sp}$/C] may be acquired by carrying out a suitable physical treatment (mixing, fractionating) and/or chemical treatment (polymer reaction, crosslinking, partial decomposition) on the obtained polycarbonate-polydiorganosiloxane copolymer resin.

The obtained reaction product (crude product) is subjected to a known post-treatment such as separation and purification to collect a polycarbonate-polydiorganosiloxane copolymer resin having a desired purity (degree of purification).

The average size of polydiorganosiloxane domains in a molded article of the polycarbonate-polydiorganosiloxane copolymer resin is preferably 1 to 40 nm. The average size is more preferably 1 to 30 nm, much more preferably 5 to 25 nm. Below the lower limit of the preferred range, impact resistance and flame retardancy are not fully developed, and above the upper limit of the preferred range, impact resistance may not be developed stably. Thereby, a resin composition which is excellent in impact resistance and appearance is provided.

The average domain size of the polydiorganosiloxane domains in a molded article of the polycarbonate-polydiorganosiloxane copolymer resin was evaluated by a small-angle X-ray scattering (SAXS) method. The small-angle X-ray scattering method is a method for measuring diffuse scattering and diffraction produced in a small-angle area having a scattering angle (2θ) of less than 10°. In this small-angle X-ray scattering method, when there are areas having a difference of about 1 to 100 nm in electron density in a substance, the diffuse scattering of X-rays is measured due to the electron density difference. The particle diameter of an object to be measured is obtained based on this scattering angle and scattering intensity. In the case of a polycarbonate-polydiorganosiloxane copolymer resin having an aggregation structure in which polydiorganosiloxane domains are dispersed in the matrix of a polycarbonate polymer, the diffuse scattering of X-rays occurs due to a difference in electron density between the polycarbonate matrix and the polydiorganosiloxane domains.

A small-angle X-ray scattering profile is measured by measuring scattering intensity I at each scattering angle (2θ) of less than 10°, and simulation is carried out from temporary particle diameter and temporary particle size distribution models by using commercially available analyzing software based on the assumption that the polydiorganosiloxane domains are spherical domains and there are variations in particle size distribution so as to obtain the average size of the polydiorganosiloxane domains. According to the small-angle X-ray scattering method, the average size of the polydiorganosiloxane domains dispersed in the matrix of the polycarbonate polymer which cannot be accurately measured by observation through a transmission electron microscope can be measured easily and accurately with high reproducibility. The term "average domain size" means the number average of individual domain sizes.

The terms "average domain size" is a measurement value obtained by measuring a 1.0 mm-thick part of a manufactured three-stage plate by the small-angle X-ray scattering method. Analysis was conducted with isolated particle models which do not take interaction between particles (interference between particles) into consideration.

<Component B: Polyolefin-Based Resin>

The resin composition of the present invention comprises a polyolefin-based resin having a MFR at 230° C. under a load of 2.16 kg of not less than 40 g/10 min (component B).

The polyolefin-based resin (component B) is a synthetic resin obtained by polymerizing or copolymerizing an olefin-based monomer having a radically polymerizable double bond. Examples of the olefin-based monomer include α-olefins such as ethylene, propylene, 1-butene, 1-pentene, 1-hexene, 1-heptene, 1-octene and 4-methyl-1-pentene, and conjugated dienes such as butadiene and isoprene. The olefin-based monomers may be used alone or in combination of two or more.

Examples of the polyolefin-based resin (component B) include ethylene homopolymers, copolymers of ethylene and another α-olefin except for ethylene, propylene homopolymers, copolymers of propylene and another α-olefin except for propylene, butene homopolymers, and homopolymers and copolymers of conjugated dienes such as butadiene and isoprene. Propylene homopolymers and copolymers of propylene and another α-olefin except for propylene are preferred. Propylene homopolymers are more preferred. The polyolefin-based resins may be used alone or in combination of two or more.

From the viewpoints of versatility and stiffness, a polypropylene-based resin is more preferably used in the present invention. Although the polypropylene resin is a propylene polymer, it includes a copolymer of propylene and another monomer in the present invention. Examples of the polypropylene resin include homopolypropylene resins, block copolymers of propylene, ethylene and an α-olefin having 4 to 10 carbon atoms (may also be called "block polypropylene"), and random copolymers of propylene, ethylene and an α-olefin having 4 to 10 carbon atoms (may also be called "random polypropylene"). The block polypropylenes and the random polypropylenes are collectively called "polypropylene copolymers".

The above homopolypropylene resins, the block polypropylenes and the random polypropylenes may be used alone or in combination of two or more as the polypropylene resin, and the homopolypropylenes and the block polypropylenes are preferred.

Examples of the α-olefin having 4 to 10 carbon atoms used in the polypropylene copolymers include 1-butene, 1-pentene, isobutylene, 3-methyl-1-butene, 1-hexene, 3,4-dimethyl-1-butene, 1-heptene and 3-methyl-1-hexene.

The content of ethylene in the polypropylene copolymer is preferably not more than 5 mass % based on the total of all the monomers. The content of the α-olefin having 4 to 10 carbon atoms in the polypropylene copolymer is preferably not more than 20 mass % based on the total of all the monomers. The polypropylene copolymer is preferably a copolymer of propylene and ethylene, or a copolymer of propylene and 1-butene, particularly preferably a copolymer of propylene and ethylene.

The melt flow rate (230° C., 2.16 kg) of the polyolefin-based resin (component B) is not less than 40 g/10 min, preferably not less than 50 q/10 min, much more preferably not less than 60 g/10 min. When the melt flow rate of the polypropylene resin is less than 40 g/10 min, the appearance and tape peeling resistance deteriorate though high mechanical properties are developed. The upper limit of the melt flow rate is not particularly limited but preferably not more than 300 g/10 min from the viewpoint of mechanical properties. The melt flow rate is also called "MFR". MFR is measured in accordance with ISO1133.

In the present invention, a modified polyolefin-based resin may be used alone as the polyolefin-based resin (component B). The polyolefin-based resin may be used in combination with the modified polyolefin-based resin. The modified polyolefin resin is a polyolefin-based resin which is modified and has a polar group. The polar group to be modified is at least one functional group selected from the group consisting of acidic groups such as epoxy group, glycidyl group and carboxyl group, and acid derivatives such as acid anhydride groups.

More specifically, a polyolefin-based resin obtained by copolymerizing a monomer having a polar group such as epoxy group, carboxyl group or acid anhydride group with the above polyolefin-based resin may be preferably used. Further, a graft copolymerized polyolefin-based resin may be more preferably used. Preferred examples of the monomer having an epoxy group include glycidyl methacrylate, butyl glycidyl maleate, butyl glycidyl fumarate, propyl glycidyl fumarate, glycidyl acrylate and N-(4-(2,3-epoxy)-3,5-dimethyl)acrylamide. Examples of the monomer having a carboxyl group include acrylic acid, methacrylic acid and maleic acid. Examples of the monomer containing an acid anhydride include maleic anhydride, itaconic anhydride and citraconic anhydride. Out of the above monomers having a polar group, acrylic acid and maleic anhydride are preferred from the viewpoints of reactivity and acquisition ease.

The melt flow rate (190° C., 2.16 kg) of the modified polyolefin-based resin is preferably not less than 50 g/10 min, more preferably not less than 100 g/10 min, particularly preferably not less than 150 g/10 min. When the melt flow rate (190° C., 2.16 kg) of the modified polyolefin-based resin is less than 50 g/10 min, a good appearance and tape peeling resistance may not be obtained. The amount of the modified polyolefin-based resin is preferably 0 to 100 wt %, more preferably 1 to 50 wt %, much more preferably 2 to 10 wt % based on the component B.

The content of the polyolefin-based resin (component B) is preferably 5 to 50 parts by weight, more preferably 10 to 45 parts by weight, much more preferably 15 to 40 parts by weight based on 100 parts by weight of the total of the components A and B. When the content of the component B is lower than 5 parts by weight, chemical resistance may not be obtained and when the content is higher than 50 parts by weight, mechanical properties may greatly deteriorate.

<Component C: Styrene-Based Thermoplastic Elastomor>

The resin composition of the present invention comprises at least one styrene-based thermoplastic elastomer (component C) selected from the group consisting of a styrene-ethylene.propylene-styrene block copolymer (SEPS), a styrene-ethylene.butylene-styrene block copolymer (SEBS) and a styrene-butadiene.butylene-styrene block copolymer (SBBS).

The content of the styrene block in the styrene-based thermoplastic elastomer (component C) is 40 to 80 wt %, more preferably 45 to 75 wt %, much more preferably 50 to 70 wt %. When this content is lower than 40 wt %, a compatibility improving effect lowers and the mechanical properties, chemical resistance and tape peeling resistance of the resin composition are hardly obtained. When the content is higher than 80 wt %, moldability and impact strength may degrade disadvantageously.

The weight average molecular weight of the styrene-based thermoplastic elastomer (component C) is preferably not more than 250,000, more preferably not more than 200,000, much more preferably not more than 150,000. When the weight average molecular weight is higher than 250,000, moldability lowers and dispersibility in the resin composition may degrade. The lower limit of the weight average molecular weight is not particularly limited but preferably not less than 40,000, more preferably not less than 50,000. The weight average molecular weight was measured by the following method. That is, the weight average molecular weight was calculated by measuring molecular weight in terms of polystyrene by gel permeation chromatography.

The melt flow rate (230° C., 2.16 kg) of the styrene-based thermoplastic elastomer (component C) is preferably 0.1 to 10 g/10 min, more preferably 0.15 to 9 g/10 min, particularly preferably 0.2 to 8 g/10 min. When the melt flow rate of the styrene-based thermoplastic elastomer (component C) is lower than 0.1 g/10 min or higher than 10 g/10 min, satisfactory toughness may not be obtained. MFR was measured at 230° C. under a load of 2.16 kg in accordance with ISO1133.

The content of the styrene-based thermoplastic elastomer (component C) is 1 to 20 parts by weight, preferably 2 to 18 parts by weight, more preferably 3 to 15 parts by weight based on 100 parts by weight of the total of the components A and B. By adding the component C, impact resistance, chemical resistance, appearance and tape peeling resistance are further improved. When the content is lower than 1 part by weight, these characteristic properties are not developed and when the content is higher than 20 parts by weight, stiffness degrades. In the present invention, the styrene-based thermoplastic elastomer (component C) is preferably not modified, for example, by graft polymerization with a hydroxyl group-containing compound or an unsaturated compound.

<Component D: Graft Polymer>

The resin composition of the present invention may comprise a graft polymer (component D). Out of graft polymers, a core-shell type graft polymer is preferred as an impact modifier. The core-shell type graft polymer is a graft copolymer obtained by copolymerizing a rubber component having a glass transition temperature of 10° C. or lower as a core and one or more monomers selected from aromatic vinyl, vinyl cyanide, acrylic acid ester, methacrylic acid ester and vinyl compound copolymerizable with these as a shell.

Examples of the rubber component of the core-shell type graft polymer include butadiene rubber, butadiene-acrylic composite rubber, acrylic rubber, acrylic-silicone composite rubber, isobutylene-silicone composite rubber, isoprene rubber, styrene-butadiene rubber, chloroprene rubber, ethylene-propylene rubber, nitrile rubber, ethylene-acrylic rubber, silicone rubber, epichlorohydrin rubber, fluorine rubber and rubbers obtained by adding hydrogen to the unsaturated bonds of these. A rubber component containing no halogen atom is preferred from the viewpoint of an environmental load due to anxiety about the generation of a harmful substance at the time of combustion. The glass transition temperature of the rubber component is preferably −10° C. or lower, more preferably −30° C. or lower. The rubber component is preferably butadiene rubber, butadiene-acrylic composite rubber, acrylic rubber or acrylic-silicone composite rubber. The composite rubber is a rubber obtained by copolymerizing two different rubber components or a polymerized rubber having an TPN structure that two different rubber components are intertwined with each other such that they cannot be separated from each other. The weight average particle diameter of the core in the core-shell type graft polymer is preferably 0.05 to 0.8 μm, more preferably 0.1 to 0.6 μm, much more preferably 0.15 to 0.5 μm. When the particle diameter is in the range of 0.05 to 0.8 μm, high impact resistance is obtained.

Examples of the aromatic vinyl in the vinyl compound to be copolymerized as the shell of the core-shell type graft polymer with the rubber component include styrene, α-methylstyrene, p-methylstyrene, alkoxystyrene and halogenated styrene. Examples of the acrylic acid ester include methyl acrylate, ethyl acrylate, butyl acrylate, cyclohexyl acrylate and octyl acrylate. Examples of the methacrylic acid ester include methyl methacrylate, ethyl methacrylate, butyl methacrylate, cyclohexyl methacrylate and octyl methacrylate. Out of these, methyl methacrylate is particularly preferred. Preferably, the core-shell type graft polymer comprises a methacrylic acid ester such as methyl methacrylate as an essential component. From the viewpoints of mechanical properties and thermal stability, more preferably, it does not comprise an aromatic vinyl component. This is because the core-shell type graft polymer has excellent affinity for the aromatic polycarbonate resin, whereby a large amount of the rubber component is existent in the aromatic polycarbonate resin, and the high impact resistance of the aromatic polycarbonate resin is developed more effectively with the result that the impact resistance of the resin composition becomes high.

Stated more specifically, the methacrylic acid ester is contained in an amount of not less than 10 wt %, more preferably not less than 15 wt % based on 100 wt % of the graft component (100 wt % of the shell in the core-shell type polymer). An elastic polymer containing a rubber component having a glass transition temperature of 10° C. or lower may be produced by bulk polymerization, solution polymerization, suspension polymerization or emulsion polymerization, and the copolymerization system may be one-stage graft or multi-stage graft copolymerization. It may be a mixture with a copolymer comprising only a graft component by-produced at the time of manufacture.

Further, a soap-free polymerization method using an initiator such as potassium persulfate, seed polymerization method or two-stage swelling polymerization method may also be used besides the general emulsion polymerization method. In the suspension polymerization method, a water phase and a monomer phase are separately kept and supplied into a continuous disperser accurately to control the particle size by the revolution of the disperser. In the continuous production method, the particle size may be controlled by supplying a monomer phase into an aqueous solution having dispersion ability through a fine orifice or porous filter having an opening size of several to several tens of μm. In the case of the core-shell type graft polymer, the reaction may be carried out in a single stage or multiple stages for the core and the shell.

The polymer is commercially available and can be easily acquired. Polymers comprising butadiene rubber as the main rubber component include the Kane Ace M series (for example, M-711 comprising methyl methacrylate as the main shell component, M-701 comprising methyl methacrylate styrene as the main shell component) of Kaneka Corporation, the METABLEN C series (for example, C-223A comprising methyl methacrylate styrene as the main shell component) and E series (for example, E-860A comprising methyl methacrylate styrene as the main shell component) of Mitsubishi Rayon Co., Ltd. and the PARALOID EXL series (for example, EXL-2690 comprising methyl methacrylate as the main shell component) of Dow Chemical Company.

Polymers comprising acrylic rubber or butadiene-acrylic composite rubber as the main rubber component include W series (for example, W-600A comprising methyl methacrylate as the main shell component) and the PARALOID EXL series (for example, EXL-2390 comprising methyl methacrylate as the main shell component) of DOW Chemical Company.

Polymers comprising acrylic-silicone composite rubber as the main rubber component are commercially available from Mitsubishi Rayon Co., Ltd. under the trade names of the METABLEN S-2001 comprising methyl methacrylate as the main shell component and SRK-200A comprising acrylonitrile styrene as the main shell component.

The content of the graft polymer (component D) is preferably 1 to 10 parts by weight, more preferably 1 to 8 parts by weight, much more preferably 2 to 7 parts by weight based on 100 parts by weight of the total of the components A and B. Although mechanical properties and chemical resistance are further improved by adding the component D, when the content of the component D is higher than 10 parts by weight, stiffness may degrade.

<Component E: Flame Retardant>

The resin composition of the present invention may comprise a flame retardant (component E). Examples of the flame retardant (component E) include (i) a halogen-based flame retardant (component E-1, for example, brominated polycarbonate compound), (ii) a phosphorus-based flame retardant (component E-2, for example, monophosphate compound, phosphate oligomer compound, phosphonate oligomer compound, phosphonitrile oligomer compound, phosphonic acid amide compound and phosphazene compound), (iii) a metal salt-based flame retardant (component E-3, for example, organic sulfonic acid alkali (earth) metal salt, boric acid metal salt-based flame retardant and stannic acid metal salt-based flame retardant), and (iv) a silicone-based flame retardant composed of a silicone compound (component E-4).

Not only flame retardancy but also antistatic properties, fluidity, stiffness and thermal stability are improved by mixing a compound used as the flame retardant based on the properties of the compound.

The content of the flame retardant (component E) is preferably 0.01 to 30 parts by weight, more preferably 0.05 to 28 parts by weight, much more preferably 0.08 to 25 parts by weight based on 100 parts by weight of the total of the components A and B. When the content of the flame retardant (component E) is lower than 0.01 part by weight, satisfactory flame retardancy is not obtained and when the content is higher than 30 parts by weight, impact strength and chemical resistance may greatly degrade.

(Component E-1: Halogen-Based Flame Retardant)

As the halogen-based flame retardant (component E-1), a brominated polycarbonate (including an oligomer) is particularly preferred. The brominated polycarbonate has excellent heat resistance and can greatly improve flame retardancy. The brominated polycarbonate used in the present invention is a brominated polycarbonate compound which comprises a constituent unit represented by the following formula (5) in an amount of preferably at least 60 mol %, more preferably at least 80 mol %, particularly preferably substantially 100 mol % based on the total of all the constituent units.

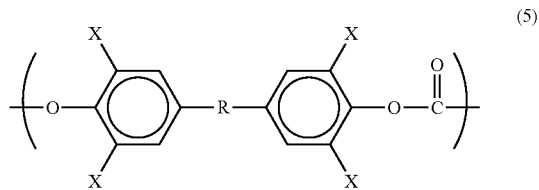

(5)

In the above formula (5), X is a bromine atom, R is an alkylene group having 1 to 4 carbon atoms, alkylidene group having 1 to 4 carbon atoms or $-SC_2-$.

In the formula (5), R is preferably a methylene group, ethylene group, isopropylidene group or $-SO_2-$, particularly preferably an isopropylidene group.

The brominated polycarbonate comprises only a small amount of the residual chloroformate group terminal and has a terminal chlorine content of preferably not more than 0.3 ppm, more preferably not more than 0.2 ppm. The terminal chlorine content can be obtained by dissolving a sample in methylene chloride, adding 4-(p-nitrobenzyl)pyridine to be reacted with terminal chlorine (terminal chloroformate) and measuring the terminal chlorine with an ultraviolet visible spectrophotometer (U-3200 of Hitachi, Ltd.). When the terminal chlorine content is not more than 0.3 ppm, the heat stability of the resin composition becomes higher and further high-temperature molding becomes possible with the result that a resin composition having more excellent moldability is provided.

The amount of the residual hydroxyl group terminal contained in the brominated polycarbonate is preferably small. More specifically, the amount of the terminal hydroxyl group is preferably not more than 0.0005 mole, more preferably not more than 0.0003 mole based on 1 mole of the constituent unit of the brominated polycarbonate. The amount of the terminal hydroxyl group can be obtained by dissolving a sample in heavy chloroform and measuring the resulting solution by the $^1$H-NMR method. When the amount of the terminal hydroxyl group falls within the above range, the heat stability of the resin composition is further improved advantageously.

The specific viscosity of the brominated polycarbonate is preferably 0.015 to 0.1, more preferably 0.015 to 0.08. The specific viscosity of the brominated polycarbonate is calculated based on the above specific viscosity calculation formula used to calculate the viscosity average molecular weight of the polycarbonate-based resin which is the above-described component A.

When a halogen-based flame retardant (component E-1) is used as the flame retardant, the content thereof is preferably 1 to 30 parts by weight, more preferably 2 to 27 parts by weight, much more preferably 3 to 25 parts by weight based on 100 parts by weight of the total of the components A and B.

The halogen-based flame retardant (component E-1) can further improve the flame retardancy of the resin composition when it is used in combination with an antimony oxide compound. As the antimony oxide compound may be used antimony trioxide, antimony tetraoxide, antimony pentoxide represented by $(NaO)p.(Sb_2O_5).qH_2O$ (p=0 to 1, q=0 to 4) and sodium antimonate. The antimony oxide compound is preferably used as a particle having a particle size of 0.02 to 5 μm.

The content of the antimony oxide compound is preferably 0.5 to 10 parts by weight, more preferably 1 to 5 parts by weight based on 100 parts by weight of the total of the components A and B. When the content of the antimony oxide compound is lower than 0.5 part by weight, the flame retarding effect of the composition becomes small due to a synergistic action with the halogen-based flame retardant (component E-1). When the content is higher than 10 parts by weight, the mechanical properties of the composition deteriorate.

(Component E-2: Phosphorus-Based Flame Retardant)

In the present invention, the phosphorus-based flame retardant (component E-2) contains a phosphorus atom in the molecule. Examples of the phosphorus-based flame retardant (component E-2) include organic phosphorus compounds such as phosphoric acid esters, condensed phosphoric acid esters and phosphazene compounds, and red phosphorus. The phosphoric acid esters are ester compounds of phosphoric acid and an alcohol compound or phenol compound. In the present invention, flame retardancy can be provided to the resin composition by mixing a phosphoric acid ester.

The phosphoric acid esters include trimethyl phosphate, triethyl phosphate, tributyl phosphate, tri(2-ethylhexyl) phosphate, tributoxyethyl phosphate, triphenyl phosphate, tricresyl phosphate, trixylenyl phosphate, tris(isopropylphenyl)phosphate, tris(phenylphenyl)phosphate, trinaphthyl phosphate, cresyldiphenyl phosphate, xylenyldiphenyl phosphate, diphenyl(2-ethylhexyl)phosphate, di(isopropylphenyl)phenyl phosphate, monoisodecyl phosphate, 2-acryloyloxyethyl acid phosphate, 2-methacryloyloxyethyl acid phosphate, diphenyl-2-acryloyloxyethyl phosphate, diphenyl-2-methacryloyloxyethyl phosphate, melamine phosphate, dimelamine phosphate, melamine pyrophosphate, triphenyl phosphine oxide, tricresyl phosphine oxide, diphenyl methane phosphonate, diethyl phenylphosphonate, resorcinol polyphenyl phosphate, resorcinol poly(di-2,6-xylyl) phosphate, bisphenol A polycresyl phosphate, hydroquinone poly(2,6-xylyl)phosphate and condensed phosphoric acid esters such as condensates thereof.

The condensed phosphoric acid esters include resorcinol bis(di-2,6-xylyl)phosphate, resorcinol bis(diphenyl phosphate) and bisphenol A bis(diphenyl phosphate). Commercially available products of resorcinol bis(di-2,6-xylyl)phosphate include PX-200 (of Daihachi Chemical Industry, Co., Ltd.). Commercially available products of resorcinol bis (diphenyl phosphate) include CR-733S (of Daihachi Chemical Industry, Co., Ltd.). Commercially available products of bisphenol A bis (diphenyl phosphate) include CR-741 (of Daihachi Chemical Industry, Co., Ltd.). Out of these, resorcinol bis(di-2,6-xylyl)phosphate is preferably used as it has excellent heat resistance.

The phosphazene compounds can provide flame retardancy to the resin composition as they contain a phosphorus atom and a nitrogen atom in the molecule. Any phosphazene compound is acceptable if it is a compound containing no halogen atom and having a phosphazene structure in the molecule. The term "phosphazene structure" as used herein means a structure represented by the formula $-P(R2)=N-$ [R2 is an organic group]. The phosphazene compounds are represented by the general formulas (6) and (7).

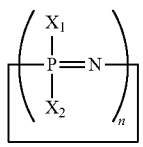

(6)

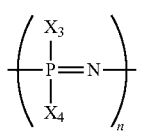

(7)

(In the above formulas, $X_1$, $X_2$, $X_3$ and $X_4$ are each a hydrogen atom, hydroxyl group, amino group or organic group containing no halogen atom. n is an integer of 3 to 10.)

In the above formulas (6) and (7), examples of the organic group containing no halogen atom represented by $X_1$, $X_2$, $X_3$ and $X_4$ include alkoxy group, phenyl group, amino group and allyl group.

Commercially available products of the phosphazene compounds include SPS-100, SPR-100, SA-100, SPB-100 and SPB-100L (of Otsuka Chemical Co., Ltd.) and FP-100 and FP-110 (of Fushimi Pharmaceutical Co., Ltd.).

As red phosphorus, not only untreated red phosphorus but also red phosphorus which is coated with a metal hydrate and a resin to improve stability may be used. Examples of the metal hydrate include aluminum hydroxide, magnesium hydroxide, zinc hydroxide and titanium hydroxide. Although the type and coating amount of the resin are not particularly limited, the resin is preferably phenol resin or epoxy resin having high affinity for the polycarbonate-based resin (component A) used in the present invention.

The coating amount is preferably not less than 1 wt % based on red phosphorus. When the coating amount is less than 1 wt %, the coating effect becomes unsatisfactory and a phosphine gas may be generated at the time of high-temperature kneading. The coating amount is desirably as large as possible in terms of safety but preferably not more than 20 wt % from the viewpoint of flame retardancy.

When the phosphorus-based flame retardant (component E-2) is used as the flame retardant, the content of the phosphorus-based flame retardant is preferably 1 to 30 parts by weight, more preferably 2 to 27 parts by weight, much more preferably 3 to 25 parts by weight based on 100 parts by weight of the total of the components A and B.

(Component E-3: Organic Metal Salt-Based Flame Retardant)

The organic metal salt-based flame retardant (component E-3) is advantageous as heat resistance is almost retained. The organic metal salt-based flame retardant which is most advantageously used in the present invention is a sulfonic acid alkali (earth) metal salt. It is preferably an alkali (earth) metal salt of a fluorine-substituted organic sulfonic acid, particularly preferably an alkali (earth) metal salt of a sulfonic acid having a perfluoroalkyl group. The number of carbon atoms of the perfluoroalkyl group is preferably 1 to 18, more preferably 1 to 10, much more preferably 1 to 8.

The metal constituting the metal ion of the alkali (earth) metal salt of a fluorine-substituted organic sulfonic acid is an alkali metal or an alkali earth metal.

Examples of the alkali metal include lithium, sodium, potassium, rubidium and cesium. Examples of the alkali earth metal include beryllium, magnesium, calcium, strontium and barium. An alkali metal is more preferred. Therefore, the preferred organic metal salt-based flame retardant is an alkali metal salt of a perfluoroalkylsulfonic acid. When the requirement for transparency is higher, rubidium and cesium are preferred out of the above alkali metals. However, as they cannot be used for all purposes and it is difficult to purify them, they may become disadvantageous in terms of cost. Meanwhile, although lithium and sodium are advantageous in terms of cost and flame retardancy, they may become disadvantageous in terms of transparency. In consideration of these, an alkali metal contained in the alkali metal salt of a perfluoroalkylsulfonic acid may be selected for each purpose but a potassium salt of a perfluoroalkylsulfonic acid having good balance among properties is most preferred in all of these respects. This potassium salt and an alkali metal salt of a perfluoroalkylsulfonic acid containing another alkali metal may be used in combination.

Examples of the alkali metal salt of a perfluoroalkylsulfonic acid include potassium trifluoromethanesulfonate, potassium perfluorobutanesulfonate, potassium perfluorohexanesulfonate, potassium perfluorooctanesulfonate, sodium pentafluoroethanesulfonate, sodium perfluorobutanesulfonate, sodium perfluorooctanesulfonate, lithium trifluoromethanesulfonate, lithium perfluorobutanesulfonate, lithium perfluoroheptanesulfonate, cesium trifluoromethanesulfonate, cesium perfluorobutanesulfonate, cesium perfluorooctanesulfonate, cesium perfluorohexanesulfonate, rubidium perfluorobutanesulfonate and rubidium perfluorohexanesulfonate. They may be used alone or in combination of two or more. Out of these, potassium perfluorobutanesulfonate is particularly preferred.

The organic metal salt (component E-3) has a fluoride ion content measured by ion chromatography of preferably not more than 50 ppm, more preferably not more than 20 ppm, much more preferably not more than 10 ppm. As the fluoride ion content becomes lower, flame retardancy and light resistance become higher. The lower limit of the fluoride ion content can be substantially 0 but preferably about 0.2 ppm for practical use from the viewpoint of balance between the number of purifying steps and the effect.

The alkali metal salt of a perfluoroalkylsulfonic acid having the above fluoride ion content is purified as follows, for example. The alkali metal salt of a perfluoroalkylsulfonic acid is dissolved in ion exchange water in a weight ratio of 1:2 to 1:10 at: 40 to 90° C. (preferably 60 to 85° C.). The alkali metal salt of a perfluoroalkylsulfonic acid is produced by a method in which a perfluoroalkylsulfonic acid is neutralized with a carbonate or hydroxide of an alkali metal or a method in which a perfluoroalkylsulfonyl fluoride is neutralized with a carbonate or hydroxide of an alkali metal (preferably by the latter method). The ion exchange water is particularly preferably water having an electric resistance of not less than 18 MΩ·cm. A solution containing the metal salt dissolved therein is stirred at the above temperature for 0.1 to 3 hours, preferably 0.5 to 2.5 hours. Thereafter, the solution is cooled to 0 to 40° C., preferably 10 to 35° C. A crystal is precipitated by cooling. The precipitated crystal is extracted by filtration. Thereby, a more preferred purified alkali metal salt of a perfluoroalkylsulfonic acid is produced.

When the alkali (earth) metal salt of a fluorine-substituted organic sulfonic acid is used as the flame retardant, the content thereof is preferably 0.01 to 1.0 part by weight, more preferably 0.05 to 0.8 part by weight, much more preferably 0.08 to 0.6 part by weight based on 100 parts by weight of the total of the components A and B. As the content falls within the above preferred range, flame retardancy is obtained by mixing the alkali (earth) metal salt of a fluorine-substituted organic sulfonic acid.

Another organic metal salt-based flame retardant except for the above alkali (earth) metal salt of a fluorine-substituted organic sulfonic acid is preferably a metal salt of an organic sulfonic acid containing no fluorine atom. Examples of the metal salt include alkali metal salts of an aliphatic sulfonic acid, alkali earth metal salts of an aliphatic sulfonic acid, alkali metal salts of an aromatic sulfonic acid and alkali earth metal salts of an aromatic sulfonic acid (all of them do not contain a fluorine atom).

The metal salts of an aliphatic sulfonic acid are preferably alkali (earth) metal salts of an alkylsulfonic acid. They may be used alone or in combination of two or more (the term "alkali (earth) metal salts" means both of an alkali metal salt and an alkali earth metal salt). Preferred examples of the alkanesulfonic acid used in the alkali (earth) metal salts of an alkylsulfonic acid include methanesulfonic acid, ethanesulfonic acid, propanesulfonic acid, butanesulfonic acid, methylbutanesulfonic acid, hexanesulfonic acid, heptanesulfonic acid and octanesulfonic acid. They may be used alone or in combination of two or more.

The aromatic sulfonic acid used in the alkali (earth) metal salts of an aromatic sulfonic acid is at least one acid selected from the group consisting of a sulfonic acid of a monomer-like or polymer-like aromatic sulfide, sulfonic acid of an aromatic carboxylic acid and an ester, sulfonic acid of a monomer-like or polymer-like aromatic ether, sulfonic acid of an aromatic sulfonate, monomer-like or polymer-like aromatic sulfonic acid, monomer-like or polymer-like aromatic sulfonesulfonic acid, sulfonic acid of an aromatic ketone, heterocyclic sulfonic acid, sulfonic acid of an aromatic sulfoxide and condensate formed by the methylene type bonding of an aromatic sulfonic acid. They may be used alone or in combination of two or more.

The alkali (earth) metal salts of an aromatic sulfonic acid include disodium diphenylsulfide-4,4'-disulfonate, dipotassium diphenylsulfide-4,4'-disulfonate, potassium 5-sulfoisophthalate, sodium 5-sulfoisophthalate, polysodium polyethylene terephthalate polysulfonate, calcium 1-methoxynaphthalene-4-sulfonate, disodium 4-dodecylphenylether disulfonate, polysodium poly(2,6-dimethylphenylene oxide)polysulfonate, polysodium poly(1,3-phenylene oxide) polysulfonate, polysodium poly(1,4-phenylene oxide)polysulfonate, polypotassium poly(2,6-diphenylphenylene oxide)polysulfonate, lithium poly(2-fluoro-6-butylphenylene oxide) polysulfonate, potassium sulfonate of benzenesulfonate, sodium benzenesulfonate, strontium benzenesulfonate, magnesium benzenesulfonate, dipotassium p-benzenedisulfonate, dipotassium naphthalene-2,6-disulfonate, calcium biphenyl-3,3'-disulfonate, sodium diphenylsulfone-3-sulfonate, potassium diphenylsulfone-3-sulfonate, dipotassium diphenylsulfone-3,3'-disulfonate, dipotassium diphenylsulfone-3,4'-disulfonate, sodium α,α,α-trifluoroacetophenone-4-sulfonate, dipotassium benzophenone-3,3'-disulfonate, disodium thiophene-2,5-disulfonate, dipotassium thiophene-2,5-disulfonate, calcium thiophene-2,5-disulfonate, sodium benzothiophenesulfonate, potassium diphenylsulfoxide-4-sulfonate, formalin condensate of sodium naphthalenesulfonate, and formalin condensate of sodium anthracenesulfonate.

Out of the metal salts of an organic sulfonic acid containing no fluorine atom, alkali (earth) metal salts of an aromatic sulfonic acid are preferred, and potassium salts of an aromatic sulfonic acid are particularly preferred. When an alkali (earth) metal salt of an aromatic sulfonic acid is used as the flame retardant, the content thereof is preferably 0.01 to 1 part by weight, more preferably 0.05 to 0.8 part by weight, much more preferably 0.08 to 0.6 part by weight based on 100 parts by weight of the total of the components A and B.

(Component 5-4: Silicone-Based Flame Retardant)

A silicone compound used as the silicone-based flame retardant (component E-4) in the present invention improves flame retardancy by a chemical reaction at the time of combustion. As the compound may be used various compounds which have been proposed as flame retardants for thermoplastic resins, especially aromatic polycarbonate resins. It is considered that the silicone compound provides a flame retarding effect to the polycarbonate resin by the formation of a structure through the bonding of the silicone compound itself or to a component derived from the resin at the time of combustion or a reduction reaction at the time of forming the structure. Therefore, it is preferred that the silicone compound should contain a highly active group for the reaction. More specifically, the silicone compound preferably contains a predetermined amount of at least one group selected from alkoxy group and hydrogen (that is, Si—H group) The content of the group (alkoxy group or Si—H group) is preferably 0.1 to 1.2 mol/100 g, more preferably 0.12 to 1 mol/100 g, much more preferably 0.15 to 0.6 mol/100 g. This content is obtained by measuring the amount of hydrogen or alcohol produced per unit weight of the silicon compound by an alkali decomposition method. The alkoxy group is preferably an alkoxy group having 1 to 4 carbon atoms, particularly preferably a methoxy group.

In general, the structure of the silicone compound is constituted by combining the following four siloxane units arbitrarily.

M unit: monofunctional siloxane unit such as $(CH_3)_3SiO_{1/2}$, $H(CH_3)_2SiO_{1/2}$, $H_2(CH_3)SiO_{1/2}$, $(CH_3)_2(CH_2=CH)SiO_{1/2}$, $(CH_3)_2(C_6H_5)SiO_{1/2}$ or $(CH_3)(C_6H_5)(CH_2=CH)SiO_{1/2}$ D unit: bifunctional siloxane unit such as $(CH_3)_2SiO$, $H(CH_3)SiO$, $H_2SiO$, $H(C_6H_5)SiO$, $(CH_3)(CH_2=CH)SiO$ or $(C_6H_5)_2SiO$ T unit: trifunctional siloxane unit such as $(CH_3)SiO_{3/2}$, $(C_3H_7)SiO_{3/2}$, $HSiO_{3/2}$, $(CH_2=CH)SiO_{3/2}$ or $(C_6H_5)SiO_{3/2}$ Q unit: tetrafunctional siloxane unit represented by $SiO_2$ The structure of the silicone compound used as the silicone-based flame retardant (component E-4) is represented by $D_n$, $T_p$, $M_mD_n$, $M_mT_p$, $M_mD_nT_p$, $M_mD_nQ_q$, $M_mT_pQ_q$, $M_mD_nT_pQ_q$, $D_nT_p$, $D_nQ_q$ or $D_nT_pQ_q$ as rational formulas. Out of these, the structure of the silicone compound is represented by preferably $M_mD_n$, $M_mT_p$, $M_mD_nT_p$ or $M_mD_nQ_q$, more preferably $M_mD_n$ or $M_mD_nT_p$.

The coefficients m, n, p and q in the above rational formulas are each an integer of 1 or more which indicates the polymerization degree of each siloxane unit. The total of the above coefficients in each rational formula is the average polymerization degree of the silicone compound. This average polymerization degree is in the range of preferably 3 to 150, more preferably 3 to 80, much more preferably 3 to 60, particularly preferably 4 to 40. The flame retardancy becomes more excellent as the above average polymerization degree becomes more preferred. As will be described hereinafter, the silicone compound containing a predetermined amount of an aromatic group is also excellent in transparency and color.

When any one of m, n, p and q is 2 or more, the number of the siloxane units having the coefficient may be 2 or more which differ in the hydrogen atom or organic residue to be bonded.

The silicone compound may have a linear or branched structure. The organic residue bonded to the silicon atom has preferably 1 to 30 carbon atoms, more preferably 1 to 20 carbon atoms. Examples of the organic residue include alkyl groups such as methyl group, ethyl group, propyl group, butyl group, hexyl group and decyl group, cycloalkyl groups such as cyclohexyl group, aryl groups such as phenyl group, and aralkyl groups such as tolyl group. The organic residue is preferably an alkyl group having 1 to 8 carbon atoms, or alkenyl group or aryl group having 1 to 8 carbon atoms. The alkyl group is particularly preferably an alkyl group having 1 to 4 carbon atoms such as methyl group, ethyl group or propyl group.

The silicone compound used as the silicone-based flame retardant (component E-4) preferably contains an aryl group.

More preferably, the content of the aromatic group (aromatic group content) represented by the following general formula (8) is 10 to 70 wt % (preferably 15 to 60 wt %).

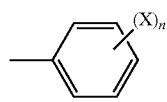
(8)

(In the formula (8), X is an OH group or monovalent organic residue having 1 to 20 carbon atoms. n is integer of 0 to 5. When n is 2 or more in the formula (8), X's may be different.)

The silicone compound used as the silicone-based flame retardant (component E-4) may contain a reactive group except for the above Si—H group and alkoxy group, and examples of the reactive group include amino group, carboxyl group, epoxy group, vinyl group, mercapto group and methacryloxy group.

The silicone compound having an Si—H group is preferably a silicone compound containing at least one of constituent units represented by the following general formulas (9) and (10).

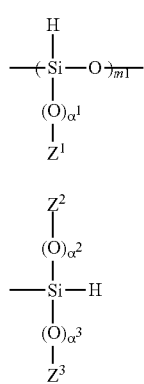
(9)
(10)

(In the formulas (9) and (10), $Z^1$ to $Z^3$ are each independently a hydrogen atom, monovalent organic residue having 1 to 20 carbon atoms, or compound represented by the following general formula (11). $\alpha^1$ to $\alpha^3$ are each independently 0 or 1. m1 is 0 or an integer of 1 or more. When m1 is 2 or more in the formula (9), the recurring units may be different from each other.)

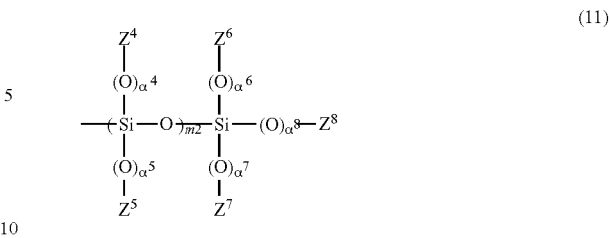
(11)

(In the formula (11), $Z^4$ to $Z^8$ are each independently a hydrogen atom or monovalent organic residue having 1 to 20 carbon atoms. $\alpha^4$ to $\alpha^8$ are each independently 0 or 1. m2 is 0 or an integer of 1 or more. When m2 is 2 or more in the formula (11), the recurring units may be different from each other.)

As the silicone compound used as the silicone-based flame retardant (component E-4), the silicone compound having an alkoxy group is at least one compound selected from compounds represented by the following general formulas (12) and (13).

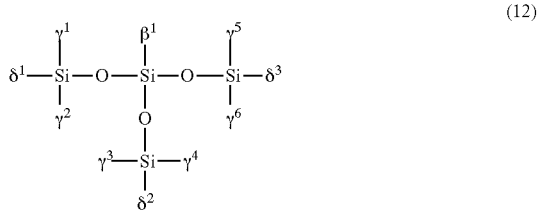
(12)

(In the formula (12), $\beta^1$ is a vinyl group, alkyl group having 1 to 6 carbon atoms, cycloalkyl group having 3 to 6 carbon atoms, or aryl group or aralkyl group having 6 to 12 carbon atoms. $\gamma^1$, $\gamma^2$, $\delta^3$, $\delta^4$, $\delta^5$ and $\gamma^6$ are each an alkyl group or cycloalkyl group having 1 to 6 carbon atoms, or aryl group or aralkyl group having 6 to 12 carbon atoms, with proviso that at least one of the groups is an aryl group or aralkyl group. $\delta^1$, $\delta^2$ and $\delta^3$ are each an alkoxy group having 1 to 4 carbon atoms.)

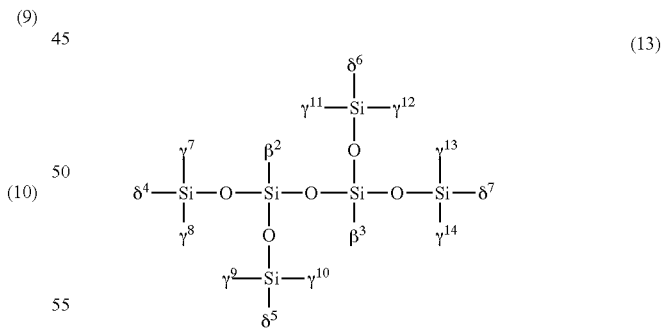
(13)

(In the formula (13), $\beta^2$ and $\beta^3$ are each a vinyl group, alkyl group having 1 to 6 carbon atoms, cycloalkyl group having 3 to 6 carbon atoms, or aryl group or aralkyl group having 6 to 12 carbon atoms. $\gamma^7$, $\gamma^8$, $\gamma^9$, $\gamma^{10}$, $\gamma^{11}$, $\gamma^{12}$, $\gamma^{13}$ and $\gamma^{14}$ are each an alkyl group having 1 to 6 carbon atoms, cycloalkyl group having 3 to 6 carbon atoms, or aryl group or aralkyl group having 6 to 12 carbon atoms, with proviso that at least one of the groups is an aryl group or aralkyl group. $\gamma^4$, $\gamma^5$, $\delta^6$ and $\delta^7$ are each an alkoxy group having 1 to 4 carbon atoms.)

When the silicone-based flame retardant (component E-4) is used, the content thereof is preferably 0.1 to 5 parts by weight, more preferably 0.2 to 4 parts by weight, much more preferably 0.3 to 3 parts by weight based on 100 parts by weight of the total of the components A and B.

The flame retardant components E-1, E-2, E-3 and E-4 may be used alone or in combination of two or more.

<Component F: Inorganic Filler>

The resin composition of the present invention may comprise an inorganic filler (component F). As the inorganic filler (component F) may be used generally known fillers such as glass fibers, flat glass fibers, milled fibers, carbon fibers, glass flakes, wollastonite, kaolin clay, mica, talc and whiskers (such as potassium titanate whiskers and aluminum borate whiskers).

The form of the inorganic filler (component F) may be freely selected from fibrous, flaky, spherical and hollow forms but preferably fibrous and lamellar forms to improve the strength and impact resistance of the resin composition. Since glass-based inorganic fillers such as glass fibers and glass flakes have a problem that they tend to wear a mold at the time of molding, a silicate mineral is preferably used as the inorganic filler (component F).

The silicate mineral used as the component F of the present invention is a mineral containing at least a metal oxide component and a $SiO_2$ component, preferably orthosilicate, di silicate, cyclic silicate or chain silicate. The silicate mineral takes a crystalline state, and its crystal form may be various forms such as fibrous or plate-like form.

The silicate mineral may be anyone of composite oxide, oxyacid salt (made of an ion lattice) and solid solution. Further, the composite oxide may be a combination of two or more single oxides or a combination of two or more of single oxides and oxyacid salts. The solid solution may be a solid solution of two or more metal oxides, or a solid solution of two or more oxyacid salts. The silicate mineral may be a hydrate. The form of crystal water in the hydrate is a hydrogen silicate ion as Si—OH, a hydroxy ion ($OH^-$) against a metal cation, or a $H_2O$ molecule in a gap in the structure.

As the silicate mineral, an artificially synthesized product corresponding to a natural product may also be used. As the artificially synthesized product, silicate minerals obtained by conventionally known methods, for example, synthesizing methods making use of a solid reaction, hydrothermal reaction and super high-pressure reaction may be used.

Examples of the silicate mineral in each metal oxide component (MO) are given below. The names within the parentheses are the names of minerals containing a silicate mineral as the main component, and the compounds within the parentheses may be used as given metal salts.

Silicate minerals containing $K_2O$ include $K_2O.SiO_2$, $K_2O.4SiO_2.H_2O$, $K_2O.Al_2O_3.2SiO_2$ (kalsilite), $K_2O.Al_2O_3.4SiO_2$ (leucite) and $K_2O.Al_2O_3.6SiO_2$ (orthoclase).

Silicate minerals containing $Na_2O$ include $Na_2O.SiO_2$ and hydrate thereof, $Na_2O.2SiO_2$, $2Na_2O.SiO_2$, $Na_2O.4SiO_2$, $Na_2O.3SiO_2.3H_2O$, $Na_2O.Al_2O_3.2SiO_2$, $Na_2O.Al_2O_3.4SiO_2$ (jadeite), $2Na_2O.3CaO.5SiO_2$, $3Na_2O.2CaO.5SiO_2$ and $Na_2O.Al_2O_3.6SiO_2$ (albite).

Silicate minerals containing $Li_2O$ include $Li_2O.SiO_2$, $2Li_2O.SiO_2$, $Li_2O.SiO_2.H_2O$, $3Li_2O.2SiO_2$, $Li_2O.Al_2O_3.4SiO_2$ (petalite), $Li_2O.Al_2O_3.2SiO_2$ (eucryptite) and $Li_2O.Al_2O_3.4SiO_4$ (spodumene).

Silicate minerals containing BaO include $BaO.SiO_2$, $2BaO.SiO_2$, $BaO.Al_2O_3.2SiO_2$ (celsian) and $BaO.TiO_2.3SiO_2$ (bentonite).

Silicate minerals containing CaO include $3CaO.SiO_2$ (alite of a cement clinker mineral), $2CaO.SiO_2$ (belite of a cement clinker mineral), $2CaO.MgO.2SiO_2$ (akermanite), $2CaO.Al_2O_3.SiO_2$ (gehlenite), solid solution of akermanite and gehlenite (melilite), $CaO.SiO_2$ (wollastonite (including both α-type and β-type)), $CaO.MgO.2SiO_2$ (diopside), $CaO.MgO.SiO_2$ (monticellite), $3CaO.MgO.2SiO_2$ (merwinite), $CaO.Al_2O_3.2SiO$ (anorthite), and tobermorite group hydrates such as $5CaO.6SiO_2.5H_2O$ (tobermorite, $5CaO.6SiO_2.9H_2O$ is also included).

Wollastonite group hydrates such as $2CaO.SiO_2.H_2O$ (hillebrandite) are also included. Xonotlite group hydrates such as $6CaO.6SiO_2.H_2O$ (xonotlite) are further included. Gyrolite group hydrates such as $2CaO.SiO_2.2H_2O$ (gyrolite) are still further included.

$CaO.Al_2O_3.2SiO_2.H_2O$ (lawsonite), $CaO.FeO.2SiO_2$ (hedenbergite), $3CaO.2SiO_2$ (kilchoanite), $3CaO.Al_2O_3.3SiO_2$ (grossular), $3CaO.Fe_2O_3.3SiO_2$ (andradite), $6CaO.4Al_2O_3.FeO.SiO_2$ (pleochroaite), clinozoisite, piedmontite, allanite, vesuvianite, axinite, scawtite and augite are also included.

Further, Portland cements are given as silicate minerals containing CaO. The type of Portland cement is not particularly limited, and any one of ordinary, early-strength, ultra-high-early-strength, moderate-heat, sulfate-resistant and white Portland cements may be used. Mixed cements such as blast-furnace cement, silica cement and fly ash cement may also be used as the component F.

Other silicate minerals containing CaO include blast furnace slag and ferrite.

Silicate minerals containing ZnO include $ZnO.SiO_2$, $2ZnO.SiO_2$ (troostite) and $4ZnO.2SiO_2.H_2O$ (hemimorphite).

Silicate minerals containing MnO include $MnO.SiO_2$, $2MnO.SiO_2$, $CaO.4MnO.5SiO_2$ (rhodonite) and kozulite.

Silicate minerals containing FeO include $FeO.SiC_2$ (ferrosilite), $2FeO.SiO_2$ (fayalite), $3FeO-Al_2O_3.3SiO_2$ (almandine) and $2CaO.5FeO.8SiO_2.H_2O$ (ferroactinolite).

Silicate minerals containing CoO include $CoO.SiO_2$ and $2CoO.SiO_2$.

Silicate minerals containing MgO include $MgO.SiO_2$ (steatite, enstatite), $2MgO.SiO_2$ (forsterite), $3MgO.Al_2O_3.3SiO_2$ (pyrope), $2MgO.2Al_2O_3.5SiO_2$ (cordierite), $2MgO.3SiO_2.5H_2O$, $3MgO.4SiO_2.H_2O$ (talc), $5MgO.8SiO_2.9H_2O$ (attaparugite), $4MgO.6SiO_2.7H_2O$ (sepiolite), $3MgO.2SiO_2.2H_2O$ (chrysolite), $5MgO.2CaO.8SiO_2.H_2O$ (tremolite), $5MgO.Al_2O_3.3SiO_2.4H_2O$ (chlorite), $K_2O.6MgO.Al_2O_3.6SiO_2.2H_2O$ (phlogopite), $Na_2O.3MgO.3Al_2O_3.8SiO_2.H_2O$ (glaucophane), magnesium tourmaline, anthophyllite, cummingtonite, vermiculite and smectite.

Silicate minerals containing $Fe_2O_3$ include $Fe_2O_3.SiO_2$.

Silicate minerals containing $ZrO_2$ include $ZrO_2.SiO_2$ (zircon) and AZS refractory.

Silicate minerals containing $Al_2O_3$ include $Al_2O_3.SiO_2$ (sillimanite, andalusite, kyanite), $2Al_2O_3.SiO_2$, $Al_2O_3.3SiO_2$, $3Al_2O_3.2SiO_2$ (mullite), $Al_2O_3.2SiO_2.2H_2O$ (kaolinite), $Al_2O_3.4SiO_2.H_2O$ (pyrophyllite), $Al_2O_3.4SiO_2.H_2O$ (bentonite), $K_2O.3Na_2O.4Al_2O_3.8SiO_2$ (nepheline), $K_2O.3Al_2O_3.6SiO_2.2H_2O$ (muscovite, sericite), $K_2O.6MgO.Al_2O_3.6SiO_2.2H_2O$ (phlogopite), zeolite, fluorophlogopite and biotite.

Out of the above silicate minerals, mica, talc and wollastonite are preferred, and at least one silicate mineral containing talc is particularly preferred.

(Talc)

In the present invention, talc is hydrous magnesium silicate in terms of chemical composition, generally represented by the chemical formula $4SiO_2 \cdot 3MgO \cdot 2H_2O$ and a flaky particle having a lamellar structure. Talc comprises 56 to 65 wt % of $SiO_2$, 28 to 35 wt % of MgO and about 5 wt % of $H_2O$. As other trace components, it comprises 0.03 to 1.2 wt % of $Fe_2O_3$, 0.05 to 1.5 wt % of $Al_2O_3$, 0.05 to 1.2 wt % of CaO, not more than 0.2 wt % of $K_2O$ and not more than 0.2 wt % of $Na_2O$.

As for the particle diameter of talc, the average particle diameter measured by a sedimentation method is preferably 0.1 to 15 μm (more preferably 0.2 to 12 μm, much more preferably 0.3 to 10 μm, particularly preferably 0.5 to 5 μm). It is particularly preferred to use talc having a bulk density of not less than 0.5 (g/cm$^3$) as a raw material. The average particle diameter of talc is D50 (median diameter in particle size distribution) measured by an X-ray transmission method which is one of liquid-phase sedimentation methods. Examples of the apparatus used for this measurement include the Sedigraph5100 of Micromeritics.

The method of milling talc ore is not particularly limited, and axial-flow milling, annular milling, roll milling, ball milling, jet milling and container rotation type compression shear milling methods may be used. Further, talc which has been classified by a classifier to become uniform in particle size distribution after milling is preferred. The classifier is not particularly limited and may be an impactor type inertia force classifier (such as variable impactor), Coanda effect-use inertia force classifier (such as elbow jet), or centrifugal classifier (such as multi-stage cyclone separator, microplex classifier, dispersion separator, accucut classifier, turbo classifier, turboplex classifier, micron separator or super separator).

Further, talc which is agglomerated is preferred from the viewpoint of handling ease, and production processes thereof include one making use of deaeration compression and one making use of compression by using a sizing agent. The process making use of deaeration compression is particularly preferred because it is simple and prevents an unrequired sizing agent resin component from being contained in the resin composition of the present invention.

(Mica)

Mica having an average particle diameter measured by a micro-track laser diffraction method of 10 to 100 μm can be preferably used. The average particle diameter is more preferably 20 to 50 μm. When mica has an average particle diameter smaller than 10 μm, its stiffness improving effect becomes unsatisfactory and when mica has an average particle diameter larger than 100 μm, its stiffness improving effect becomes unsatisfactory as well and mechanical strength such as impact resistance may sharply degrade disadvantageously. Mica having a thickness actually measured by observation through an electron microscope of 0.01 to 1 μm can be preferably used. The thickness is more preferably 0.03 to 0.3 μm. The aspect ratio of mica is preferably 5 to 200, more preferably 10 to 100. Mica in use is preferably muscovite mica having a Mohs hardness of about 3. Muscovite mica has higher stiffness and higher strength and attains the object of the present invention at a higher level than other mica such as phlogopite mica. As the method of milling mica, both dry and wet milling methods may be employed. The dry milling method is inexpensive and commonly used whereas the wet milling method is effective in milling mica finely and thinly with the result that the effect of improving the stiffness of the resin composition becomes higher.

(Wollastonite)

The fiber diameter of wollastonite is preferably 0.1 to 10 μm, more preferably 0.1 to 5 μm, much more preferably 0.1 to 3 μm. The aspect ratio (average fiber length/average fiber diameter) of wollastonite is preferably not less than 3. The upper limit of the aspect ratio is not more than 30.

As for the fiber diameter, a reinforcing filler is observed through an electron microscope to obtain the diameter of each fiber so as to calculate number average fiber diameter from the measurement values. The reason for the use of the electron microscope is that it is difficult to measure the level of size to be measured accurately with an optical microscope. A filler to be measured for fiber diameter is chosen at random from an image obtained by observing through the electron microscope to measure each fiber diameter at a position close to the center part so as to calculate number average fiber diameter from the obtained measurement values. The magnification for observation is about 1,000×, and the number of fibers to be measured is not less than 500 (preferably not more than 600 from the viewpoint of work efficiency).

As for the measurement of the average fiber length, fillers are observed through an optical microscope to obtain the length of each fiber so as to calculate number average fiber length from the measurement values. For observation through the optical microscope, a sample in which fillers are dispersed so well that they do not overlap with one another is first prepared. Observation is carried out with a 20-power objective lens, and this observed image is input into a CCD camera having about 250,000 pixels as image data. The fiber length is calculated from this obtained image data by using an image analyzing apparatus and a program for obtaining the maximum distance between two points of the image data. Under the above conditions, the size of each pixel is equivalent to a length of 1.25 μm, and the number of the measured fibers is not less than 500 (preferably not more than 600 from the viewpoint of work efficiency).

It is preferred that iron contained in the raw material ore and iron contained by the abrasion of the apparatus when the raw material ore is milled should be removed as much as possible by a magnetic ore separator in order to fully reflect the whiteness of wollastonite upon the resin composition. The iron content of wollastonite is preferably reduced to not more than 0.5 wt % in terms of $Fe_2O_3$ by the magnetic ore separator.

Although the silicate mineral (preferably mica, talc, or wollastonite) may not be surface treated, it may be surface treated with a surface treating agent such as a silane coupling agent, higher fatty acid ester or wax. Further, it may be granulated with a sizing agent such as a resin, higher fatty acid ester or wax to become granular.

The content of the inorganic filler (component F) is preferably 1 to 100 parts by weight, more preferably 3 to 90 parts by weight, much more preferably 5 to 80 parts by weight based on 100 parts by weight of the total of the components A and B. When the content of the component F is lower than 1 part by weight, satisfactory stiffness and surface hardness may not be obtained. When the content is higher than 100 parts by weight, impact resistance is lost and a poor appearance such as a silver streak may be obtained. Since large stress is applied to a material by improved stiffness, the reduction of chemical resistance is observed in a chemical resistance test in which certain distortion is applied.

(Component G: Hindered Amine-Based Compound)

The resin composition of the present invention may comprise a hindered amine-based compound (component G). The hindered amine-based compound (component G) is generally called HALS (Hindered Amine Light Stabilizer) and used as an optical stabilizer and has a 2,2,6,6-tetramethylpiperidine skeleton in the structure.

Examples of the hindered amine-based compound (component G) include 4-acetoxy-2,2,6,6-tetramethylpiperidine, 4-stearoyloxy-2,2,6,6-tetramethylpiperidine, 4-acryloyloxy-2,2,6,6-tetramethylpiperidine, 4-(phenylacetoxy)-2,2,6,6-tetramethylpiperidine, 4-benzoyloxy-2,2,6,6-tetramethylpiperidine, 4-methoxy-2,2,6,6-tetramethylpiperidine, 4-stearyloxy-2,2,6,6-tetramethylpiperidine, 4-cyclohexyloxy-2,2,6,6-tetramethylpiperidine, 4-benzyloxy-2,2,6,6-tetramethylpiperidine, 4-phenoxy-2,2,6,6-tetramethylpiperidine, 4-(ethylcarbamoyloxy)-2,2,6,6-tetramethylpiperidine, 4-(cyclohexylcarbamoyloxy)-2,2,6,6-tetramethylpiperidine, 4-(phenylcarbamoyloxy)-2,2,6,6-tetramethylpiperidine, bis(2,2,6,6-tetramethyl-4-piperidyl)carbonate, bis(2,2,6,6-tetramethyl-4-piperidyl)oxalate, bis(2,2,6,6-tetramethyl-4-piperidyl)malonate, bis(2,2,6,6-tetramethyl-4-piperidyl)sebacate, bis(2,2,6,6-tetramethyl-4-piperidyl)adipate, bis(2,2,6,6-tetramethyl-4-piperidyl)terephthalate, bis(1,2,2,6,6-pentamethyl-4-piperidyl)carbonate, bis(1,2,2,6,6-pentamethyl-4-piperidyl)oxalate, bis(1,2,2,6,6-pentamethyl-4-piperidyl)malonate, bis(1,2,2,6,6-pentamethyl-4-piperidyl)sebacate, bis(1,2,2,6,6-pentamethyl-4-piperidyl)adipate, bis(1,2,2,6,6-pentamethyl-4-piperidyl)terephthalate, N,N'-bis-2,2,6,6-tetramethyl-4-piperidinyl-1,3-benzene dicarboxyamide, 1,2-bis(2,2,6,6-tetramethyl-4-piperidyloxy)ethane, α,α'-bis(2,2,6,6-tetramethyl-4-piperidyloxy)-p-xylene, bis(2,2,6,6-tetramethyl-4-piperidyltolylene-2,4-dicarbamate, bis(2,2,6,6-tetramethyl-4-piperidyl)-hexamethylene-1,6-dicarbamate, tris(2,2,6,6-tetramethyl-4-piperidyl)-benzene-1,3,5-tricarboxylate, N,N',N'',N'''-tetrakis-(4,6-bis-(butyl-(N-methyl-2,2,6,6-tetramethylpiperidin-4-yl)amino)-triazin-2-yl)-4,7-diazadecane-1,10-diamine, polycondensate of dibutylamine 1,3,5-triazine.N,N'-bis(2,2,6,6-tetramethyl-4-piperidyl)-1,6-hexamethylenediamine and N-(2,2,6,6-tetramethyl-4-piperidyl)butylamine, poly[{6-(1,1,3,3-tetramethylbutyl)amino-1,3,5-triazine-2,4-diyl}{(2,2,6,6-tetramethyl-4-piperidyl)imino} hexamethylene{(2,2,6,6-tetramethyl-4-piperidyl)imino}], tetrakis(2,2,6,6-tetramethyl-4-piperidyl)-1,2,3,4-butane tetracarboxylate, tetrakis(1,2,2,6,6-pentamethyl-4-piperidyl)-1,2,3,4-butane tetracarboxylate, tris(2,2,6,6-tetramethyl-4-piperidyl)-benzene-1,3,4-tricarboxylate, 1-[2-{3-(3,5-di-t-butyl-4-hydroxyphenyl)propionyloxy} butyl]-4-[3-(3,5-di-t-butyl-4-hydroxyphenyl) propionyloxy]2,2,6,6-tetramethylpiperidine and condensate of 1,2,3,4-butane tetracarboxylic acid, 1,2,2,6,6-pentamethyl-4-piperidinol and β,β,β',β'-tetramethyl-3,9-[2,4,8,10-tetraoxaspiro(5,5) undecane]diethanol.

The hindered amine-based compounds (component G) are roughly divided into three types according to a site to be bonded to a nitrogen atom in the piperidine skeleton: N—H type (hydrogen is bonded to the nitrogen atom), N—R type (an alkyl group (R) is bonded to the nitrogen atom) and N—OR type (an alkoxy group (OR) is bonded to the nitrogen atom). When it is used for the polycarbonate resin, the N—R type and N—OR type are preferably used from the viewpoint of the basicity of the hindered amine-based compound. According to the type of the hindered amine-based compound, there may occur a problem that the resin composition is colored yellow or that the molecular weight greatly drops.

Out of the above compounds, compounds represented by the following formulas (14) and (15) are preferably used in the present invention.

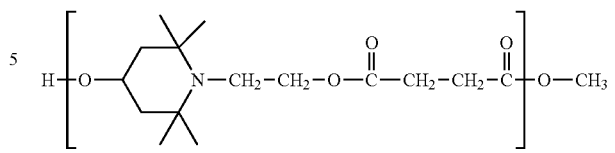

(14)

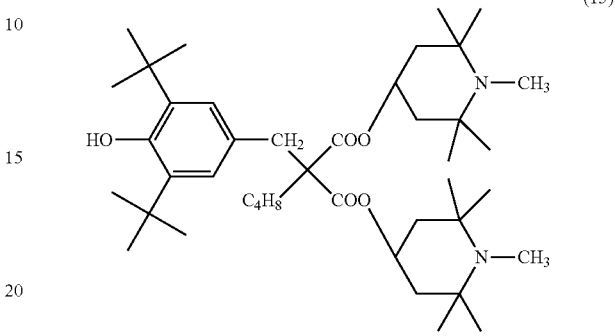

(15)

The hindered amine-based compounds (component G) may be used alone or in combination of two or more.

The content of the hindered amine-based compound (component G) is preferably 0.01 to 1 part by weight, more preferably 0.02 to 0.8 part by weight, much more preferably 0.05 to 0.6 part by weight, particularly preferably 0.1 to 0.4 part by weight based on 100 parts by weight of the total of the components A and B. When the content of the component G is lower than 1 part by weight, physical properties and chemical resistance may degrade due to the decomposition of the polycarbonate resin. When the content is lower than 0.01 part by weight, satisfactory flame retardancy may not be obtained.

<Component H: Dripping Inhibitor>

The resin composition of the present invention may comprise a dripping inhibitor (component H). When the dripping inhibitor is used, high flame retardancy can be obtained without impairing the physical properties of a molded article.

The dripping inhibitor (component H) is, for example, a fluorine-containing polymer having fibril forming ability. Examples of the polymer include polytetrafluoroethylene, tetrafluoroethylene-based copolymers (such as tetrafluoroethylene/hexafluoropropylene copolymer), partially fluorinated polymers described in U.S. Pat. No. 4,379,910 and polycarbonate resins produced from fluorinated diphenols. Polytetrafluoroethylene (may be referred to as "PTFE" hereinafter) is particularly preferred.

PTFE having fibril forming ability has an extremely high molecular weight and tends to become fibrous through the bonding of PTFE' s by an external function such as shearing force. The number average molecular weight obtained from standard specific gravity of PTFE is preferably 1,000,000 to 10,000,000, more preferably 2,000,000 to 9,000,000 PTFE in the form of an aqueous dispersion besides a solid may also be used. PTFE having fibril forming ability may be used as a mixture with another resin in order to improve dispersibility in a resin and obtain high flame retardancy and mechanical properties.

Commercially available products of PTFE having fibril forming ability include the Teflon (registered trademark) 6J of Du Pont-Mitsui Fluorochemicals Co., Ltd. and the Polyflon MPA FA500 and F-201L of Daikin Industries, Ltd. Commercially available products of the aqueous dispersion of PTFE include the Fluon AD-1 and AD-936 of Asahi ICI Fluoropolymers Co., Ltd., the Fluon D-1 and D-2 of Daikin Industries, Ltd. and the Teflon (registered trademark) 30J of Du Pont-Mitsui Fluorochemicals Co., Ltd.

PTFE in a mixture form obtained by (1) a method in which an aqueous dispersion of PTFE and an aqueous dispersion or solution of an organic polymer are mixed together to carry out co-precipitation so as to obtain a coaggregation mixture (method disclosed by JP-A 60-258263 and JP-A 63-154744), (2) a method in which an aqueous dispersion of PTFE and dried organic polymer particles are mixed together (method disclosed by JP-A 4-272957), (3) a method in which an aqueous dispersion of PTFE and an organic polymer particle solution are uniformly mixed together and their media are removed from the mixture at the same time (method disclosed by JP-A 06-220210 and JP-A 08-188653), (4) a method in which a monomer forming an organic polymer is polymerized in an aqueous dispersion of PTFE (method disclosed by JP-A 9-95583), or (5) a method in which an aqueous dispersion of PTFE and a dispersion of an organic polymer are uniformly mixed together and a vinyl-based monomer is polymerized in the mixed dispersion to obtain a mixture (method disclosed by JP-A 11-29679) may be used.

Commercially available products of PTFE in these mixture forms include the METABLEN A3800 (trade name) of Mitsubishi Rayon Co., Ltd. and the BLENDEX B449 (trade name) of GE Specialty Chemicals.

As for the ratio of PTFE in the mixture form, the content of PTFE is preferably 1 to 60 wt %, more preferably 5 to 55 wt % based on 100 wt % of the PTFE mixture. When the content of PTFE falls within the above range, the high dispersibility of PTFE can be obtained. The content of the above component H shows the net amount of the dripping inhibitor and the net amount of PTFE in the case of PTFE in the mixture form.

The content of the dripping inhibitor (component H) is preferably 0.05 to 2 parts by weight, more preferably 0.1 to 1.5 parts by weight, much more preferably 0.2 to 1 part by weight based on 100 parts by weight of the total of the components A and B. When the content of the dripping inhibitor falls below the above range, flame retardancy may become unsatisfactory. When the content of the dripping inhibitor exceeds the above range, PTFE precipitates on the surface of a molded article, thereby deteriorating the appearance of the molded article and boosting the cost of the rosin composition disadvantageously.

The styrene-based monomer used in the organic polymer used in the polytetrafluoroethylene-based mixture is, for example, styrene which may be substituted by at least one group selected from the group consisting of alkyl group having 1 to 6 carbon atoms, alkoxy group having 1 to 6 carbon atoms and halogen.

Examples of the styrene-based monomer include ortho-methylstyrene, meta-methylstyrene, para-methylstyrene, dimethylstyrene, ethyl-styrene, para-tert-butylstyrene, methoxystyrene, fluorostyrene, monobromostyrene, dibromostyrene, tribromostyrene, vinyl xylene and vinyl naphthalene. The styrene-based monomer is not limited to these. These styrene-based monomers may be used alone or in combination of two or more.

The acrylic monomer used in the organic polymer used in the polytetrafluoroethylene-based mixture is, for example, a (meth)acrylate derivative which may be substituted. More specifically, the acrylic monomer is, for example, a (meth) acrylate derivative which may be substituted by at least one group selected from the group consisting of alkyl group having 1 to 20 carbon atoms, cycloalkyl group having 3 to 8 carbon atoms, aryl group and glycidyl group.

Examples of the acrylic monomer include (meth)acrylonitrile, methyl (meth)acrylate, ethyl (meth) acrylate, propyl (meth) acrylate, butyl (meth)acrylate, amyl (meth)acrylate, hexyl (meth)acrylate, 2-ethylhexyl (meth) acrylate, cyclohexyl (meth) acrylate, octyl (meth)acrylate, dodecyl (meth) acrylate, phenyl (meth) acrylate, benzyl (meth) acrylate and glycidyl (meth) acrylate. The acrylic monomers may be used alone or in combination of two or more. Out of these, (meth) acrylonitrile is preferred.

Further, the monomer used in the organic polymer is, for example, a maleimide which may be substituted by an alkyl group having 1 to 6 carbon atoms or aryl group. Examples thereof include maleimide, N-methyl-maleimide and N-phenyl-maleimide, maleic acid, phthalic acid and itaconic acid. The monomer is not limited to these.

The amount of the acrylic monomer derived unit contained in the organic polymer used in a coating layer is preferably 8 to 11 parts by weight, more preferably 8 to 10 parts by weight, much more preferably 8 to 9 parts by weight based on 100 parts by weight of the styrene-based monomer derived unit. When the amount of the acrylic monomer derived unit is smaller than 8 parts by weight, coating strength may degrade and when the amount is larger than 11 parts by weight, the surface appearance of a molded article may deteriorate.

The polytetrafluoroethylene-based mixture has a residual water content of preferably not more than 0.5 wt %, more preferably 0.2 to 0.9 wt %, much more preferably 0.1 to 0.3 wt %. When the residual water content is higher than 0.5 wt %, it may have an adverse effect upon flame retardancy.

The production process of the polytetrafluoroethylene-based mixture includes the step of forming a coating layer containing at least one monomer selected from the group consisting of a styrene-based monomer and an acrylic monomer in the presence of an initiator on the exterior of branched polytetrafluoroethylene. Preferably, the production process further includes a drying step for reducing the residual water content to preferably not more than 0.5 wt %, more preferably 0.2 to 0.4 wt %, much more preferably 0.1 to 0.3 wt % after the step of forming the coating layer. The drying step may be carried out by using a method which is known in the industry such as a hot air drying or vacuum drying method.

The initiator used for the polytetrafluoroethylene-based mixture is not particularly limited if it can be used in the polymerization reaction of a styrene-based and/or acrylic monomer. Examples of the initiator include cumyl hydroperoxide, di-tert-butyl peroxide, benzoyl peroxide, hydrogen peroxide and potassium peroxide. The initiator is not limited to these. At least one initiator may be used for the polytetrafluoroethylene-based mixture according to reaction conditions. The amount of the initiator is freely selected from a range within which it is used in consideration of the amount of polytetrafluoroethylene and the type and amount of the monomer but preferably 0.15 to 0.25 part by weight based on the amount of the whole composition.

The polytetrafluoroethylene-based mixture was produced by a suspension polymerization method based on the following procedure.

After water and a branched polytetrafluoroethylene dispersion (solid content: 60%, polytetrafluoroethylene particle diameter: 0.15 to 0.3 µm) were first fed to a reactor, an acrylic monomer, a styrene monomer and cumene hydroperoxide as a water-soluble initiator were added to the mixture under agitation to carry out a reaction at 80 to 90° C. for 9 hours. After the end of the reaction, centrifugation was carried out by a centrifugal separator for 30 minutes to remove water so as to obtain a paste product. Thereafter, the paste product was dried with a hot air drier at 80 to 100° C. for 8 hours. The dried product was ground to obtain the polytetrafluoroethylene-based mixture of the present invention.

Since the suspension polymerization method does not require a polymerization step which is carried out by emulsion dispersion in the emulsion polymerization method disclosed by Japanese Patent No. 3469391, an emulsifier and an electrolyte salt for solidifying and precipitating latex after polymerization are not required. Since the emulsifier and the electrolyte salt contained in the mixture tend to be coexistent in the polytetrafluoroethylene mixture produced by the emulsion polymerization method and are hardly removed, it is difficult to reduce the contents of a sodium metal ion and a potassium metal ion derived from the emulsifier and the electrolyte salt. Since the polytetrafluoroethylene-based mixture used in the present invention is produced by the suspension polymerization method, the emulsifier and the electrolyte salt are not used, thereby making it possible to reduce the contents of the sodium metal ion and the potassium metal ion in the mixture and therefore improve thermal stability and hydrolysis resistance.

Coated branched PTFE may be used as the dripping inhibitor (component H) in the present invention. The coated branched PTFE is a polytetrafluoroethylene-based mixture of branched polytetrafluoroethylene particles and an organic polymer and has a coating layer made of an organic polymer, preferably a polymer containing a styrene-based monomer derived unit and/or an acrylic monomer derived unit, on the exterior of branched polytetrafluoroethylene. The coating layer is formed on the surface of branched polytetrafluoroethylene. Further, the coating layer preferably contains a copolymer of a styrene-based monomer and an acrylic monomer.

The polytetrafluoroethylene contained in the coated branched PTFE is branched polytetrafluoroethylene. When the contained polytetrafluoroethylene is not branched polytetrafluoroethylene, the dripping preventing effect becomes unsatisfactory if the addition of polytetrafluoroethylene is small. The branched polytetrafluoroethylene is particulate with a particle diameter of preferably 0.1 to 0.6 µm, more preferably 0.3 to 0.5 µm, much more preferably 0.3 to 0.4 µm. When the particle diameter is smaller than 0.1 µm, a molded article has an excellent surface appearance but it is difficult to acquire commercially available polytetrafluoroethylene having a particle diameter smaller than 0.1 µm. When the particle diameter is larger than 0.6 µm, the surface appearance of a molded article may become poor. The number average molecular weight of the polytetrafluoroethylene used in the present invention is preferably $1 \times 10^4$ to $1 \times 10^7$, more preferably $2 \times 10^6$ to $9 \times 10^6$. In general, polytetrafluoroethylene having a high molecular weight is more preferred from the viewpoint of stability. It may be in a powder or dispersion form.

The content of the branched polytetrafluoroethylene in the coated branched PTFE is preferably 20 to 60 parts by weight, more preferably 40 to 55 parts by weight, much more preferably 47 to 53 parts by weight, particularly preferably 48 to 52 parts by weight, most preferably 49 to 51 parts by weight based on 100 parts by weight of the total weight of the coated branched PTFE. When the content of the branched polytetrafluoroethylene falls within the above range, the high dispersibility of the branched polytetrafluoroethylene can be obtained.

<Other Additives>
(Phosphorus-Based Stabilizer)

The resin composition of the present invention may comprise a phosphorus-based stabilizer. The phosphorus-based stabilizer is selected from phosphorous acid, phosphoric acid, phosphonous acid, phosphonic acid and esters thereof, and a tertiary phosphine.

Examples of the phosphite compound include triphenyl phosphite, tris(nonylphenyl)phosphite, tridecyl phosphite, trioctyl phosphite, trioctadecyl phosphite, didecylmonophenyl phosphite, dioctylmonophenyl phosphite, diisopropylmonophenyl phosphite, monobutyldiphenyl phosphite, monodecyldiphenyl phosphite, monooctyldiphenyl phosphite, tris(diethylphenyl)phosphite, tris(di-iso-propylphenyl)phosphite, tris(di-n-butylphenyl)phosphite, tris(2,4-di-tert-butylphenyl)phosphite, tris(2,6-di-tert-butylphenyl) phosphite, distearyl pentaerythritol diphosphite, bis(2,4-di-tert-butylphenyl)pentaerythritol diphosphite, bis(2,6-di-tert-butyl-4-methylphenyl)pentaerythritol diphosphite, bis(2,6-di-tert-butyl-4-ethylphenyl)pentaerythritol diphosphite, bis{2,4-bis(1-methyl-1-phenylethyl)phenyl} pentaerythritol diphosphite, phenyl bisphenol A pentaerythritol diphosphite, bis(nonylphenyl)pentaerythritol diphosphite and dicyclohexyl pentaerythritol diphosphite.

Other phosphite compounds which react with a dihydric phenol and have a cyclic structure may also be used. The phosphite compounds include 2,2'-methylenebis(4,6-di-tert-butylphenyl)(2,4-di-tert-butylphenyl)phosphite, 2,2'-methylenebis(4,6-di-tert-butylphenyl) (2-tert-butyl-4-methylphenyl)phosphite and 2,2'-methylenebis(4,6-di-tert-butylphenyl)octyl phosphite.

Examples of the phosphate compound include tributyl phosphate, trimethyl phosphate, tricresyl phosphate, triphenyl phosphate, trichlorophenyl phosphate, triethyl phosphate, diphenylcresyl phosphate, diphenylmonoorthoxenyl phosphate, tributoxyethyl phosphate, dibutyl phosphate, dioctyl phosphate and diisopropyl phosphate. Triphenyl phosphate and trimethyl phosphate are preferred.

Examples of the phosphonite compound include tetrakis (2,4-di-tert-butylphenyl)-4,4'-biphenylene diphosphonite, tetrakis(2,4-di-tert-butylphenyl)-4,3'-biphenylene diphosphonite, tetrakis(2,4-di-tert-butylphenyl)-3,3'-biphenylene diphosphonite, tetrakis(2,6-di-tert-butylphenyl)-4,4'-biphenylene diphosphonite, tetrakis(2,6-di-tert-butylphenyl)-4,3'-biphenylene diphosphonite, tetrakis(2,6-di-tert-butylphenyl)-3,3'-biphenylene diphosphonite, bis(2,4-di-tert-butylphenyl)-4-phenyl-phenyl phosphonite, bis(2,4-di-tert-butylphenyl)-3-phenyl-phenyl phosphonite, bis(2,6-di-n-butylphenyl)-3-phenyl-phenyl phosphonite, bis(2,6-di-tert-butylphenyl)-4-phenyl-phenyl phosphonite and bis(2,6-di-tert-butylphenyl)-3-phenyl-phenyl phosphonite. Tetrakis(di-tert-butylphenyl)-biphenylene diphosphonites and bis(di-tert-butylphenyl)-phenyl-phenyl phosphonites are preferred, and tetrakis(2,4-di-tert-butylphenyl)-biphenylene diphosphonites and bis(2,4-di-tert-butylphenyl)-phenyl-phenyl phosphonites are more preferred. The phosphonite compound may be and is preferably used in combination with the above phosphite compound having an aryl group substituted by two or more alkyl groups.

Examples of the phosphonate compound include dimethyl benzenephosphonate, diethyl benzenephosphonate and dipropyl benzenephosphonate.

Examples of the tertiary phosphine include triethylphosphine, tripropylphosphine, tributylphosphine, trioctylphosphine, triamylphosphine, dimethylphenylphosphine, dibutylphenylphosphine, diphenylmethylphosphine, diphenyloctylphosphine, triphenylphosphine, tri-p-tolylphosphine, trinaphthylphosphine and diphenylbenzylphosphine. Triphenylphosphine is particularly preferred as the tertiary phosphine.

The above phosphorus-based stabilizers may be used alone or in combination of two or more. Out of these phosphorus-based stabilizers, phosphonite compounds and phosphite compounds represented by the following general formula (16) are preferred.

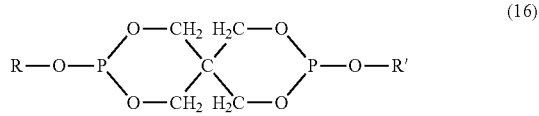
(16)

(In the formula (16), R and R' are each an alkyl group having 6 to 30 carbon atoms or aryl group having 6 to 30 carbon atoms and may be the same or different.)

As described above, tetrakis(2,4-di-tert-butylphenyl)-biphenylene diphosphonites are preferred as the phosphonite compound. Stabilizers comprising this phosphonite as the main component are marketed under the trade names of Sandostab P-EPQ (trademark, manufactured by Clariant) and Irgafos P-EPQ (trademark, manufactured by CIBA SPECIALTY CHEMICALS) and may all be used.

More preferred phosphite compounds of the above formula (16) are distearyl pentaerythritol diphosphite, bis(2,4-di-tert-butylphenyl)pentaerythritol diphosphite, bis(2,6-di-tert-butyl-4-methylphenyl)pentaerythritol diphosphite and bis{2,4-bis(1-methyl-1-phenylethyl)phenyl}pentaerythritol diphosphite.

Distearyl pentaerythritol diphosphite is marketed under the trade names of ADK STAB PEP-8 (trademark, manufactured by ADEKA Corporation) and JPP681S (trademark, manufactured by Johoku Chemical Engineering Co., Ltd.). Bis(2,4-di-tert-butylphenyl)pentaerythritol diphosphite is marketed under the trade names of ADK STAB PEP-24G (trademark, manufactured by ADEKA Corporation), Alkanox P-24 (trademark, manufactured by Great Lakes Chemical Corporation), Ultranox P626 (trademark, manufactured by GE Specialty Chemicals), Doverphos S-9432 (trademark, manufactured by Dover Chemical Corporation) and Irgafos 126 and 126FF (trademarks, manufactured by CIBA SPECIALTY CHEMICALS).

Bis(2,6-di-tert-butyl-4-methylphenyl)pentaerythritol diphosphite is marketed under the trade name of ADK STAB PEP-36 (trademark, manufactured by ADEKA Corporation) and may be easily used.

Bis{2,4-bis(1-methyl-1-phenylethyl)phenyl} pentaerythritol diphosphite is marketed under the trade names of ADK STAB PEP-45 (trademark, manufactured by ADEKA Corporation) and Doverphos S 9228 (trademark, manufactured by Dover Chemical Corporation).

The above phosphorus-based stabilizes may be used alone or in combination of two or more. The content of the phosphorus-based stabilizer is preferably 0.01 to 1.0 part by weight, more preferably 0.03 to 0.8 part by weight, much more preferably 0.05 to 0.5 part by weight based on 100 parts by weight of the total of the components A and B. When the content is lower than 0.01 part by weight, a thermal decomposition control effect is not obtained at the time of processing and mechanical properties may not deteriorate and even when the content is higher than 1.0 part by weight, mechanical properties may deteriorate.

(Phenol-Based Stabilizer)

The resin composition of the present invention may comprise a phenol-based stabilizer. The phenol-based stabilizer is generally a hindered phenol, semi-hindered phenol or less-hindered phenol compound. A hindered phenol compound is preferably used as it thermally stabilizes a polypropylene-based resin.

Examples of the hindered phenol compound include α-tocopherol, butylhydroxytoluene, sinapyl alcohol, vitamin E, octadecyl-3-(3,5-di-tert-butyl-4-hydroxyphenyl) propionate, 2-tert-butyl-6-(3'-tert-butyl-5'-methyl-2'-hydroxybenzyl)-4-methylphenyl acrylate, 2,6-di-tert-butyl-4-(N,N-dimethylaminomethyl)phenol, 3,5-di-tert-butyl-4-hydroxybenzylphosphonate diethyl ester, 2,2'-methylenebis(4-methyl-6-tert-butylphenol), 2,2'-methylenebis(4-ethyl-6-tert-butylphenol), 4,4'-methylenebis(2,6-di-tert-butylphenol), 2,2'-methylenebis(4-methyl-6-cyclohexylphenol), 2,2'-dimethylene-bis(6-α-methyl-benzyl-p-cresol), 2,2'-ethylidene-bis(4,6-di-tert-butylphenol), 2,2'-butylidene-bis(4-methyl-6-tert-butylphenol), 4,4'-butylidene-bis(3-methyl-6-tert-butylphenol), triethylene glycol-N-bis-3-(3-tert-butyl-4-hydroxy-5-methylphenyl) propionate, 1,6-hexanediol-bis[3-(3,5-di-tert-butyl-4-hydroxyphenyl) propionate], bis[2-tert-butyl-4-methyl-6-(3-tert-butyl-5-methyl-2-hydroxybenzyl) phenyl]terephthalate, 3,9-bis{2-[3-(3-tert-butyl-4-hydroxy-5-methylphenyl) propionyloxy]-1,1-dimethylethyl}-2,4,8,10-tetraoxaspiro [5,5]undecane, 4,4'-thiobis(6-tert-butyl-m-cresol), 4,4'-thiobis(3-methyl-6-tert-butylphenol), 2,2'-thiobis(4-methyl-6-tert-butylphenol), bis(3,5-di-tert-butyl-4-hydroxybenzyl)sulfide, 4,4'-di-thiobis(2,6-di-tert-butylphenol), 4,4'-tri-thiobis(2,6-di-tert-butylphenol), 2,2-thiodiethylenebis-[3-(3,5-di-tert-butyl-4-hydroxyphenyl) propionate], 2,4-bis(n-octylthio)-6-(4-hydroxy-3,5-di-tert-butylanilino)-1,3,5-triazine, N,N'-hexamethylenebis-(3,5-di-tert-butyl-4-hydroxyhydrocinnamide), N,N'-bis[3-(3,5-di-tert-butyl-4-hydroxyphenyl)propionyl] hydrazine, 1,1,3-tris(2-methyl-4-hydroxy-5-tert-butylphenyl)butane, 1,3,5-trimethyl-2,4,6-tris(3,5-di-tert-butyl-4-hydroxybenzyl) benzene, tris(3,5-di-tert-butyl-4-hydroxyphenyl)isocyanurate, tris(3,5-di-tert-butyl-4-hydroxybenzyl)isocyanurate, 1,3,5-tris(4-tert-butyl-3-hydroxy-2,6-dimethylbenzyl) isocyanurate, 1,3,5-tris-2[3(3,5-di-tert-butyl-4-hydroxyphenyl) propionyloxy]ethyl isocyanurate, tetrakis[methylene-3-(3,5-di-tert-butyl-4-hydroxyphenyl) propionate]methane, triethylene glycol-N-bis-3-(3-tert-butyl-4-hydroxy-5-methylphenyl) propionate, triethylene glycol-N-bis-3-(3-tert-butyl-4-hydroxy-5-methylphenyl) acetate, 3,9-bis[2-{3-(3-tert-butyl-4-hydroxy-5-methylphenyl) acetyloxy}-1,1-dimethylethyl]-2,4,8,10-tetraoxaspiro [5,5]undecane, tetrakis[methylene-3-(3-tert-butyl-4-hydroxy-5-methylphenyl)propionate]methane, 1,3,5-trimethyl-2,4,6-tris(3-tert-butyl-4-hydroxy-5-methylbenzyl)benzene and tris(3-tert-butyl-4-hydroxy-5-methylbenzyl)isocyanurate.

Out of the above compounds, tetrakis[methylene-3-(3-tert-butyl-4-hydroxy-5-methylphenyl)propionate]methane and octadecyl-3-(3,5-di-tert-butyl-4-hydroxyphenyl) propionate are preferably used.

Further, (3,3',3'',5,5',5''-hexa-tert-butyl-a,a',a''-(mesitylene-2,4,6-triyl)tri-p-cresol represented by the following formula (17) and 1,3,5-tris(3,5-di-tert-butyl-4-hydroxybenzyl)-1,3,5-triazine-2,4,6(1H,3H,5H)-trione represented by the following formula (18) are more preferably used as they are excellent in the suppression of the reduction of mechanical properties caused by thermal decomposition at the time of processing.

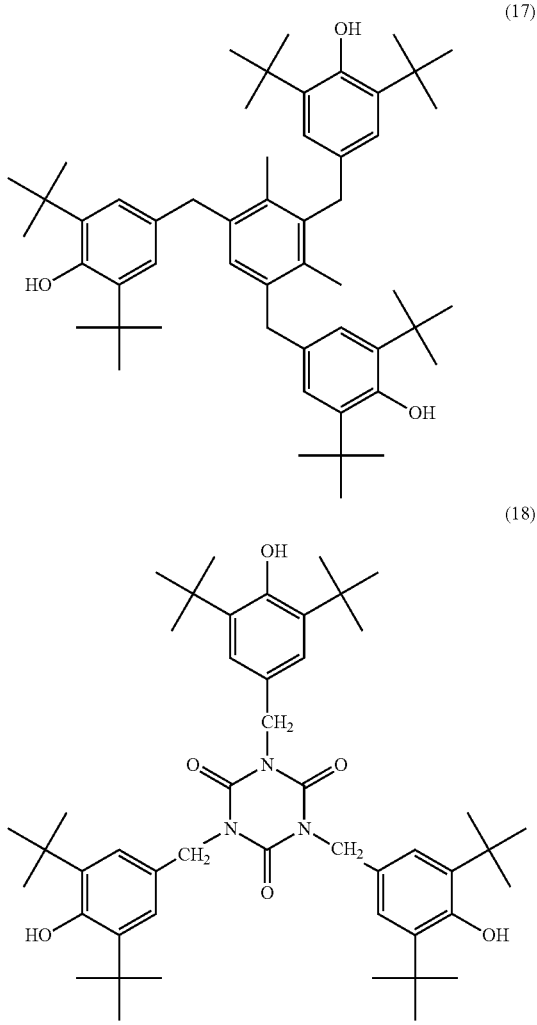

(17)

(18)

The above phenol-based stabilizers may be used alone or in combination of two or more. The content of the phenol-based stabilizer is preferably 0.05 to 1.0 part by weight, more preferably 0.07 to 0.8 part by weight, much more preferably 0.1 to 0.5 part by weight based on 100 parts by weight of the total of the components A and B. When the content is lower than 0.05 part by weight, a thermal decomposition suppression effect at the time of processing is not obtained and mechanical properties may deteriorate and when the content is higher than 1.0 part by weight, mechanical properties may deteriorate as well.

Any one of the phosphorus-based stabilizer and the phenol-based stabilizer is preferably used, and a combination of these is more preferably used. When they are used in combination, 0.01 to 0.5 part by weight of the phosphorus-based stabilizer and 0.01 to 0.5 part by weight of the phenol-based stabilizer are preferably used based on 100 parts by weight of the total of the components A and B.

(Ultraviolet Absorbent)

The resin composition of the present invention may comprise an ultraviolet absorbent. Benzophenone-based ultraviolet absorbents include 2,4-dihydroxybenzophenone, 2-hydroxy-4-methoxybenzophenone, 2-hydroxy-4-octoxybenzophenone, 2-hydroxy-4-benzyloxybenzophenone, 2-hydroxy-4-methoxy-5-sulfoxybenzophenone, 2-hydroxy-4-methoxybenzophenone-5-sulfonic acid trihydriderate, 2,2'-dihydroxy-4-methoxybenzophenone, 2,2',4,4'-tetrahydroxybenzophenone, 2,2'-dihydroxy-4,4'-dimethoxybenzophenone, 2,2'-dihydroxy-4,4'-dimethoxy-5-sodiumsulfoxybenzophenone, bis(5-benzoyl-4-hydroxy-2-methoxyphenyl)methane, 2-hydroxy-4-n-dodecyloxybenzophenone and 2-hydroxy-4-methoxy-2'-carboxybenzophenone.

Benzotriazole-based ultraviolet absorbents include 2-(2-hydroxy-5-methylphenyl)benzotriazole, 2-(2-hydroxy-5-tert-octylphenyl)benzotriazole, 2-(2-hydroxy-3,5-dicumylphenyl)phenylbenzotriazole, 2-(2-hydroxy-3-tert-butyl-5-methylphenyl)-5-chlorobenzotriazole, 2,2'-methylenebis[4-(1,1,3,3-tetramethylbutyl)-6-(2H-benzotriazol-2-yl)phenol], 2-(2-hydroxy-3,5-di-tert-butylphenyl)benzotriazole, 2-(2-hydroxy-3,5-di-tert-butylphenyl)-5-chlorobenzotriazole, 2-(2-hydroxy-3,5-di-tert-amylphenyl)benzotriazole, 2-(2-hydroxy-5-tert-octylphenyl)benzotriazole, 2-(2-hydroxy-5-tert-butylphenyl)benzotriazole, 2-(2-hydroxy-4-octoxyphenyl)benzotriazole, 2,2'-methylenebis(4-cumyl-6-benzotriazolephenyl), 2,2'-p-phenylenebis(1,3-benzoxazin-4-one) and 2-[2-hydroxy-3-(3,4,5,6-tetrahydrophthalimidomethyl)-5-methylphenyl]benzotriazole. Polymers having a 2-hydroxyphenyl-2H-benzotriazole skeleton such as a copolymer of 2-(2'-hydroxy-5-methaeryloxyethylphenyl)-2H-benzotriazole and a vinyl-based monomer copolymerizable with that monomer and a copolymer of 2-(2'-hydroxy-5-acryloxyethylpheny)-2H-benzotriazole and a vinyl-based monomer copolymerizable with that monomer are also included.

Hydroxyphenyitriazine-based ultraviolet absorbents include 2-(4,6-diphenyl-1,3,5-triazin-2-yl)-5-hexyloxyphenol, 2-(4,6-diphenyl-1,3,5-triazin-2-yl)-5-methyloxyphenol, 2-(4,6-diphenyl-1,3,5-triazin-2-yl)-5-ethyloxyphenol, 2-(4,6-diphenyl-1,3,5-triazin-2-yl)-5-propyloxyphenol and 2-(4,6-diphenyl-1,3,5-triazin-2-yl)-5-butyloxyphenol. Further, compounds having a 2,4-dimethylphenyl group in place of the phenyl groups of the above compounds, such as 2-(4,6-bis(2,4-dimethylphenyl)-1,3,5-triazin-2-yl)-5-hexyloxyphenol, are further included.

Cyclic iminoester-based ultraviolet absorbents include 2,2'-p-phenylenebis(3,1-benzoxazin-4-one), 2,2'-m-phenylenebis(3,1-benzoxazin-4-one) and 2,2'-p,p'-diphenylenebis(3,1-benzoxazin-4-one).

Cyanoacrylate-based ultraviolet absorbents include 1,3-bis[(2'-cyano-3',3'-diphenylacryloyl)oxy]-2,2-bis[(2-cyano-3,3-diphenylacryloyl)oxy]methyl)propane and 1,3-bis-[(2-cyano-3,3-diphenylacryloyl)oxy]benzene.

The above ultraviolet absorbent may be a polymer type ultraviolet absorbent obtained by copolymerizing an ultraviolet absorbing monomer having the structure of a radically polymerizable monomer compound and/or an optically stable monomer with a monomer such as an alkyl (meth) acrylate.

The above ultraviolet absorbing monomer is preferably a compound having a benzotriazole skeleton, a benzophenone skeleton, a triazine skeleton, a cyclic iminoester skeleton or a cyanoacrylate skeleton in the ester substituent of a (meth) acrylic acid ester.

Out of the above compounds, a compound represented by any one of the following formulas (19), (20) and (21) is preferably used.

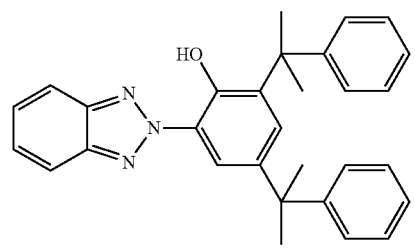

(19)

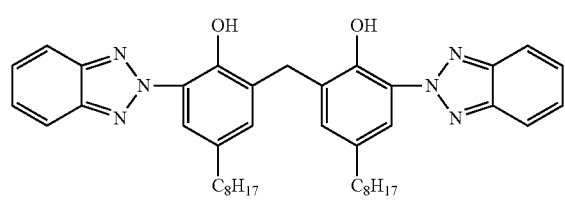

(20)

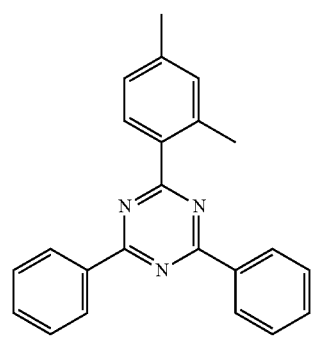

(21)

The above ultraviolet absorbents may be used alone or in combination of two or more.

The content of the ultraviolet absorbent is preferably 0.1 to 2 parts by weight, more preferably 0.12 to 1.5 parts by weight, much more preferably 0.15 to 1 part by weight based on 100 parts by weight of the total of the components A and B. When the content of the ultraviolet absorbent is lower than 0.1 part by weight, satisfactory light resistance may not be developed and when the content is higher than 2 parts by weight, a poor appearance may be obtained and physical properties may deteriorate due to the generation of a gas.

(Release Agent)

Preferably, the resin composition of the present invention further comprises a release agent in order to improve productivity at the time of molding and suppress the distortion of a molded article. Known release agents may be used. Examples of the release agent include saturated fatty acid esters, unsaturated fatty acid esters, polyolefin-based waxes (such as polyethylene wax, 1-alkene polymers, waxes modified by a functional group-containing compounds may also be used), silicone compounds, fluorine compounds (such as fluorine oils typified by polyfluoroalkyl ethers), paraffin wax and beeswax.

Out of these, fatty acid esters are preferred as the release agent. The fatty acid esters are esters of an aliphatic alcohol and an aliphatic carboxylic acid. The aliphatic alcohol may be either a monohydric alcohol or a polyhydric alcohol having 2 or more hydroxyl groups. The number of carbon atoms of the alcohol is 3 to 32, preferably 5 to 30. Examples of the monohydric alcohol include dodecanol, tetradecanol, hexadecanol, octadecanol, eicosanol, tetracosanol, ceryl alcohol and triacontanol. Examples of the polyhydric alcohol include pentaerythritol, dipentaerythritol, tripentaerythritol, polyglycerol(triglycerol to hexaglycerol), ditrimethylolpropane, xylitol, sorbitol and mannitol. In the fatty acid ester of the present invention, a polyhydric alcohol is more preferred.

The aliphatic carboxylic acid has preferably 3 to 32 carbon atoms, particularly preferably 10 to 22 carbon atoms.

Examples of the aliphatic carboxylic acid include saturated aliphatic carboxylic acids such as decanoic acid, undecanoic acid, dodecanoic acid, tridecanoic acid, tetradecanoic acid, pentadecanoic acid, hexadecanoic acid (palmitic acid), heptadecanoic acid, octadecanoic acid (stearic acid), nonadecanoic acid, behenic acid, icosanoic acid and docosanoic acid. Unsaturated aliphatic carboxylic acids such as palmitoleic acid, oleic acid, linoleic acid, linolenic acid, eicosenoic acid, eicosapentaenoic acid and cetoleic acid are also included. Out of these, aliphatic carboxylic acids having 14 to 20 carbon atoms are preferred. Saturated aliphatic carboxylic acids are more preferred. Stearic acid and palmitic acid are particularly preferred.

Since the above aliphatic carboxylic acids such as stearic acid and palmitic acid are generally produced from natural oils and fats such as animal oils and fats typified by beef tallow and lard and vegetable oils and fats typified by palm oil and sunflower oil, they are mixtures containing another carboxylic acid component having a different number of carbon atoms. Therefore, even in the production of the aliphatic acid ester of the present invention, an aliphatic carboxylic acid is produced from a natural oil or fat, and therefore an aliphatic carboxylic acid in the form of a mixture containing another carboxylic acid component, especially stearic acid or palmitic acid, is preferably used.

The fatty acid ester may be either a partial ester or a full ester. Since the partial ester generally has a large hydroxyl value and easily triggers the decomposition of a resin at a high temperature, the full ester is preferred. The acid value of the fatty acid ester is preferably not more than 20, more preferably 4 to 20, much more preferably 4 to 12 from the viewpoint of heat stability. The acid value can be substantially 0. The hydroxyl value of the fatty acid ester is preferably 0.1 to 30. Further, the iodine value is preferably not more than 10. The iodine value can be substantially 0. These properties can be obtained by methods specified in JIS K 0070.

The content of the release agent is preferably 0.005 to 2 parts by weight, more preferably 0.01 to 1 part by weight, much more preferably 0.05 to 0.5 part by weight based on 100 parts by weight of the total of the components A and B. Within the above range, the resin composition has excellent mold releasability and roll releasability. This amount of the fatty acid ester provides a resin composition having excellent mold releasability and roll releasability without impairing a good hue.

(Dye or Pigment)

The resin composition of the present invention can provide molded articles having various designs when it further comprises various dyes or pigments. By blending a fluorescent brightener or a luminescent fluorescent dye other than the fluorescent brightener, a good design effect making use of emission color can be provided. A resin composition which is colored and develops a bright color with a trace amount of a dye or a pigment can be provided as well.

Examples of the fluorescent dye (including the fluorescent brightener) used in the present invention include coumalin-based fluorescent dyes, benzopyran-based fluorescent dyes, perylene-based fluorescent dyes, anthraquinone-based fluorescent dyes, thioindigo-based fluorescent dyes, xanthene-based fluorescent dyes, xanthone-based fluorescent dyes, thioxanthene-based fluorescent dyes, thioxanthone-based fluorescent dyes, thiazine-based fluorescent dyes and diaminostilbene-based fluorescent dyes. Out of these, coumalin-based fluorescent dyes, benzopyran-based fluorescent dyes and perylene-based fluorescent dyes are preferred because they have high heat resistance and rarely deteriorate at the time of molding the polycarbonate resin.

Dyes other than the above bluing agents and fluorescent dyes include perylene-based dyes, coumalin-based dyes, thioindigo-based dyes, anthraquinone-based dyes, thioxanthone-based dyes, ferrocyanides such as iron blue, perinone-based dyes, quinoline-based dyes, quinacridone-based dyes, dioxazine-based dyes, isoindolinone-based dyes and phthalocyanine-based dyes. The resin composition of the present invention can obtain a good metallic color when it is blended with a metallic pigment. The metallic pigment is preferably a lamellar filler having a metal film or a metal oxide film.

The content of the above dye or pigment is preferably 0.00001 to 1 part by weight, more preferably 0.00005 to 0.5 part by weight based on 100 parts by weight of the total of the components A and B.

(Other Heat Stabilizers)

The resin composition of the present invention may comprise another heat stabilizer except for the above phosphorus-based stabilizer and the above phenol-based stabilizer. The other heat stabilizer is preferably used in combination with any one of the above stabilizer and the antioxidant, particularly preferably both of them. A preferred example of the heat stabilizer is a lactone-based stabilizer typified by a reaction product of 3-hydroxy-5,7-di-tert-butyl-furan-2-one and o-xylene (this stabilizer is detailed in JP-A 7-233160). This compound is marketed under the trade name of Irganox HP-136 (trademark, manufactured by CIBA SPECIALTY CHEMICALS) and may be used. A stabilizer prepared by mixing together the above compound, a phosphite compound and a hindered phenol compound is commercially available. A preferred example of this stabilizer is the Irganox HP-2921 of CIBA SPECIALTY CHEMICALS. This stabilizer mixture may also be used in the present invention. The content of the lactone-based stabilizer is preferably 0.0005 to 0.05 part by weight, more preferably 0.001 to 0.03 part by weight based on 100 parts by weight of the total of the components A and B.

Other stabilizers include sulfur-containing stabilizers such as pentaerythritol tetrakis(3-mercaptopropionate), pentaerythritol tetrakis(3-laurylthiopropionate) and glycerol 3 stearyl thiopropionate. These stabilizers are effective especially when the resin composition is used for rotational molding. The content of the sulfur-containing stabilizer is preferably 0.001 to 0.1 part by weight, more preferably 0.01 to 0.08 part by weight based on 100 parts by weight of the total of the components A and B.

(Light High-Reflection White Pigment)

When the resin composition of the present invention is mixed with a light high-reflection white pigment, a light reflection effect can be provided. Examples of the white pigment include titanium oxide, zinc sulfide, zinc oxide, barium sulfate, calcium carbonate and baked kaolin. Titanium oxide is particularly preferably used. As titanium oxide in use, titanium oxide surface-treated with an organic material and having an average particle diameter of 0.1 to 5.0 µm is preferred. (In the present invention, the titanium oxide component of a titanium oxide pigment is referred to as "TiO2.", and the whole pigment containing a surface treating agent is referred to as "titanium oxide".) The crystal form of TiO2 may be either anatase or rutile, both of which may be mixed together before use as required. The rutile crystal is more preferred from the viewpoints of initial mechanical properties and long-term weatherability.

The anatase crystal may be contained in the rutile crystal. Further, as for the TiO2 production process, TiO2 manufactured by a sulfuric acid process, chlorine process or other process may be used, out of which the chlorine process is preferred. The titanium oxide of the present invention is not limited to a particular form but preferably particulate. Titanium oxide is commonly used for coloring.

The average particle diameter of titanium oxide used as the white pigment in the present invention is preferably 0.10 to 5.0 µm, more preferably 0.15 to 2.0 µm, much more preferably 0.18 to 1.5 µm. When the average particle diameter is smaller than 0.10 µm and titanium oxide is highly loaded, a poor appearance such as a silver streak tends to be obtained. When the average particle diameter is larger than 5.0 µm, the deterioration of appearance and mechanical properties may occur. The average particle diameter is calculated from number average particle diameter by measuring the particle diameter of each particle by observation through an electron microscope.

The titanium oxide used in the present invention is preferably surface-treated with an organic compound. When titanium oxide not surface treated is used, the appearance becomes poor by yellowing, the reflectance of a molded article greatly lowers, and satisfactory solar reflectance may not be obtained, whereby the molded article may not be suitable for outdoor use.

As the surface treating agent, polyol-based, amine-based and silicone-based surface treating agents may be used. Examples of the polyol-based surface treating agent include pentaerythritol, trimethylolethane and trimethylolpropane. Examples of the amine-based surface treating agent include acetates of triethanolamine and acetates of trimethylolamine. Examples of the silicone-based surface treating agent include alkylchlorosilanes (such as trimethyl chlorosilane), alkyl alkoxysilanes (such as methyl trimethoxysilane) and hydrogen polysiloxanes. The hydrogen polysiloxanes include alkyl hydrogen polysiloxanes and alkyl phenyl hydrogen polysiloxanes. The alkyl group is preferably a methyl group or ethyl group. Titanium oxide surface-treated with an alkyl alkoxysilane and/or hydrogen polysiloxane provides excellent light reflectivity to the resin composition of the present invention.

The amount of the organic compound used for surface treatment is preferably 0.05 to 5 parts by weight, more preferably 0.5 to 3 parts by weight, much more preferably 1.5 to 2.5 parts by weight based on 100 parts by weight of titanium oxide. When the amount of the organic compound is smaller than 0.05 part by weight, satisfactory heat stability may not be obtained and when the amount is larger than 5 parts by weight, a molding failure such as the formation of a silver streak may occur disadvantageously. The organic compound surface treating agent is preferably applied to titanium oxide (more preferably titanium oxide coated with another metal oxide) in advance. However, the surface treating agent may be added separately when the raw materials of the resin composition are melt-kneaded together to surface-treat titanium oxide in the melt-kneading step.

The content of the light high-reflection white pigment is preferably 0.1 to 10 parts by weight, more preferably 0.15 to 7.5 parts by weight, much more preferably 0.15 to 5 parts by weight based on 100 parts by weight of the total of the components A and B. When the content of the light high-reflection white pigment is lower than 0.1 part by weight, a satisfactory white appearance and light shielding property may not be obtained and when the content is higher than 10 parts by weight, a molding failure such as the formation of a silver streak may occur and physical properties may greatly deteriorate disadvantageously. The above light high-reflection white pigments may be used in combination of two or more.

(Another Resin and Elastomer)

Another resin and an elastomer other than the component C may be used in the resin composition of the present invention in small proportions as long as the effect of the present invention is obtained.

Examples of the other resin include polyester resins such as polyethylene terephthalate and polybutylene terephthalate, polyamide resins, polyimide resins, polyether imide resins, polyurethane resins, silicone resins, polyphenylene ether resins, polymethacrylate resins, phenol resins and epoxy resins.

Examples of the elastomer include isobutylene/isoprene rubber, ethylene/propylene rubber, acrylic elastomers, polyester-based elastomers and polyamide-based elastomers.

(Other Additives)

Additives known per se may be mixed with the resin composition of the present invention in small proportions to provide various functions to a molded article and improve the characteristics properties of the molded article. These additives are used in normal amounts as long as the object of the present invention is not impeded.

The additives include a sliding agent (such as PTFE particles), a colorant (such as a pigment or dye typified by carbon black), a light diffusing agent (such as acrylic crosslinked particles, silicone crosslinked particles, thin glass flakes or calcium carbonate particles), a fluorescent dye, an inorganic phosphor (such as a phosphor containing an aluminate as a mother crystal), an antistatic agent, a crystal nucleating agent, inorganic and organic antibacterial agents, an optical catalyst-based antifouling agent (such as particulate titanium oxide or particulate zinc oxide), a radical generator, an infrared absorbent (heat-ray absorbent); and a photochromic agent.

(Production of Thermoplastic Resin Composition)

Any process is employed to produce the resin composition of the present invention. For example, after the components A to C and optionally other additives are fully mixed together by using premixing means such as a twin-cylinder mixer, Henschel mixer, mechanochemical device or extrusion mixer, the resulting premixture is granulated by means of an extrusion granulator or a briquetting machine as required, melt kneaded by means of a melt kneader typified by a vented double-screw extruder and pelletized by means of a pelletizer.

Alternatively, a process in which the above components are supplied into a melt kneader typified by a vented double-screw extruder independently or a process in which some of the components are premixed together and supplied into a melt kneader independently from the other components is employed. As for the process in which some of the components are premixed together, for example, after components except for the component A are premixed together, the resulting premixture is mixed with the thermoplastic resin which is the component A or directly supplied into the extruder.

As the premixing method, for example, when the component A is powdery, a method in which some of the powders and additives are blended together to produce a master batch of additives diluted with the powders and this master batch is used may be employed. Further, a method in which one component is supplied at a halfway position of a melt extruder independently may also be employed. When there is a liquid component to be blended, a liquid injection device or a liquid adder may be used to supply it into a melt extruder.

An extruder having a vent from which water contained in the raw materials and a volatile gas generated from the molten kneaded resin can be removed may be preferably used. A vacuum pump is preferably installed to discharge the generated water and the volatile gas to the outside of the extruder from the vent efficiently. A screen for removing foreign matter contained in the extruded raw material may be installed in a zone before the die of the extruder to remove the foreign matter from the resin composition. Examples of the screen include a metal net, a screen changer and a sintered metal plate (such as a disk filter).

Examples of the melt kneader include a Banbury mixer, a kneading roll, a single-screw extruder and a multi-screw extruder having 3 or more screws besides a double-screw extruder.

The resin extruded as described above is pelletized by directly cutting it or by forming a strand therefrom and cutting it with a pelletizer. When the influence of extraneous dust must be reduced at the time of pelletizing, the atmosphere surrounding the extruder is preferably made clean. In the manufacture of the above pellets, it is possible to narrow the form distribution of pellets, reduce the number of miscut products, reduce the amount of fine powders generated at the time of conveyance or transportation and cut the number of cells (vacuum cells) formed in the strand or pellet by using various methods already proposed for polycarbonate resins for use in optical disks. Thereby, it is possible to increase the molding cycle and reduce the incidence of a defect such as a silver streak. The shape of the pellet may be columnar, rectangular column-like, spherical or other ordinary shape, preferably columnar. The diameter of the column is preferably 1 to 5 mm, more preferably 1.5 to 9 mm, much more preferably 2 to 3.3 mm. The length of the column is preferably 1 to 30 mm, more preferably 2 to 5 mm, much more preferably 2.5 to 3.5 mm.

(Molded Article)

A molded article can be manufactured by injection molding the pellets of the resin composition obtained by the above process. The molded article can be obtained not only by ordinary molding techniques but also by injection molding techniques such as injection compression molding, injection press molding, gas assist injection molding, foam molding (including what comprises the injection of a supercritical fluid), insert molding, in-mold coating molding, insulated runner molding, quick heating and cooling molding, two-color molding, sandwich molding and super high-speed injection molding according to purpose. The advantages of these molding techniques have already been widely known. Both cold-runner molding and hot-runner molding techniques may also be employed.

The resin composition of the present invention may be formed into an odd-shaped extrusion molded article, a sheet or a film by extrusion molding. Inflation, calendering and casting techniques may be used to mold a sheet or a film. Further, specific stretching operation may be used to mold a heat shrinkable tube. The resin composition of the present invention can be formed into a molded article by rotational molding or blow molding as well.

The molded article preferably has a tape peeling resistance of less than 0.5%.

The tape peeling resistance was evaluated by pressing a cellophane tape (CELLOTAPE CT-15 of NICHIBAN Co., Ltd.) against a 2 mm-thick part of a sample plate (a three-stage plate with a hole) obtained by molding the resin composition with fingers to affix it on that part, tearing it off and measuring the peeled area of the sample on the cellophane tape. The sample plate is a three-stage plate having a part having a thickness of 3 mm, a length of 20 mm and a width of 50 mm, a part having a thickness of 2 mm, a length of 45 mm and a width of 50 mm and a part having a thickness of 1 mm, a length of 25 mm and a width of 50 mm.

<Method of Improving Tape Peeling Resistance>

The present invention is a method of improving the tape peeling resistance of a molded article comprising a polycarbonate-based resin (component A), a polyolefin-based resin (component B) and a styrene-based thermoplastic elastomer (component C), in which at least one selected from the group consisting of a styrene-ethylene-propylene-styrene block copolymer (SEPS), a styrene-ethylene-butylene-styrene block copolymer (SEBS) and a styrene-butadiene-butylene-styrene block copolymer (SBBS) is used as the styrene-based thermoplastic elastomer (component C), and a resin having a MFR at 230° C. under a load of 2.16 kg of not less than 40 g/10 min is used as the polyolefin-based resin (component B).

According to the present invention, the tape peeling resistance of a molded article can be improved by using a specific styrene-based thermoplastic elastomer (component C) and a polyolefin-based resin having a MFR at 230° C. under a load of 2.16 kg of not less than 40 g/10 min (component B).

EXAMPLES

The following examples are provided for the purpose of further illustrating the present invention. "Part" in Examples means parts by weight and "%" means wt % unless otherwise noted. Evaluations were made by the following methods.

(Evaluation of Thermoplastic Resin Composition)

(i) Appearance

The appearance of a sample plate (three-stage plate with a hole) manufactured by the following method was evaluated visually. The evaluation was made based on the following criteria.

◉: a weld is not noticeable and a streaky appearance defect is not seen
○: a weld is slightly noticeable but a streaky appearance defect is not seen
Δ: a weld is slightly noticeable and a streaky appearance defect is seen
x: a weld is striking and a marked streaky appearance defect is seen (ii) Tape Peeling Resistance A cellophane tape (CELLOTAPE CT-15 of NICHIBAN Co., Ltd.) was put on a 2 mm-thick part of a sample plate (three-stage plate with a hole) obtained by the following method, pressed against the part with fingers to be affixed to the part, and torn off from the part to evaluate the peeled state of the sample on the cellophane tape. The evaluation was made based on the following criteria according to the peeling area of the cellophane tape.

◉: peeling is not seen at all (less than 0.5%)
○: peeling of a fine spot is seen (not less than 0.5% to less than 5%)
Δ: slight peeling is seen (not less than 5% to less than 30%)
x: great peeling is seen (not less than 30% to less than 100%)
x x: peeling of a part larger than the area of affixed cellophane tape is seen (not less than 100%)

(iii) Chemical Resistance

After 1% distortion was applied to an ISO tensile test piece obtained by the following method in a three-point bending test, the test piece was covered with cloth immersed in Magiclean, Magiclean Bathroom and Magiclean Toilet (all of them are manufactured by Kao Corporation) and left at 23° C. for 96 hours to check the existence of an appearance change. The evaluation was made based on the following criteria.

○: no appearance change is seen
Δ: production of fine cracks is seen
x: Large cracks causing rupture are seen (iv) Flexural Modulus The flexural modulus of an ISO bending test piece obtained by the following method was measured in accordance with ISO 178.

(v) Charpy Impact Strength

The notched Charpy impact strength of an ISO bending test piece obtained by the following method was measured in accordance with ISO 179.

(vi) Flame Retardancy

A V test was made on an UL test piece obtained by the following method in accordance with UL94.

(vii) Surface Hardness

The pencil hardness of a 2 mm-thick part of a sample plate (three-stage plate with a hole) prepared by the following method was obtained under the following conditions in accordance with JIS K5600-5-4. The surface hardness is preferably not less than 2B.

[Equipment in Use]

Tester: pencil hardness tester No. 553-M (manufactured by Yasuda Seiki Seisakusho Ltd.)
Pencil in use: Mitsubishi Pencil uni (HB to 5B)
*The core of the pencil was exposed about 5 to 6 mm and polished with #400 sandpaper to obtain a flat end and a sharp edge.

[Test Conditions]

Load: 750 g
Testing speed: about 30 mm/min

[Criteria]

The test part was visually checked to obtain pencil hardness that it was judged ○ (no scratch).

Examples I-1 to I-24, Comparative Examples I-1 to I-5, Examples II-1 to II-31, III-1 to III-29, IV-1 to IV-33

Mixtures of components excluding the polyolefin-based resin as the component B and having compositions shown in Tables I-1 to I-3, Tables II-1 to II-2, Tables III-1 to III-2 and Table IV-1 to IV-2 were each supplied from the first feed port of an extruder. The mixtures were obtained by mixing with a twin-cylinder mixer. The propylene-based resin as the component B was supplied from a second feed port by using a side feeder. Each of the resulting mixtures was melt-kneaded and extruded by means of a vented double-screw extruder having a diameter of 30 mm (TEX30α-38.5BW-3V of The Nippon Steel Works, Ltd.) at a screw revolution of 230 rpm, a delivery rate of 25 kg/h and a vent vacuum degree of 3 kPa to obtain pellets. The extrusion temperature was set to 250° C. from the first feed port to the die.

Some of the pellets were dried with a hot air circulation drier at 90 to 100° C. for 6 hours and formed into test pieces for evaluation (ISO tensile test pieces (based on ISO527-1 and ISO527-2), ISO bending test pieces (based on ISO178, ISO179, ISO75-1 and ISO75-2), UL test pieces and sample plates (three-state plates with a hole) at a cylinder temperature of 270° C. and a mold temperature of 70° C. by using an injection molding machine.

Components represented by symbols in Tables I-1 to I-3, Tables II-1 to II-2, Tables III-1 to III-2 and Tables IV-1 to IV-2 are given below.

In Examples I-1 to I-24, the components A to C are essential.

In Examples II-1 to II-31, the components A to C and the component E are essential.

In Examples III-1 to III-29, the components A to C and the component F are essential.

In Examples IV-1 to IV-33, the components A to C, the component E-2 and the component G are essential.

(Component A)
A-1: aromatic polycarbonate resin (polycarbonate resin powder having a viscosity average molecular weight of 25,100 formed from bisphenol A and phosgene by a commonly used method, Panlite L-1250WQ (product name) of Teijin Limited)
A-2: aromatic polycarbonate resin (polycarbonate resin powder having a viscosity average molecular weight of 22,400 formed from bisphenol A and phosgene by a commonly used method, Panlite L-1225WP (product name) of Teijin Limited)
A-3: aromatic polycarbonate resin (polycarbonate resin powder having a viscosity average molecular weight of 19,700 formed from bisphenol A and phosgene by a commonly used method, Panlite L-1225WX (product name) of Teijin Limited)

(Component B)
B-1: polypropylene resin (homopolymer, MFR: 70 g/10 min (230° C., load of 2.16 kg), PLB00A (product name) of Sun Allomer Ltd.)
B-2: polypropylene resin (homopolymer, MFR: 42 g/10 min (230° C., load of 2.16 kg), PHA03A (product name) of Sun Allomer Ltd.)
B-3 (comparative): polypropylene resin (homopolymer, MFR: 20 g/10 min (230° C., load of 2.16 kg), PM802A (product name) of Sun Allomer Ltd.)
B-4 (comparative): polypropylene resin (homopolymer, MFR: 2 g/10 min (230° C., load of 2.16 kg), PL400A (product name) of Sun Allomer Ltd.)
B-5: maleic anhydride-modified polypropylene resin (MFR: 200 g/10 min (190° C., load of 2.16 kg), overrange (230° C., load of 2.16 kg), ADMER AT2606 (product name) of Mitsui Chemicals, Inc.)
B-6: maleic anhydride-modified polypropylene resin (MFR: 180 g/10 min (190° C., load of 2.16 kg), overrange (230° C., load of 2.16 kg), MODIC P908 (product name) of Mitsubishi Chemical Corporation)
B-7 (comparative): maleic anhydride-modified polypropylene resin (MFR: 9.1 g/10 min (230° C., load of 2.16 kg), ADMERQE800 (product name) of Mitsui Chemicals, Inc.)
B-8: polypropylene resin (block polymer, MFR: 60 g/10 min (230° C., load of 2.16 kg), PMB60A (product name) of Sun Allomer Ltd.)
B-9: polypropylene resin (block polymer, MFR: 100 g/10 min (230° C., load of 2.16 kg), VMD81M (product name) of Sun Allomer Ltd.)

(Component C)
C-1: styrene-ethylene.propylene-styrene block copolymer (SEPS, styrene content: 65 wt %, MFR: 0.4 g/10 min (230° C., load of 2.16 kg), SEPTON 2104 (product name) of Kuraray Co., Ltd.)
C-2: styrene-ethylene.butylene-styrene block copolymer (SEBS, styrene content: 67 wt %, MFR: 2.0 g/10 min (230° C., load of 2.16 kg), TUFTEC H1043 (product name) of Asahi Kasei. Chemicals)
C-3: styrene-butadiene.butylene-styrene block copolymer (SBBS, styrene content: 67 wt %, MFR: 28 g/10 min (230° C., load of 2.16 kg), TUFTEC P2000 (product name) of Asahi Kasei Chemicals)
C-4: styrene-ethylene.propylene-styrene block copolymer (SEPS, styrene content: 30 wt %, MFR: 70 g/10 min (230° C., load of 2.16 kg), SEPTON 2002 (product name) of Kuraray Co., Ltd.)
C-5: styrene-ethylene.butylene-styrene block copolymer (SEBS, styrene content: 42 wt %, MFR: 0.8 g/10 min (230° C., load of 2.16 kg), TUFTEC H1051 (product name) of Asahi Kasei Chemicals)

(Component D)
D-1: butadiene-based core-shell type graft polymer (graft copolymer having a core-shell structure comprising 70 wt % of core comprising butadiene rubber as main component and 30 wt % of shell comprising methyl methacrylate and styrene as main components, KANE ACE M-701 (product name) of Kaneka Corporation)
D-2: butadiene-based core-shell type graft polymer (graft copolymer having a core-shell structure comprising 60 wt % of core comprising butadiene rubber as main component and 40 wt % of shell comprising methyl methacrylate as main component, KANE ACE M-711 (product name) of Kaneka Corporation)
D-3: acrylic core-shell type graft polymer (graft copolymer having a core-shell structure comprising 60 wt % of core comprising butadiene-acrylic composite rubber and butyl acrylate as main components and 40 wt % of shell comprising methyl methacrylate as main component, METABLEN W-600A (product name) of Mitsubishi Rayon Co., Ltd.)
D-4: silicone-based core-shell type graft polymer (graft copolymer having a core-shell structure comprising 70 wt % of core comprising acrylic-silicone composite rubber as main component and 30 wt % of shell comprising methyl methacrylate as main component, METABLEN S-2001 (product name) of Mitsubishi Rayon Co., Ltd.)

(Component E)
E-1: bromine-based flame retardant (brominated carbonate oligomer having a bisphenol A skeleton, FG-7000 (product name) of Teijin Limited)
E-2: antimony compound (antimony trioxide, PATOX-K (product name) of Nippon Seiko Co., Ltd.)
E-3: cyclic phenoxy phosphazene (FP-110T (product name) of Fushimi Pharmaceutical Co., Ltd.)
E-4: phosphoric acid ester comprising bisphenol A bis (diphenyl phosphate) as main component (CR-741 (product name) of Daihachi Chemical Industry Co., Ltd.)

(Component F)
F-1: talc (HST0.8 (product name) of Hayashi Kasei Co., Ltd., average particle diameter of 3.5 μm)
F-2: talc (HTP ultra 5c (product name) of IMI Fabi S.p.A., average particle diameter of 0.5 μm)
F-3: talc (VICTORY LIGHT SG-A (product name) of Shokozan Mining Co., Ltd., average particle diameter of 15.2 μm)
F-4: wollastonite (NYGLOS4 (product name) of NYCO)
F-5: mica (MICA POWDER MT-200B (product name) of Kinsei Mateo Co., Ltd.)

(Component G)
G-1: hindered amine-based compound (polycondensate of dimethyl succinate and 4-hydroxy-2,2,6,6-tetramethyl-1-piperidine ethanol (N—R type), Tinuvin622 SF (product name) of BASF Japan)

G-2: hindered amine-based compound (bis(1,2,2,6,6-pentamethyl-4-piperidyl)[[3,5-bis(1,1-dimethylethyl)-4-hydroxyphenyl]methyl]butyl malonate (N—R type), Tinuvin PA 144 (product name) of BASF Japan] G-3: hindered amine-based compound (N—OR type, Tinuvin XT 850 FF (trade name) of BASF Japan)

G-4: hindered amine-based compound (reaction product (N—OR type) of peroxidized 4-butylamino-2,2,6,6-tetramethylpiperidine, 2,4,6-trichloro-1,3,5-triazine cyclohexane and N,N'-ethane-1,2-diylbis(1,3-propaneamine, Flamestab NOR 116 FF (product name) of BASF Japan)

G-5: hindered amine-based compound (copolymer (N—H type) of olefin (C20-C24), maleic anhydride and 4-amino-2,2,6,6-tetramethylpiperidine, Uvinul5050H (product name) of BASF Japan)

(Component H)

H-1: coated PTFE (polytetrafluoroethylene coated with a styrene-acrylonitrile copolymer (polytetrafluoroethylene content of 50 wt %), SN3307 (product name) of Shine Polymer Co., Ltd.

H-2: coated PTFE (polytetrafluoroethylene coated with a copolymer of methyl methacrylate and butyl acrylate, (polytetrafluoroethylene content of 50 wt %), METABLEN A3750 (product name) of Mitsubishi Rayon Co., Ltd.)

H-3: PIPE (POLYFLON MPA FA500H (product name) of Daikin Industries, Ltd.)

(Other Components)

STB-1: phenol-based heat stabilizer (octadecyl-3-(3,5-di-tert-butyl-4-hydroxyphenyl) propionate, molecular weight of 531, Irganox 1076 (product name) of BASF Japan)

STB-2: phosphorus-based heat stabilizer (tris(2,4-di-tert-butylphenyl)phosphite, Irgafos 168 (product name) of BASF Japan)

WAX: fatty acid ester-based release agent (RIKEMAL SL900 (product name) of Riken Vitamin Co., Ltd.)

TIO: titanium oxide (titanium oxide, 0.2 to 0.3 μm, RTC-30 (product name) of Tioxide Co., Ltd.)

TABLE I-1

| | Item | | Unit | Example I-1 | I-2 | I-3 | I-4 | I-5 | I-6 |
|---|---|---|---|---|---|---|---|---|---|
| composition | | A-1 | pbw | 66 | 66 | 66 | 66 | 80 | 56 |
| | | A-2 | pbw | | | | | | |
| | | A-3 | pbw | | | | | | |
| | | B-1 | pbw | 34 | 34 | 34 | 34 | 20 | 14 |
| | | B-2 | pbw | | | | | | |
| | | B-5 | pbw | | | | | | |
| | | B-6 | pbw | | | | | | |
| | | B-8 | pbw | | | | | | |
| | | B-9 | pbw | | | | | | |
| | | Total | pbw | 100 | 100 | 100 | 100 | 100 | 100 |
| | | C-1 | pbw | 12 | 12 | 12 | 12 | 12 | 12 |
| | | C-2 | pbw | | | | | | |
| | | C-3 | pbw | | | | | | |
| | | C-4 | pbw | | | | | | |
| | | C-5 | pbw | | | | | | |
| | | D-1 | pbw | | | | 3.5 | 3.5 | 3.5 | 3.5 |
| | | D-2 | pbw | | | | | | |
| | | D-3 | pbw | | | | | | |
| | | D-4 | pbw | | | | | | |
| | others | STB-1 | pbw | | 0.12 | | 0.12 | 0.12 | 0.12 |
| | | STB-2 | pbw | | 0.12 | | 0.12 | 0.12 | 0.12 |
| | | WAX | pbw | | | | | | |
| Characteristic properties | MFR of component B (230° C., 2.16 kg) | | cm³/10 min | 70 | 70 | 70 | 70 | 70 | 70 |
| | Appearance of molded article | | — | ○-△ | ○-△ | ○ | ○ | ○-△ | ○ |
| | Tape peeling resistance | | — | ◎-○ | ◎-○ | ◎-○ | ◎-○ | ○-△ | ◎-○ |
| | Chemical resistance (Magiclean) | | — | ○ | ○ | ○ | ○ | ○ | ○ |
| | Chemical resistance (Magiclean Bathroom) | | — | △ | △ | ○ | ○ | △ | ○ |
| | Chemical resistance (Magiclean toilet) | | — | ○ | ○ | ○ | ○ | ○ | ○ |
| | Flexural modulus | | MPa | 1700 | 1700 | 1600 | 1600 | 1600 | 1600 |
| | Charpy impact strength | | kJ/m² | 16 | 18 | 18 | 20 | 28 | 11 |

| | Item | | Unit | Example I-7 | I-8 | I-9 | I-10 | I-11 | I-12 |
|---|---|---|---|---|---|---|---|---|---|
| composition | | A-1 | pbw | 66 | | | 66 | 66 | 66 |
| | | A-2 | pbw | | 66 | | | | |
| | | A-3 | pbw | | | 66 | | | |
| | | B-1 | pbw | 34 | 34 | 34 | | | |
| | | B-2 | pbw | | | | 34 | | |
| | | B-5 | pbw | | | | | | |
| | | B-6 | pbw | | | | | | |

TABLE I-1-continued

| | | Unit | | | | | | |
|---|---|---|---|---|---|---|---|---|
| | B-8 | pbw | | | | | 34 | |
| | B-9 | pbw | | | | | | 34 |
| | Total | pbw | 100 | 100 | 100 | 100 | 100 | 100 |
| | C-1 | pbw | 12 | 12 | 12 | 12 | 12 | 12 |
| | C-2 | pbw | | | | | | |
| | C-3 | pbw | | | | | | |
| | C-4 | pbw | | | | | | |
| | C-5 | pbw | | | | | | |
| | D-1 | pbw | 3.5 | 3.5 | 3.5 | 3.5 | 3.5 | 3.5 |
| | D-2 | pbw | | | | | | |
| | D-3 | pbw | | | | | | |
| | D-4 | pbw | | | | | | |
| others | STB-1 | pbw | 0.12 | 0.12 | 0.12 | 0.12 | 0.12 | 0.12 |
| | STB-2 | pbw | 0.12 | 0.12 | 0.12 | 0.12 | 0.12 | 0.12 |
| | WAX | pbw | 0.35 | | | | | |
| Characteristic properties | MFR of component B (230° C., 2.16 kg) | cm³/10 min | 70 | 70 | 70 | 42 | 62 | 100 |
| | Appearance of molded article | — | ○ | ○ | ○ - Δ | ○ | ○ | ○ |
| | Tape peeling resistance | — | ◎ - ○ | ○ | Δ | Δ | ◎ - ○ | ◎ - ○ |
| | Chemical resistance (Magiclean) | — | ○ | ○ | ○ | ○ | ○ | ○ |
| | Chemical resistance (Magiclean Bathroom) | — | ○ | ○ | Δ | ○ | ○ | ○ |
| | Chemical resistance (Magiclean toilet) | — | ○ | ○ | ○ | ○ | ○ | ○ |
| | Flexural modulus | MPa | 1600 | 1600 | 1600 | 1600 | 1600 | 1600 |
| | Charpy impact strength | kJ/m² | 20 | 18 | 15 | 24 | 22 | 19 | pbw: part by weight

TABLE I-2

| | | | | | Example | | | |
|---|---|---|---|---|---|---|---|---|
| Item | | | Unit | I-13 | I-14 | I-15 | I-16 | I-17 | I-18 |
| composition | A-1 | | pbw | 66 | 66 | 66 | 66 | 66 | 66 |
| | A-2 | | pbw | | | | | | |
| | A-3 | | pbw | | | | | | |
| | B-1 | | pbw | 29 | 29 | 34 | 34 | 34 | 34 |
| | B-2 | | pbw | | | | | | |
| | B-5 | | pbw | 5 | | | | | |
| | B-6 | | pbw | | 5 | | | | |
| | B-8 | | pbw | | | | | | |
| | B-9 | | pbw | | | | | | |
| | Total | | pbw | 100 | 100 | 100 | 100 | 100 | 100 |
| | C-1 | | pbw | 12 | 12 | | | | |
| | C-2 | | pbw | | | 12 | | | |
| | C-3 | | pbw | | | | 12 | | |
| | C-4 | | pbw | | | | | 12 | |
| | C-5 | | pbw | | | | | | 12 |
| | D-1 | | pbw | 3.5 | 3.5 | 3.5 | 3.5 | 3.5 | 3.5 |
| | D-2 | | pbw | | | | | | |
| | D-3 | | pbw | | | | | | |
| | D-4 | | pbw | | | | | | |
| others | STB-1 | | pbw | 0.12 | 0.12 | 0.12 | 0.12 | 0.12 | 0.12 |
| | STB-2 | | pbw | 0.12 | 0.12 | 0.12 | 0.12 | 0.12 | 0.12 |
| | WAX | | pbw | | | | | | |
| Characteristic properties | MFR of component B (230° C., 2.16 kg) | | cm³/10 min | 98 | 76 | 70 | 70 | 70 | 70 |
| | Appearance of molded article | | — | ◎ - ○ | ◎ - ○ | ○ | ○ | ○ - Δ | ○ - Δ |
| | Tape peeling resistance | | — | ◎ | ◎ | ○ | ○ | Δ | Δ |
| | Chemical resistance (Magiclean) | | — | ○ | ○ | ○ | ○ | ○ | ○ |
| | Chemical resistance (Magiclean Bathroom) | | — | ○ | ○ | ○ | ○ | Δ | ○ |
| | Chemical resistance (Magiclean toilet) | | — | ○ | ○ | ○ | ○ | ○ | ○ |

TABLE I-2-continued

|  |  |  |  |  |  |  |  |  |
|---|---|---|---|---|---|---|---|---|
|  | Flexural modulus | MPa | 1600 | 1600 | 1600 | 1600 | 1600 | 1800 |
|  | Charpy impact strength | kJ/m² | 15 | 14 | 17 | 19 | 10 | 11 |

|  |  |  |  | Example | | | | | |
|---|---|---|---|---|---|---|---|---|---|
|  | Item |  | Unit | I-19 | I-20 | I-21 | I-22 | I-23 | I-24 |
| composition | A-1 |  | pbw | 66 | 66 | 66 | 66 | 66 | 66 |
|  | A-2 |  | pbw |  |  |  |  |  |  |
|  | A-3 |  | pbw |  |  |  |  |  |  |
|  | B-1 |  | pbw | 34 | 34 | 34 | 34 | 34 | 34 |
|  | B-2 |  | pbw |  |  |  |  |  |  |
|  | B-5 |  | pbw |  |  |  |  |  |  |
|  | B-6 |  | pbw |  |  |  |  |  |  |
|  | B-8 |  | pbw |  |  |  |  |  |  |
|  | B-9 |  | pbw |  |  |  |  |  |  |
|  | Total |  | pbw | 100 | 100 | 100 | 100 | 100 | 100 |
|  | C-1 |  | pbw | 12 | 12 | 12 | 2 | 18 | 12 |
|  | C-2 |  | pbw |  |  |  |  |  |  |
|  | C-3 |  | pbw |  |  |  |  |  |  |
|  | C-4 |  | pbw |  |  |  |  |  |  |
|  | C-5 |  | pbw |  |  |  |  |  |  |
|  | D-1 |  | pbw |  |  |  | 3.5 | 3.5 | 8 |
|  | D-2 |  | pbw | 3.5 |  |  |  |  |  |
|  | D-3 |  | pbw |  | 3.5 |  |  |  |  |
|  | D-4 |  | pbw |  |  | 3.5 |  |  |  |
|  | others | STB-1 | pbw | 0.12 | 0.12 | 0.12 | 0.12 | 0.12 | 0.12 |
|  |  | STB-2 | pbw | 0.12 | 0.12 | 0.12 | 0.12 | 0.12 | 0.12 |
|  |  | WAX | pbw |  |  |  |  |  |  |
| Characteristic properties | MFR of component B (230° C., 2.16 kg) |  | cm³/10 min | 70 | 70 | 70 | 70 | 70 | 70 |
|  | Appearance of molded article |  | — | ○ | ○-△ | ○-△ | ○-△ | ◎-○ | ○ |
|  | Tape peeling resistance |  | — | ◎-○ | ◎-○ | ◎-○ | △ | ◎ | ◎-○ |
|  | Chemical resistance (Magiclean) |  | — | ○ | ○ | ○ | ○ | ○ | ○ |
|  | Chemical resistance (Magiclean Bathroom) |  | — | ○ | ○ | ○ | △ | ○ | ○ |
|  | Chemical resistance (Magiclean toilet) |  | — | ○ | ○ | ○ | ○ | ○ | ○ |
|  | Flexural modulus |  | MPa | 1600 | 1600 | 1600 | 1800 | 1450 | 1500 |
|  | Charpy impact strength |  | kJ/m² | 22 | 14 | 21 | 13 | 25 | 22 | pbw: part by weight

TABLE I-3

|  |  |  |  | Comparative Example | | | | |
|---|---|---|---|---|---|---|---|---|
|  | Item |  | unit | I-1 | I-2 | I-3 | I-4 | I-5 |
| composition | A-1 |  | pbw | 66 | 66 | 66 | 66 | 66 |
|  | B-1 |  | pbw |  |  |  | 34 | 34 |
|  | B-3 (comparative) |  | pbw | 34 |  |  |  |  |
|  | B-4 (comparative) |  | pbw |  | 34 |  |  |  |
|  | B-7 (comparative) |  | pbw |  |  | 34 |  |  |
|  | Total |  | pbw | 100 | 100 | 100 | 100 | 100 |
|  | C-1 |  | pbw | 12 | 12 | 12 |  | 24 |
|  | D-1 |  | pbw | 3.5 | 3.5 | 3.5 |  | 3.5 |
|  | others | STB-1 | pbw | 0.12 | 0.12 | 0.12 | 0.12 | 0.12 |
|  |  | STB-2 | pbw | 0.12 | 0.12 | 0.12 | 0.12 | 0.12 |
| Characteristic properties | MFR of component B (230° C., 2.16 kg) |  | cm³/10 min | 20 | 2 | 9.1 | 70 | 70 |
|  | Appearance of molded article |  | — | △-X | X | X | X | ○ |
|  | Tape peeling resistance |  | — | X | XX | △ | XX | ◎ |
|  | Chemical resistance (Magiclean) |  | — | ○ | ○ | ○ | △ | ○ |
|  | Chemical resistance (Magiclean Bathroom) |  | — | ○ | ○ | ○ | △ | ○ |
|  | Chemical resistance (Magiclean toilet) |  | — | ○ | ○ | ○ | △ | ○ |

TABLE I-3-continued

|  |  | Comparative Example | | | | |
| --- | --- | --- | --- | --- | --- | --- |
| Item | unit | I-1 | I-2 | I-3 | I-4 | I-5 |
| Flexural modulus | MPa | 1600 | 1600 | 1600 | 1800 | 1000 |
| Charpy impact strength | kJ/m² | 20 | 60 | 55 | 7 | 29 | pbw: part by weight

TABLE II-1

|  |  |  | Example | | | | | | | |
| --- | --- | --- | --- | --- | --- | --- | --- | --- | --- | --- |
| item | | unit | II-1 | II-2 | II-3 | II-4 | II-5 | II-6 | II-7 | II-8 |
| composition | A-1 | pbw | 75 | 75 | 75 | 75 |  |  | 75 | 75 |
|  | A-2 | pbw |  |  |  |  | 75 |  |  |  |
|  | A-3 | pbw |  |  |  |  |  | 75 |  |  |
|  | B-1 | pbw | 25 | 25 | 25 | 25 | 25 | 25 |  |  |
|  | B-2 | pbw |  |  |  |  |  |  | 25 |  |
|  | B-5 | pbw |  |  |  |  |  |  |  |  |
|  | B-6 | pbw |  |  |  |  |  |  |  |  |
|  | B-8 | pbw |  |  |  |  |  |  |  | 25 |
|  | B-9 | pbw |  |  |  |  |  |  |  |  |
|  | total | pbw | 100 | 100 | 100 | 100 | 100 | 100 | 100 | 100 |
|  | C-1 | pbw | 6.5 | 6.5 | 6.5 | 6.5 | 6.5 | 6.5 | 6.5 | 6.5 |
|  | C-2 | pbw |  |  |  |  |  |  |  |  |
|  | C-3 | pbw |  |  |  |  |  |  |  |  |
|  | C-4 | pbw |  |  |  |  |  |  |  |  |
|  | C-5 | pbw |  |  |  |  |  |  |  |  |
|  | E-1 | pbw | 12.5 | 12.5 | 12.5 | 12.5 | 12.5 | 12.5 | 12.5 | 12.5 |
|  | E-2 | pbw | 2.5 | 2.5 | 2.5 | 2.5 | 2.5 | 2.5 | 2.5 | 2.5 |
|  | E-3 | pbw |  |  |  |  |  |  |  |  |
|  | E-4 | pbw |  |  |  |  |  |  |  |  |

|  |  |  | Example | | | | | | | |
| --- | --- | --- | --- | --- | --- | --- | --- | --- | --- | --- |
| item | | | unit | II-1 | II-2 | II-3 | II-4 | II-5 | II-6 | II-7 | II-8 |
| Composition | | D-1 | pbw | 3.8 | 3.8 | 3.8 | 3.8 | 3.8 | 3.8 | 3.8 | 3.8 |
|  |  | D-2 | pbw |  |  |  |  |  |  |  |  |
|  |  | D-3 | pbw |  |  |  |  |  |  |  |  |
|  |  | D-4 | pbw |  |  |  |  |  |  |  |  |
|  |  | H-1 | pbw | 0.8 | 0.8 | 0.8 | 0.8 | 0.8 | 0.8 | 0.8 | 0.8 |
|  |  | H-2 | pbw |  |  |  |  |  |  |  |  |
|  |  | H-3 | pbw |  |  |  |  |  |  |  |  |
|  | others | STB-1 | pbw | 0.13 | 0.13 | 0.13 |  | 0.13 | 0.13 | 0.13 | 0.13 |
|  |  | STB-2 | pbw | 0.13 | 0.13 | 0.13 |  | 0.13 | 0.13 | 0.13 | 0.13 |
|  |  | WAX | pbw |  |  | 0.4 |  |  |  |  |  |
|  |  | TIO | pbw |  |  |  | 2 |  |  |  |  |
| Characteristic properties | | Appearance of molded article | — | ○ | ○ | ◎ | ○ | ○ | △ | △ | △ |
|  |  | Tape peeling resistance | — | ○ | ○ | ○ | ○ | ○ | △ | △ | △ |
|  |  | Chemical resistance (Magiclean) | — | ○ | ○ | ○ | ○ | ○ | ○ | ○ | ○ |
|  |  | Chemical resistance (Magiclean Bathroom) | — | ○ | ○ | ○ | ○ | ○ | △ | ○ | ○ |
|  |  | Chemical resistance (Magiclean toilet) | — | ○ | ○ | ○ | ○ | ○ | ○ | ○ | ○ |
|  |  | Flexural modulus | MPa | 2000 | 2000 | 2050 | 2000 | 2000 | 2000 | 2100 | 2000 |
|  |  | Charpy impact strength | kJ/m² | 15 | 15 | 13 | 14 | 18 | 15 | 18 | 19 |
|  |  | Flame retardancy (1.5 mm/V) | — | V-0 | V-0 | V-0 | V-0 | V-0 | V-0 | V-0 | V-1 |
|  |  | Flame retardancy (2.5 mm/V) | — | V-0 | V-0 | V-0 | V-0 | V-0 | V-0 | V-0 | V-0 |

|  |  |  | Example | | | | | | | |
| --- | --- | --- | --- | --- | --- | --- | --- | --- | --- | --- |
| item | | unit | II-9 | II-10 | II-11 | II-12 | II-13 | II-14 | II-15 | II-16 |
| composition | A-1 | pbw | 75 | 75 | 75 | 75 | 75 | 75 | 75 | 75 |
|  | A-2 | pbw |  |  |  |  |  |  |  |  |
|  | A-3 | pbw |  |  |  |  |  |  |  |  |
|  | B-1 | pbw |  | 20 | 20 | 25 | 25 | 25 | 25 | 25 |

TABLE II-1-continued

|  |  |  |  |  |  |  |  |  |  |
|---|---|---|---|---|---|---|---|---|---|
| B-2 | pbw |  |  |  |  |  |  |  |  |
| B-5 | pbw |  | 5 |  |  |  |  |  |  |
| B-6 | pbw |  |  | 5 |  |  |  |  |  |
| B-8 | pbw |  |  |  |  |  |  |  |  |
| B-9 | pbw | 25 |  |  |  |  |  |  |  |
| total | pbw | 100 | 100 | 100 | 100 | 100 | 100 | 100 | 100 |
| C-1 | pbw | 6.5 | 6.5 | 6.5 |  |  |  |  | 6.5 |
| C-2 | pbw |  |  |  | 6.5 |  |  |  |  |
| C-3 | pbw |  |  |  |  | 6.5 |  |  |  |
| C-4 | pbw |  |  |  |  |  | 6.5 |  |  |
| C-5 | pbw |  |  |  |  |  |  | 6.5 |  |
| E-1 | pbw | 12.5 | 12.5 | 12.5 | 12.5 | 12.5 | 12.5 | 12.5 | 20 |
| E-2 | pbw | 2.5 | 2.5 | 2.5 | 2.5 | 2.5 | 2.5 | 2.5 |  |
| E-3 | pbw |  |  |  |  |  |  |  |  |
| E-4 | pbw |  |  |  |  |  | I |  |  |

|  |  |  | Example |  |  |  |  |  |  |  |
|---|---|---|---|---|---|---|---|---|---|---|
| item |  | unit | II-9 | II-10 | II-11 | II-12 | II-13 | II-14 | II-15 | II-16 |
| Composition | D-1 | pbw | 3.8 | 3.8 | 3.8 | 3.8 | 3.8 | 3.8 | 3.8 | 3.8 |
|  | D-2 | pbw |  |  |  |  |  |  |  |  |
|  | D-3 | pbw |  |  |  |  |  |  |  |  |
|  | D-4 | pbw |  |  |  |  |  |  |  |  |
|  | H-1 | pbw | 0.8 | 0.8 | 0.8 | 0.8 | 0.8 | 0.8 | 0.8 | 0.8 |
|  | H-2 | pbw |  |  |  |  |  |  |  |  |
|  | H-3 | pbw |  |  |  |  |  |  |  |  |
| others | STB-1 | pbw | 0.13 | 0.13 | 0.13 | 0.13 | 0.13 | 0.13 | 0.13 | 0.13 |
|  | STB-2 | pbw | 0.13 | 0.13 | 0.13 | 0.13 | 0.13 | 0.13 | 0.13 | 0.13 |
|  | WAX | pbw |  |  |  |  |  |  |  |  |
|  | TIO | pbw |  |  |  |  |  |  |  |  |
| Characteristic properties | Appearance of molded article | — | Δ | ◎ | ◎ | ○ | ○ | Δ | Δ | ○ |
|  | Tape peeling resistance | — | Δ | ◎ | ◎ | ○ | ○ | Δ | Δ | ○ |
|  | Chemical resistance (Magiclean) | — | ○ | ○ | ○ | ○ | ○ | ○ | ○ | ○ |
|  | Chemical resistance (Magiclean Bathroom) | — | ○ | ○ | ○ | ○ | ○ | Δ | ○ | ○ |
|  | Chemical resistance (Magiclean toilet) | — | ○ | ○ | ○ | ○ | ○ | ○ | ○ | ○ |
|  | Flexural modulus | MPa | 2000 | 2100 | 2100 | 2000 | 2000 | 1900 | 1900 | 2000 |
|  | Charpy impact strength | kJ/m$^2$ | 17 | 14 | 14 | 13 | 13 | 9 | 11 | 12 |
|  | Flame retardancy (1.5 mm/V) | — | V-1 | V-0 | V-0 | V-0 | V-0 | V-0 | V-0 | V-0 |
|  | Flame retardancy (2.5 mm/V) | — | V-0 | V-0 | V-0 | V-0 | V-0 | V-0 | V-0 | V-0 | pbw: part by weight

TABLE II-2

|  |  |  | Example |  |  |  |  |  |  |  |
|---|---|---|---|---|---|---|---|---|---|---|
| item |  | unit | II-17 | II-18 | II-19 | II-20 | II-21 | II-22 | II-23 | II-24 |
| composition | A-1 | pbw | 75 | 75 | 75 | 75 | 75 | 75 | 75 | 75 |
|  | A-2 | pbw |  |  |  |  |  |  |  |  |
|  | A-3 | pbw |  |  |  |  |  |  |  |  |
|  | B-1 | pbw | 25 | 25 | 25 | 25 | 25 | 25 | 25 | 25 |
|  | B-2 | pbw |  |  |  |  |  |  |  |  |
|  | B-5 | pbw |  |  |  |  |  |  |  |  |
|  | B-6 | pbw |  |  |  |  |  |  |  |  |
|  | total | pbw | 100 | 100 | 100 | 100 | 100 | 100 | 100 | 100 |
|  | C-1 | pbw | 6.5 | 6.5 | 6.5 | 6.5 | 6.5 | 6.5 | 6.5 | 6.5 |
|  | C-2 | pbw |  |  |  |  |  |  |  |  |
|  | C-3 | pbw |  |  |  |  |  |  |  |  |
|  | C-4 | pbw |  |  |  |  |  |  |  |  |
|  | C-5 | pbw |  |  |  |  |  |  |  |  |
|  | E-1 | pbw | 12.5 | 12.5 | 12.5 | 12.5 | 12.5 | 12.5 | 12.5 | 12.5 |
|  | E-2 | pbw |  |  |  |  |  | 2.5 | 2.5 | 2.5 |
|  | E-3 | pbw | 4 |  |  |  |  |  |  |  |
|  | E-4 | pbw |  | 4 |  |  |  |  |  |  |
|  | D-1 | pbw | 3.8 | 3.8 |  |  |  |  | 3.8 | 3.8 |
|  | D-2 | pbw |  |  | 3.8 |  |  |  |  |  |

TABLE II-2-continued

| | | | | | | | | |
|---|---|---|---|---|---|---|---|---|
| D-3 | pbw | | | | 3.8 | | | |
| D-4 | pbw | | | | | 3.8 | | |

| | | | Example | | | | | | | |
|---|---|---|---|---|---|---|---|---|---|---|
| | item | | unit | II-17 | II-18 | II-19 | II-20 | II-21 | II-22 | II-23 | II-24 |

| | | | | | | | | | | |
|---|---|---|---|---|---|---|---|---|---|---|
| Composition | | H-1 | pbw | 0.8 | 0.8 | 0.8 | 0.8 | 0.8 | | | 0.8 |
| | | H-2 | pbw | | | | | | 0.8 | | |
| | | H-3 | pbw | | | | | | | 0.4 | |
| | others | STB-1 | pbw | 0.13 | 0.13 | 0.13 | 0.13 | 0.13 | 0.13 | 0.13 | 0.13 |
| | | STB-2 | pbw | 0.13 | 0.13 | 0.13 | 0.13 | 0.13 | 0.13 | 0.13 | 0.13 |
| | | WAX | pbw | | | | | | | | |
| | | TIO | pbw | | | | | | | | |
| Characteristic properties | Appearance of molded article | | — | ○ | ○ | ○ | ○ | ○ | ○ | ○ | ○ |
| | Tape peeling resistance | | — | Δ | Δ | ○ | ○ | ○ | ○ | ○ | ○ |
| | Chemical resistance (Magiclean) | | — | ○ | ○ | ○ | ○ | ○ | ○ | ○ | ○ |
| | Chemical resistance (Magiclean Bathroom) | | — | Δ | ○ | ○ | ○ | ○ | ○ | ○ | Δ |
| | Chemical resistance (Magiclean toilet) | | — | ○ | ○ | ○ | ○ | ○ | ○ | ○ | ○ |
| | Flexural modulus | | MPa | 2000 | 2000 | 2000 | 2000 | 2000 | 2000 | 2000 | 2100 |
| | Charpy impact strength | | kJ/m$^2$ | 9 | 10 | 16 | 12 | 14 | 16 | 13 | 11 |
| | Flame retardancy (1.5 mm/V) | | — | V-2 | V-1 | V-0 | V-0 | V-0 | V-0 | V-0 | V-0 |
| | Flame retardancy (2.5 mm/V) | | — | V-1 | V-1 | V-0 | V-0 | V-0 | V-0 | V-0 | V-0 |

| | | | | Example | | | | | | |
|---|---|---|---|---|---|---|---|---|---|---|
| | item | | unit | II-25 | II-26 | II-27 | II-28 | II-29 | II-30 | II-31 |

| | | | | | | | | | | |
|---|---|---|---|---|---|---|---|---|---|---|
| composition | A-1 | | pbw | 90 | 90 | 75 | 75 | 75 | 75 | 75 |
| | A-2 | | pbw | | | | | | | |
| | A-3 | | pbw | | | | | | | |
| | B-1 | | pbw | 10 | 10 | 25 | 25 | 25 | 25 | 25 |
| | B-2 | | pbw | | | | | | | |
| | B-5 | | pbw | | | | | | | |
| | B-6 | | pbw | | | | | | | |
| | total | | pbw | 100 | 100 | 100 | 100 | 100 | 100 | 100 |
| | C-1 | | pbw | 5 | 5 | 3.0 | 15 | 6.5 | 6.5 | 6.5 |
| | C-2 | | pbw | | | | | | | |
| | C-3 | | pbw | | | | | | | |
| | C-4 | | pbw | | | | | | | |
| | C-5 | | pbw | | | | | | | |
| | E-1 | | pbw | 12.5 | 12.5 | 12.5 | 12.5 | 5.0 | 25.0 | 12.5 |
| | E-2 | | pbw | 2.5 | 2.5 | 2.5 | 2.5 | 2.5 | 2.5 | 2.5 |
| | E-3 | | pbw | | | | | | | |
| | E-4 | | pbw | | | | | | | |
| | D-1 | | pbw | 2 | | 3.8 | 3.8 | 3.8 | 3.8 | 8.5 |
| | D-2 | | pbw | | | | | | | |
| | D-3 | | pbw | | | | | | | |
| | D-4 | | pbw | | | | | | | |

| | | | | Example | | | | | | |
|---|---|---|---|---|---|---|---|---|---|---|
| | item | | unit | II-25 | II-26 | II-27 | II-28 | II-29 | II-30 | II-31 |

| | | | | | | | | | | |
|---|---|---|---|---|---|---|---|---|---|---|
| Composition | | H-1 | pbw | | | | 0.8 | 0.8 | 0.8 | 0.8 | 0.8 |
| | | H-2 | pbw | | | | | | | |
| | | H-3 | pbw | | | | | | | |
| | others | STB-1 | pbw | 0.13 | 0.13 | 0.13 | 0.13 | 0.13 | 0.13 | 0.13 |
| | | STB-2 | pbw | 0.13 | 0.13 | 0.13 | 0.13 | 0.13 | 0.13 | 0.13 |
| | | WAX | pbw | | | | | | | |
| | | TIO | pbw | | | | | | | |
| Characteristic properties | Appearance of molded article | | — | ○ | ○ | Δ | ○ | ○ | ○ | ○ |
| | Tape peeling resistance | | — | ○ | ○ | Δ | ⊚ | ○ | Δ | ○ |
| | Chemical resistance (Magiclean) | | — | ○ | ○ | ○ | ○ | ○ | ○ | ○ |
| | Chemical resistance (Magiclean Bathroom) | | — | ○ | Δ | Δ | ○ | ○ | Δ | ○ |
| | Chemical resistance (Magiclean toilet) | | — | ○ | ○ | ○ | ○ | ○ | ○ | ○ |

TABLE II-2-continued

| | | | | | | | | |
|---|---|---|---|---|---|---|---|---|
| Flexural modulus | MPa | 2000 | 2100 | 2200 | 1700 | 2000 | 2100 | 1700 |
| Charpy impact strength | kJ/m$^2$ | 17 | 12 | 11 | 18 | 18 | 9 | 20 |
| Flame retardancy (1.5 mm/V) | — | V-2 | V-2 | V-0 | V-1 | V-2 | V-0 | V-2 |
| Flame retardancy (2.5 mm/V) | — | V-2 | V-2 | V-0 | V-0 | V-2 | V-0 | V-2 | pbw: part by weight

TABLE III-1

| | | | Example | | | | | | | |
|---|---|---|---|---|---|---|---|---|---|---|
| item | | unit | III-1 | III-2 | III-3 | III-4 | III-5 | III-6 | III-7 | III-8 |
| composition | A-1 | pbw | 76 | 76 | 76 | 76 | 76 | | | 76 |
| | A-2 | pbw | | | | | | 76 | | |
| | A-3 | pbw | | | | | | | 76 | |
| | B-1 | pbw | 24 | 24 | 24 | 24 | 24 | 24 | 24 | |
| | B-2 | pbw | | | | | | | | 24 |
| | B-5 | pbw | | | | | | | | |
| | B-6 | pbw | | | | | | | | |
| | B-8 | Pbw | | | | | | | | |
| | B-9 | pbw | | | | | | | | |
| | total | pbw | 100 | 100 | 100 | 100 | 100 | 100 | 100 | 100 |
| | C-1 | pbw | 7 | 7 | 7 | 7 | 7 | 7 | 7 | 7 |
| | C-2 | pbw | | | | | | | | |
| | C-3 | pbw | | | | | | | | |
| | C-4 | pbw | | | | | | | | |
| | C-5 | pbw | | | | | | | | |
| | F-1 | pbw | 6 | 6 | 6 | 6 | 6 | 6 | 6 | 6 |
| | F-2 | pbw | | | | | | | | |
| | F-3 | pbw | | | | | | | | |
| | F-4 | pbw | | | | | | | | |
| | F-5 | pbw | | | | | | | | |

| | | | Example | | | | | | | |
|---|---|---|---|---|---|---|---|---|---|---|
| item | | unit | III-1 | III-2 | III-3 | III-4 | III-5 | III-6 | III-7 | III-8 |
| Composition | D-1 | pbw | | | 3.5 | 3.5 | 3.5 | 3.5 | 3.5 | 3.5 |
| | D-2 | pbw | | | | | | | | |
| | D-3 | pbw | | | | | | | | |
| | D-4 | pbw | | | | | | | | |
| others | STB-1 | pbw | | 0.12 | 0.12 | 0.12 | 0.12 | 0.12 | 0.12 | 0.12 |
| | STB-2 | pbw | | 0.12 | 0.12 | 0.12 | 0.12 | 0.12 | 0.12 | 0.12 |
| | WAX | pbw | | | | 0.35 | | | | |
| | TIO | pbw | | | | | | 2 | | |
| Characteristic properties | Appearance of molded article | — | ○ | ○ | ○ | ○ | ◎ | ○ | Δ | Δ |
| | Tape peeling resistance | — | ○ | ○ | ○ | ○ | ○ | ○ | Δ | Δ |
| | Chemical resistance (Magiclean) | — | ○ | ○ | ○ | ○ | ○ | ○ | ○ | ○ |
| | Chemical resistance (Magiclean Bathroom) | — | ○ | ○ | ○ | ○ | ○ | ○ | Δ | ○ |
| | Chemical resistance (Magiclean toilet) | — | ○ | ○ | ○ | ○ | ○ | ○ | ○ | ○ |
| | Flexural modulus | MPa | 2300 | 2300 | 2200 | 2200 | 2200 | 2200 | 2200 | 2200 |
| | Charpy impact strength | kJ/m$^2$ | 10 | 10 | 13 | 13 | 12 | 13 | 11 | 15 |
| | Surface hardness | kJ/m$^2$ | 2B | 2B | 2B | 2B | 2B | 2B | 2B | 2B |

| | | | Example | | | | | |
|---|---|---|---|---|---|---|---|---|
| item | | unit | III-9 | III-10 | III-11 | III-12 | III-13 | III-14 | III-15 |
| composition | A-1 | pbw | 76 | 76 | 76 | 76 | 76 | 76 | 76 |
| | A-2 | pbw | | | | | | | |
| | A-3 | pbw | | | | | | | |
| | B-1 | pbw | | | 19 | 19 | 24 | 24 | 24 |

TABLE III-1-continued

|  |  | | | | | | | |
|---|---|---|---|---|---|---|---|---|
| B-2 | pbw | | | | | | | |
| B-5 | pbw | | | | 5 | | | |
| B-6 | pbw | | | | | 5 | | |
| B-8 | Pbw | 24 | | | | | | |
| B-9 | pbw | | 24 | | | | | |
| total | pbw | 100 | 100 | 100 | 100 | 100 | 100 | 100 |
| C-1 | pbw | 7 | 7 | 7 | 7 | | | |
| C-2 | pbw | | | | | 7 | | |
| C-3 | pbw | | | | | | 7 | |
| C-4 | pbw | | | | | | | 7 |
| C-5 | pbw | | | | | | | |
| F-1 | pbw | 6 | 6 | 6 | 6 | 6 | 6 | 6 |
| F-2 | pbw | | | | | | | |
| F-3 | pbw | | | | | | | |
| F-4 | pbw | | | | | | | |
| F-5 | pbw | | | | | | | |

| | item | | unit | Example III-9 | III-10 | III-11 | III-12 | III-13 | III-14 | III-15 |
|---|---|---|---|---|---|---|---|---|---|---|
| Composition | | D-1 | pbw | 3.5 | 3.5 | 3.5 | 3.5 | 3.5 | 3.5 | 3.5 |
| | | D-2 | pbw | | | | | | | |
| | | D-3 | pbw | | | | | | | |
| | | D-4 | pbw | | | | | | | |
| | others | STB-1 | pbw | 0.12 | 0.12 | 0.12 | 0.12 | 0.12 | 0.12 | 0.12 |
| | | STB-2 | pbw | 0.12 | 0.12 | 0.12 | 0.12 | 0.12 | 0.12 | 0.12 |
| | | WAX | pbw | | | | | | | |
| | | TIO | pbw | | | | | | | |
| Characteristic properties | Appearance of molded article | | — | Δ | Δ | ◎ | ◎ | ○ | ○ | Δ |
| | Tape peeling resistance | | — | Δ | Δ | ◎ | ◎ | ○ | ○ | Δ |
| | Chemical resistance (Magiclean) | | — | ○ | ○ | ○ | ○ | ○ | ○ | ○ |
| | Chemical resistance (Magiclean Bathroom) | | — | ○ | ○ | ○ | ○ | ○ | ○ | Δ |
| | Chemical resistance (Magiclean toilet) | | — | ○ | ○ | ○ | ○ | ○ | ○ | ○ |
| | Flexural modulus | | MPa | 2000 | 2000 | 2200 | 2200 | 2200 | 2200 | 2100 |
| | Charpy impact strength | | kJ/m$^2$ | 20 | 18 | 12 | 12 | 11 | 11 | 8 |
| | Surface hardness | | kJ/m$^2$ | 2B | 2B | 2B | 2B | 2B | 2B | 2B | pbw: part by weight

TABLE III-2

| | item | | unit | Example III-16 | III-17 | III-18 | III-19 | III-20 | III-21 | III-22 |
|---|---|---|---|---|---|---|---|---|---|---|
| composition | | A-1 | pbw | 76 | 76 | 76 | 76 | 76 | 76 | 76 |
| | | A-2 | pbw | | | | | | | |
| | | A-3 | pbw | | | | | | | |
| | | B-1 | pbw | 24 | 24 | 24 | 24 | 24 | 24 | 24 |
| | | B-2 | pbw | | | | | | | |
| | | B-5 | pbw | | | | | | | |
| | | B-6 | pbw | | | | | | | |
| | | total | pbw | 100 | 100 | 100 | 100 | 100 | 100 | 100 |
| | | C-1 | pbw | | 7 | 7 | 7 | 7 | 7 | 7 |
| | | C-2 | pbw | | | | | | | |
| | | C-3 | pbw | | | | | | | |
| | | C-4 | pbw | | | | | | | |
| | | C-5 | pbw | 7 | | | | | | |
| | | F-1 | pbw | 6 | | | | | 6 | 6 |
| | | F-2 | pbw | | 6 | | | | | |
| | | F-3 | pbw | | | 6 | | | | |
| | | F-4 | pbw | | | | 6 | | | |
| | | F-5 | pbw | | | | | 6 | | |

TABLE III-2-continued

| item | | unit | Example III-16 | III-17 | III-18 | III-19 | III-20 | III-21 | III-22 |
|---|---|---|---|---|---|---|---|---|---|
| Composition | D-1 | pbw | 3.5 | 3.5 | 3.5 | 3.5 | 3.5 | | |
| | D-2 | pbw | | | | | | 3.5 | |
| | D-3 | pbw | | | | | | | 3.5 |
| | D-4 | pbw | | | | | | | |
| others | STB-1 | pbw | 0.12 | 0.12 | 0.12 | 0.12 | 0.12 | 0.12 | 0.12 |
| | STB-2 | pbw | 0.12 | 0.12 | 0.12 | 0.12 | 0.12 | 0.12 | 0.12 |
| | WAX | pbw | | | | | | | |
| | TIO | pbw | | | | | | | |
| Characteristic properties | Appearance of molded article | — | Δ | ○ | ◎ | ○ | ○ | ○ | ○ |
| | Tape peeling resistance | — | Δ | ○ | ○ | ○ | ○ | ○ | ○ |
| | Chemical resistance (Magiclean) | — | ○ | ○ | ○ | ○ | ○ | ○ | ○ |
| | Chemical resistance (Magiclean Bathroom) | — | ○ | ○ | ○ | ○ | ○ | ○ | ○ |
| | Chemical resistance (Magiclean toilet) | — | ○ | ○ | ○ | ○ | ○ | ○ | ○ |
| | Flexural modulus | MPa | 2100 | 2200 | 1900 | 2500 | 2400 | 2200 | 2200 |
| | Charpy impact strength | kJ/m² | 8 | 14 | 8 | 9 | 8 | 14 | 10 |
| | Surface hardness | kJ/m² | 2B | 2B | 2B | B | B | 2B | 2B |

| item | | unit | Example III-23 | III-24 | III-25 | III-26 | III-27 | III-28 | III-29 |
|---|---|---|---|---|---|---|---|---|---|
| composition | A-1 | pbw | 76 | 76 | 76 | 76 | 62 | 76 | 70 |
| | A-2 | pbw | | | | | | | |
| | A-3 | pbw | | | | | | | |
| | B-1 | pbw | 24 | 24 | 24 | 24 | 38 | 24 | 30 |
| | B-2 | pbw | | | | | | | |
| | B-5 | pbw | | | | | | | |
| | B-6 | pbw | | | | | | | |
| | total | pbw | 100 | 100 | 100 | 100 | 100 | 100 | 100 |
| | C-1 | pbw | 7 | 3 | 15 | 7 | 7 | 7 | 15 |
| | C-2 | pbw | | | | | | | |
| | C-3 | pbw | | | | | | | |
| | C-4 | pbw | | | | | | | |
| | C-5 | pbw | | | | | | | |
| | F-1 | pbw | 6 | 6 | 6 | 3 | 70 | 6 | 30 |
| | F-2 | pbw | | | | | | | |
| | F-3 | pbw | | | | | | | |
| | F-4 | pbw | | | | | | | |
| | F-5 | pbw | | | | | | | |

| item | | unit | Example III-23 | III-24 | III-25 | III-26 | III-27 | III-28 | III-29 |
|---|---|---|---|---|---|---|---|---|---|
| Composition | D-1 | pbw | | 3.5 | 3.5 | 3.5 | 3.5 | 8.5 | 3.5 |
| | D-2 | pbw | | | | | | | |
| | D-3 | pbw | | | | | | | |
| | D-4 | pbw | 3.5 | | | | | | |
| others | STB-1 | pbw | 0.12 | 0.12 | 0.12 | 0.12 | 0.12 | 0.12 | 0.12 |
| | STB-2 | pbw | 0.12 | 0.12 | 0.12 | 0.12 | 0.12 | 0.12 | 0.12 |
| | WAX | pbw | | | | | | | |
| | TIO | pbw | | | | | | | |
| Characteristic properties | Appearance of molded article | — | ○ | Δ | ○ | ○ | ○ | ○ | ○ |
| | Tape peeling resistance | — | ○ | Δ | ◎ | ○ | ○ | ○ | ○ |
| | Chemical resistance (Magiclean) | — | ○ | ○ | ○ | ○ | ○ | ○ | ○ |
| | Chemical resistance (Magiclean Bathroom) | — | ○ | Δ | ○ | ○ | Δ | ○ | ○ |
| | Chemical resistance (Magiclean toilet) | — | ○ | ○ | ○ | ○ | ○ | ○ | ○ |
| | Flexural modulus | MPa | 2200 | 2400 | 1700 | 2100 | 3200 | 1700 | 2000 |
| | Charpy impact strength | kJ/m² | 12 | 9 | 15 | 13 | 8 | 15 | 10 |
| | Surface hardness | kJ/m² | 2B | 2B | 2B | B | 2B | 2B | 2B | pbw: part by weight

TABLE IV-1

| item | | unit | Example IV-1 | IV-2 | IV-3 | IV-4 | IV-5 | IV-6 | IV-7 | IV-8 | IV-9 |
|---|---|---|---|---|---|---|---|---|---|---|---|
| composition | A-1 | pbw | 75 | 75 | 75 | 75 | | | 75 | 75 | 75 |
| | A-2 | pbw | | | | | 75 | | | | |
| | A-3 | pbw | | | | | | 75 | | | |
| | B-1 | pbw | 25 | 25 | 25 | 25 | 25 | 25 | | | |
| | B-2 | pbw | | | | | | | 25 | | |
| | B-5 | pbw | | | | | | | | | |
| | B-6 | pbw | | | | | | | | | |
| | B-8 | Pbw | | | | | | | | 25 | |
| | B-9 | pbw | | | | | | | | | 25 |
| | total | pbw | 100 | 100 | 100 | 100 | 100 | 100 | 100 | 100 | 100 |
| | C-1 | pbw | 6.5 | 6.5 | 6.5 | 6.5 | 6.5 | 6.5 | 6.5 | 6.5 | 6.5 |
| | C-2 | pbw | | | | | | | | | |
| | C-3 | pbw | | | | | | | | | |
| | C-4 | pbw | | | | | | | | | |
| | C-5 | Pbw | | | | | | | | | |
| | E-3 | pbw | 12 | 12 | 12 | 12 | 12 | 12 | 12 | 12 | 12 |
| | E-4 | pbw | | | | | | | | | |
| | G-1 | pbw | 0.3 | 0.3 | 0.3 | 0.3 | 0.3 | 0.3 | 0.3 | 0.3 | 0.3 |
| | G-2 | pbw | | | | | | | | | |
| | G-3 | pbw | | | | | | | | | |
| | G-4 | pbw | | | | | | | | | |
| | G-5 | pbw | | | | | | | | | |

| item | | unit | Example IV-1 | IV-2 | IV-3 | IV-4 | IV-5 | IV-6 | IV-7 | IV-8 | IV-9 |
|---|---|---|---|---|---|---|---|---|---|---|---|
| Composition | D-1 | pbw | 3.5 | 3.5 | 3.5 | 3.5 | 3.5 | 3.5 | 3.5 | 3.5 | 3.5 |
| | D-2 | pbw | | | | | | | | | |
| | D-3 | pbw | | | | | | | | | |
| | D-4 | pbw | | | | | | | | | |
| | H-1 | pbw | 0.75 | 0.75 | 0.75 | 0.75 | 0.75 | 0.75 | 0.75 | 0.75 | 0.75 |
| | H-2 | pbw | | | | | | | | | |
| | H-3 | pbw | | | | | | | | | |
| others | STB-1 | pbw | 0.12 | 0.12 | 0.12 | | 0.12 | 0.12 | 0.12 | 0.12 | 0.12 |
| | STB-2 | pbw | 0.12 | 0.12 | 0.12 | | 0.12 | 0.12 | 0.12 | 0.12 | 0.12 |
| | WAX | pbw | | | 0.4 | | | | | | |
| | TIO | pbw | | | | 2 | | | | | |
| Characteristic properties | Appearance of molded article | — | ○ | ○ | ⊚ | ○ | ○ | Δ | Δ | Δ | Δ |
| | Tape peeling resistance | — | ○ | ○ | ○ | ○ | ○ | Δ | Δ | Δ | Δ |
| | Chemical resistance (Magiclean) | — | ○ | ○ | ○ | ○ | ○ | ○ | ○ | ○ | ○ |
| | Chemical resistance (Magiclean Bathroom) | — | ○ | ○ | ○ | ○ | ○ | Δ | ○ | ○ | ○ |
| | Chemical resistance (Magiclean toilet) | — | ○ | ○ | ○ | ○ | ○ | ○ | ○ | ○ | ○ |
| | Flexural modulus | MPa | 1900 | 1900 | 1950 | 1900 | 1900 | 1900 | 1900 | 1850 | 1850 |
| | Charpy impact strength | kJ/m² | 12 | 12 | 11 | 11 | 11 | 11 | 9 | 13 | 14 | 13 |
| | Flame retardancy (1.5 mm/V) | — | V-2 | V-2 | V-2 | V-2 | V-2 | V-2 | V-2 | V-2 | V-2 |
| | Flame retardancy (2.5 mm/V) | — | V-0 | V-0 | V-0 | V-0 | V-0 | V-0 | V-0 | V-1 | V-1 |

| item | | unit | Example IV-10 | IV-11 | IV-12 | IV-13 | IV-14 | IV-15 | IV-16 | IV-17 |
|---|---|---|---|---|---|---|---|---|---|---|
| composition | A-1 | pbw | 75 | 75 | 75 | 75 | 75 | 75 | 75 | 75 |
| | A-2 | pbw | | | | | | | | |
| | A-3 | pbw | | | | | | | | |
| | B-1 | pbw | 20 | 20 | 25 | 25 | 25 | 25 | 25 | 25 |
| | B-2 | pbw | | | | | | | | |
| | B-5 | pbw | 5 | | | | | | | |
| | B-6 | pbw | | 5 | | | | | | |
| | B-8 | Pbw | | | | | | | | |
| | B-9 | pbw | | | | | | | | |
| | total | pbw | 100 | 100 | 100 | 100 | 100 | 100 | 100 | 100 |
| | C-1 | pbw | 6.5 | 6.5 | | | | | 6.5 | 6.5 |
| | C-2 | pbw | | | 6.5 | | | | | |
| | C-3 | pbw | | | | 6.5 | | | | |
| | C-4 | pbw | | | | | 6.5 | | | |

TABLE IV-1-continued

|  |  |  |  |  |  |  |  |  |  |
|---|---|---|---|---|---|---|---|---|---|
| C-5 | Pbw |  |  |  |  |  | 6.5 |  |  |
| E-3 | pbw | 12 | 12 | 12 | 12 | 12 | 12 |  | 12 |
| E-4 | pbw |  |  |  |  |  |  | 12 |  |
| G-1 | pbw | 0.3 | 0.3 | 0.3 | 0.3 | 0.3 | 0.3 | 0.3 |  |
| G-2 | pbw |  |  |  |  |  |  |  | 0.3 |
| G-3 | pbw |  |  |  |  |  |  |  |  |
| G-4 | pbw |  |  |  |  |  |  |  |  |
| G-5 | pbw |  |  |  |  |  |  |  |  |

|  | item |  | unit | Example |  |  |  |  |  |  |  |
|---|---|---|---|---|---|---|---|---|---|---|---|
|  |  |  |  | IV-10 | IV-11 | IV-12 | IV-13 | IV-14 | IV-15 | IV-16 | IV-17 |
| Composition |  | D-1 | pbw | 3.5 | 3.5 | 3.5 | 3.5 | 3.5 | 3.5 | 3.5 | 3.5 |
|  |  | D-2 | pbw |  |  |  |  |  |  |  |  |
|  |  | D-3 | pbw |  |  |  |  |  |  |  |  |
|  |  | D-4 | pbw |  |  |  |  |  |  |  |  |
|  |  | H-1 | pbw | 0.75 | 0.75 | 0.75 | 0.75 | 0.75 | 0.75 | 0.75 | 0.75 |
|  |  | H-2 | pbw |  |  |  |  |  |  |  |  |
|  |  | H-3 | pbw |  |  |  |  |  |  |  |  |
|  | others | STB-1 | pbw | 0.12 | 0.12 | 0.12 | 0.12 | 0.12 | 0.12 | 0.12 | 0.12 |
|  |  | STB-2 | pbw | 0.12 | 0.12 | 0.12 | 0.12 | 0.12 | 0.12 | 0.12 | 0.12 |
|  |  | WAX | pbw |  |  |  |  |  |  |  |  |
|  |  | TIO | pbw |  |  |  |  |  |  |  |  |
| Characteristic properties | Appearance of molded article |  | — | ◎ | ◎ | ○ | ○ | Δ | Δ | ○ | ○ |
|  | Tape peeling resistance |  | — | ◎ | ◎ | ○ | ○ | Δ | Δ | Δ | ○ |
|  | Chemical resistance (Magiclean) |  | — | ○ | ○ | ○ | ○ | ○ | ○ | Δ | ○ |
|  | Chemical resistance (Magiclean Bathroom) |  | — | ○ | ○ | ○ | ○ | Δ | ○ | Δ | ○ |
|  | Chemical resistance (Magiclean toilet) |  | — | ○ | ○ | ○ | ○ | ○ | ○ | Δ | ○ |
|  | Flexural modulus |  | MPa | 1850 | 1850 | 1900 | 1900 | 1900 | 1900 | 1900 | 1900 |
|  | Charpy impact strength |  | kJ/m$^2$ | 11 | 11 | 10 | 10 | 8 | 9 | 9 | 12 |
|  | Flame retardancy (1.5 mm/V) |  | — | V-2 | V-2 | V-2 | V-2 | V-2 | V-2 | V-2 | V-2 |
|  | Flame retardancy (2.5 mm/V) |  | — | V-1 | V-1 | V-0 | V-0 | V-0 | V-0 | V-0 | V-0 | pbw: part by weight

TABLE IV-2

| item |  | unit | Example |  |  |  |  |  |  |  |
|---|---|---|---|---|---|---|---|---|---|---|
|  |  |  | IV-18 | IV-19 | IV-20 | IV-21 | IV-22 | IV-23 | IV-24 | IV-25 |
| composition | A-1 | pbw | 75 | 75 | 75 | 75 | 75 | 75 | 75 | 75 |
|  | A-2 | pbw |  |  |  |  |  |  |  |  |
|  | A-3 | pbw |  |  |  |  |  |  |  |  |
|  | B-1 | pbw | 25 | 25 | 25 | 25 | 25 | 25 | 25 | 25 |
|  | B-2 | pbw |  |  |  |  |  |  |  |  |
|  | B-5 | pbw |  |  |  |  |  |  |  |  |
|  | B-6 | pbw |  |  |  |  |  |  |  |  |
|  | total | pbw | 100 | 100 | 100 | 100 | 100 | 100 | 100 | 100 |
|  | C-1 | pbw | 6.5 | 6.5 | 6.5 | 6.5 | 6.5 | 6.5 | 6.5 | 6.5 |
|  | C-2 | pbw |  |  |  |  |  |  |  |  |
|  | C-3 | pbw |  |  |  |  |  |  |  |  |
|  | C-4 | pbw |  |  |  |  |  |  |  |  |
|  | C-5 | Pbw |  |  |  |  |  |  |  |  |
|  | E-3 | pbw | 12 | 12 | 12 | 12 | 12 | 12 | 12 | 12 |
|  | E-4 | pbw |  |  |  |  |  |  |  |  |
|  | G-1 | pbw |  |  |  | 0.3 | 0.3 | 0.3 | 0.3 | 0.3 |
|  | G-2 | pbw |  |  |  |  |  |  |  |  |
|  | G-3 | pbw | 0.3 |  |  |  |  |  |  |  |
|  | G-4 | pbw |  | 0.3 |  |  |  |  |  |  |
|  | G-5 | pbw |  |  | 0.3 |  |  |  |  |  |

| item |  | unit | Example |  |  |  |  |  |  |  |
|---|---|---|---|---|---|---|---|---|---|---|
|  |  |  | IV-18 | IV-19 | IV-20 | IV-21 | IV-22 | IV-23 | IV-24 | IV-25 |
| Composition | D-1 | pbw | 3.5 | 3.5 | 3.5 |  |  |  | 3.5 | 3.5 |
|  | D-2 | pbw |  |  |  | 3.5 |  |  |  |  |

TABLE IV-2-continued

| | | | | | | | | | | |
|---|---|---|---|---|---|---|---|---|---|---|
| | | D-3 | pbw | | | | | 3.5 | | | |
| | | D-4 | pbw | | | | | | 3.5 | | |
| | | H-1 | pbw | 0.75 | 0.75 | 0.75 | 0.75 | 0.75 | 0.75 | | |
| | | H-2 | pbw | | | | | | | 0.75 | |
| | | H-3 | pbw | | | | | | | | 0.4 |
| | others | STB-1 | pbw | 0.12 | 0.12 | 0.12 | 0.12 | 0.12 | 0.12 | 0.12 | 0.12 |
| | | STB-2 | pbw | 0.12 | 0.12 | 0.12 | 0.12 | 0.12 | 0.12 | 0.12 | 0.12 |
| | | WAX | pbw | | | | | | | | |
| | | TIO | pbw | | | | | | | | |
| Characteristic properties | Appearance of molded article | | — | ○ | ○ | ○ | ○ | ○ | ○ | ○ | ○ |
| | Tape peeling resistance | | — | ○ | ○ | ○ | ○ | ○ | ○ | ○ | ○ |
| | Chemical resistance (Magiclean) | | — | ○ | ○ | ○ | ○ | ○ | ○ | ○ | ○ |
| | Chemical resistance (Magiclean Bathroom) | | — | ○ | ○ | ○ | ○ | ○ | ○ | ○ | ○ |
| | Chemical resistance (Magiclean toilet) | | — | ○ | ○ | ○ | ○ | ○ | ○ | ○ | ○ |
| | Flexural modulus | | MPa | 1900 | 1900 | 1900 | 1900 | 1900 | 1900 | 1900 | 1900 |
| | Charpy impact strength | | kJ/m$^2$ | 11 | 9 | 8 | 13 | 8 | 11 | 12 | 12 |
| | Flame retardancy (1.5 mm/V) | | — | V-2 | V-2 | V-2 | V-2 | V-2 | V-2 | V-2 | V-2 |
| | Flame retardancy (2.5 mm/V) | | — | V-0 | V-0 | V-1 | V-0 | V-0 | V-0 | V-0 | V-0 |

| | | | | Example | | | | | | | |
|---|---|---|---|---|---|---|---|---|---|---|---|
| item | | | unit | IV-26 | IV-27 | IV-28 | IV-29 | IV-30 | IV-31 | IV-32 | IV-33 |
| composition | A-1 | | pbw | 75 | 75 | 75 | 75 | 75 | 75 | 75 | 75 |
| | A-2 | | pbw | | | | | | | | |
| | A-3 | | pbw | | | | | | | | |
| | B-1 | | pbw | | | 25 | 25 | 25 | 25 | 25 | 25 |
| | B-2 | | pbw | 25 | 25 | | | | | | |
| | B-5 | | pbw | | | | | | | | |
| | B-6 | | pbw | | | | | | | | |
| | total | | pbw | 100 | 100 | 100 | 100 | 100 | 100 | 100 | 100 |
| | C-1 | | pbw | 6.5 | 6.5 | 3 | 15 | 6.5 | 6.5 | 6.5 | 6.5 |
| | C-2 | | pbw | | | | | | | | |
| | C-3 | | pbw | | | | | | | | |
| | C-4 | | pbw | | | | | | | | |
| | C-5 | | Pbw | | | | | | | | |
| | E-3 | | pbw | 12 | 15 | 12 | 12 | 5 | 25 | 12 | 12 |
| | E-4 | | pbw | | | | | | | | |
| | G-1 | | pbw | 0.3 | 0.3 | 0.3 | 0.3 | 0.3 | 0.3 | 0.1 | 0.7 |
| | G-2 | | pbw | | | | | | | | |
| | G-3 | | pbw | | | | | | | | |
| | G-4 | | pbw | | | | | | | | |
| | G-5 | | pbw | | | | | | | | |

| | | | | Example | | | | | | | |
|---|---|---|---|---|---|---|---|---|---|---|---|
| item | | | unit | IV-26 | IV-27 | IV-28 | IV-29 | IV-30 | IV-31 | IV-32 | IV-33 |
| Composition | D-1 | | pbw | | 3.5 | 3.5 | 3.5 | 3.5 | 3.5 | 3.5 | 3.5 |
| | D-2 | | pbw | | | | | | | | |
| | D-3 | | pbw | | | | | | | | |
| | D-4 | | pbw | | | | | | | | |
| | H-1 | | pbw | 0.75 | | 0.75 | 0.75 | 0.75 | 0.75 | 0.75 | 0.75 |
| | H-2 | | pbw | | | | | | | | |
| | H-3 | | pbw | | | | | | | | |
| | others | STB-1 | pbw | 0.12 | 0.12 | 0.13 | 0.13 | 0.13 | 0.13 | 0.13 | 0.13 |
| | | STB-2 | pbw | 0.12 | 0.12 | 0.13 | 0.13 | 0.13 | 0.13 | 0.13 | 0.13 |
| | | WAX | pbw | | | | | | | | |
| | | TIO | pbw | | | | | | | | |
| Characteristic properties | Appearance of molded article | | — | ○ | ○ | Δ | ○ | ○ | ○ | ○ | ○ |
| | Tape peeling resistance | | — | ○ | ○ | Δ | ⊚ | ○ | Δ | ○ | ○ |
| | Chemical resistance (Magiclean) | | — | ○ | ○ | ○ | ○ | ○ | Δ | ○ | ○ |
| | Chemical resistance (Magiclean Bathroom) | | — | Δ | Δ | Δ | ○ | ○ | Δ | ○ | ○ |
| | Chemical resistance (Magiclean toilet) | | — | ○ | ○ | ○ | ○ | ○ | ○ | ○ | ○ |

TABLE IV-2-continued

| | | | | | | | | | |
|---|---|---|---|---|---|---|---|---|---|
| Flexural modulus | MPa | 1900 | 1950 | 2200 | 1700 | 1950 | 2000 | 1900 | 1900 |
| Charpy impact strength | kJ/m$^2$ | 9 | 11 | 7 | 14 | 14 | 8 | 12 | 10 |
| Flame retardancy (1.5 mm/V) | — | V-2 | V-2 | V-2 | V-2 | V-2 | V-2 | V-2 | V-2 |
| Flame retardancy (2.5 mm/V) | — | V-0 | V-2 | V-0 | V-0 | V-2 | V-0 | V-0 | V-0 | pbw: part by weight

INDUSTRIAL FEASIBILITY

Since the resin composition of the present invention and a molded article thereof have excellent mechanical properties, chemical resistance, appearance and tape peeling resistance, they are useful in a wide variety of fields such as household equipment, building materials, living materials, infrastructure equipment, automobiles, OA and EE, and outdoor equipment regardless of indoor and outdoor use.

Molded articles of the resin composition of the present invention are advantageously used in living materials, household equipment materials, building materials and interior goods, internal parts for OA equipment and home electric appliances, and housings. These products include personal computers, notebook personal computers, CRT displays, printers, portable terminals, cell phones, copiers, facsimiles, recording medium (such as CD, CD-ROM, DVD, PD and FDD) drives, parabolic antennas, electric tools, VTR, TV, irons, hair driers, rice cookers, microwave ovens, acoustic equipment, audio equipment such as audio disks, laser disks and compact disks, lighting equipment, refrigerators, air conditioners, typewriters, word processors, living materials such as suitcases and cleaning utensils, and household equipment materials such as bathrooms, toiletry and washstands. They are also used in auto parts such as deflector parts, car navigation parts and car stereo parts.

The invention claimed is:

1. A resin composition comprising:
   1 to 20 parts by weight of (C) at least one styrene-based thermoplastic elastomer (component C) selected from the group consisting of a styrene-ethylene-propylene-styrene block copolymer (SEPS), a styrene-ethylene-butylene-styrene block copolymer (SEBS) and a styrene-butadiene-butylene-styrene block copolymer (SBBS),
   based on 100 parts by weight of the total of (A) a polycarbonate-based resin (component A) and (B) a polyolefin-based resin having a MFR at 230° C. under a load of 2.16 kg of not less than 40 g/10 min (component B),
   wherein the polyolefin-based resin (component B) includes a maleic anhydride-modified polypropylene resin having a MFR at 190° C. under a load of 2.16 kg of not less than 50 g/10 min.

2. A resin composition comprising:
   1 to 20 parts by weight of (C) at least one styrene-based thermoplastic elastomer (component C) selected from the group consisting of a styrene-ethylene-propylene-styrene block copolymer (SEPS), a styrene-ethylene-butylene-styrene block copolymer (SEBS) and a styrene-butadiene-butylene-styrene block copolymer (SBBS), and
   1 to 10 parts by weight of (D) a graft polymer (component D),
   based on 100 parts by weight of the total of (A) a polycarbonate-based resin (component A) and (B) a polyolefin-based resin having a MFR at 230° C. under a load of 2.16 kg of not less than 40 g/10 min (component B),
   wherein the graft polymer (component D) is a core-shell type graft polymer.

3. The resin composition according to claim 1 which comprises 0.01 to 30 parts by weight of a flame retardant (component E) based on 100 parts by weight of the total of the components A and B.

4. The resin composition according to claim 1 which comprises 1 to 100 parts by weight of an inorganic filler (component F) based on 100 parts by weight of the total of the components A and B.

5. The resin composition according to claim 1 which comprises 1 to 30 parts by weight of a phosphorus-based flame retardant (component E-2) and 0.01 to 1 part by weight of a hindered amine-based compound (component G) based on 100 parts by weight of the total of the components A and B.

6. The resin composition according to claim 1 which comprises 0.05 to 2 parts by weight of a dripping inhibitor (component H) based on 100 parts by weight of the total of the components A and B.

7. The resin composition according to claim 1, wherein a MFR at 230° C. under a load of 2.16 kg of the polyolefin-based resin (component B) is not less than 60 g/10 min.

8. The resin composition according to claim 1, wherein the polyolefin-based resin (component B) is a polypropylene-based resin.

9. The resin composition according to claim 1, wherein the styrene content of the styrene-based thermoplastic elastomer (component C) is 40 to 80 wt %.

10. The resin composition according to claim 1, wherein the weight ratio of the component A to the component B is 50/50 to 95/5.

11. The resin composition according to claim 5, wherein the hindered amine-based compound (component G) is either N—R type (alkyl group (R) is bonded to a nitrogen atom) or N—OR type (alkoxy group (OR) is bonded to a nitrogen atom) hindered amine-based compound.

12. A molded article formed from the resin composition of claim 1 and having a tape peeling resistance of less than 0.5%.

13. A method of improving the tape peeling resistance of a molded article comprising a polycarbonate-based resin (component A), a polyolefin-based resin (component B) and a styrene-based thermoplastic elastomer (component C), said method comprising:
   selecting at least one from the group consisting of a styrene-ethylene-propylene-styrene block copolymer (SEPS), a styrene-ethylene-butylene-styrene block copolymer (SEBS) and a styrene-butadiene-butylene-styrene block copolymer (SBBS) as the styrene-based thermoplastic elastomer (component C), and selecting a resin having a MFR at 230° C. under a load of 2.16 kg of not less than 40 g/10 min as the polyolefin-based resin (component B), wherein the polyolefin-based resin (component B) includes a maleic anhydride-modified polypropylene resin having a MFR at 190° C. under a load of 2.16 kg of not less than 50 g/10 min.

14. A method of improving the tape peeling resistance of a molded article comprising a polycarbonate-based resin (component A), a polyolefin-based resin (component B), a styrene-based thermoplastic elastomer (component C), and a graft polymer (component D), said method comprising:

selecting at least one from the group consisting of a styrene-ethylene-propylene-styrene block copolymer (SEPS), a styrene-ethylene-butylene-styrene block copolymer (SEBS) and a styrene-butadiene-butylene-styrene block copolymer (SBBS) as the styrene-based thermoplastic elastomer (component C), and selecting a resin having a MFR at 230° C. under a load of 2.16 kg of not less than 40 g/10 min as the polyolefin-based resin (component B), wherein the graft polymer (component D) is a core-shell type graft polymer.

15. The resin composition according to claim 2 which comprises 0.01 to 30 parts by weight of a flame retardant (component E) based on 100 parts by weight of the total of the components A and B.

16. The resin composition according to claim 2 which comprises 1 to 100 parts by weight of an inorganic filler (component F) based on 100 parts by weight of the total of the components A and B.

17. The resin composition according to claim 2 which comprises 1 to 30 parts by weight of a phosphorus-based flame retardant (component E-2) and 0.01 to 1 part by weight of a hindered amine-based compound (component G) based on 100 parts by weight of the total of the components A and B.

18. The resin composition according to claim 2 which comprises 0.05 to 2 parts by weight of a dripping inhibitor (component H) based on 100 parts by weight of the total of the components A and B.

* * * * *